United States Patent
Sato

(10) Patent No.: US 9,135,724 B2
(45) Date of Patent: Sep. 15, 2015

(54) IMAGE PROCESSING APPARATUS AND METHOD

(75) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 14/001,305

(22) PCT Filed: Feb. 28, 2012

(86) PCT No.: PCT/JP2012/054858
§ 371 (c)(1),
(2), (4) Date: Aug. 23, 2013

(87) PCT Pub. No.: WO2012/124461
PCT Pub. Date: Sep. 20, 2012

(65) Prior Publication Data
US 2013/0330012 A1 Dec. 12, 2013

(30) Foreign Application Priority Data

Mar. 11, 2011 (JP) .................................. 2011-054817
Jun. 20, 2011 (JP) .................................. 2011-136325

(51) Int. Cl.
G06K 9/46 (2006.01)
G06T 9/00 (2006.01)
H04N 19/61 (2014.01)
H04N 19/593 (2014.01)
(Continued)

(52) U.S. Cl.
CPC .............. *G06T 9/004* (2013.01); *H04N 19/124* (2014.11); *H04N 19/126* (2014.11); *H04N 19/463* (2014.11); *H04N 19/593* (2014.11); *H04N 19/61* (2014.11)

(58) Field of Classification Search
None
See application file for complete search history.

(56) References Cited

U.S. PATENT DOCUMENTS 8,542,730 B2 * 9/2013 Ye et al. .................... 375/240.03
8,594,189 B1 * 11/2013 Bankoski et al. ......... 375/240.03
(Continued)

FOREIGN PATENT DOCUMENTS

JP 2005-323312 11/2005
JP 2006-94483 4/2006
(Continued)

OTHER PUBLICATIONS

Extended European Search Report issued Jul. 30, 2014 in Patent Application No. 12757816.9.
(Continued)

*Primary Examiner* — Daniel Mariam
(74) *Attorney, Agent, or Firm* — Oblon, McClelland, Maier & Neustadt, L.L.P.

(57) ABSTRACT

This technique relates to an image processing apparatus and a method for improving the coding efficiency for a quantization parameter.
Provided are a predicted quantization parameter setting unit for setting a predicted quantization parameter for a current coding unit by using multiple quantization parameters which are set for multiple surrounding coding units located around the current coding unit which is target of coding processing, and a difference quantization parameter setting unit for setting a difference quantization parameter indicating a difference value between the quantization parameter which is set for the current coding unit and the predicted quantization parameter which is set by the predicted quantization parameter setting unit. The present disclosure can be applied to, for example, an image processing apparatus.

16 Claims, 35 Drawing Sheets

(51) Int. Cl.
*H04N 19/463* (2014.01)
*H04N 19/124* (2014.01)
*H04N 19/126* (2014.01)

(56) References Cited

U.S. PATENT DOCUMENTS

| | | | |
|---|---|---|---|
| 2006/0093041 A1 | 5/2006 | Cieplinski et al. | |
| 2007/0025441 A1* | 2/2007 | Ugur et al. | 375/240.03 |
| 2009/0213930 A1 | 8/2009 | Ye et al. | |
| 2009/0296808 A1 | 12/2009 | Regunathan et al. | |
| 2010/0074338 A1 | 3/2010 | Yamori et al. | |
| 2011/0026611 A1 | 2/2011 | Kenji | |
| 2011/0096829 A1* | 4/2011 | Han et al. | 375/240.02 |
| 2011/0150077 A1* | 6/2011 | Kishore et al. | 375/240.03 |
| 2012/0121188 A1 | 5/2012 | Kenji | |
| 2012/0183053 A1* | 7/2012 | Lu et al. | 375/240.03 |
| 2013/0028531 A1 | 1/2013 | Sato | |
| 2013/0051477 A1 | 2/2013 | Sasaki | |
| 2013/0071039 A1 | 3/2013 | Sato | |
| 2013/0077871 A1* | 3/2013 | Lu et al. | 382/197 |
| 2013/0216149 A1 | 8/2013 | Sato | |
| 2013/0251032 A1 | 9/2013 | Tanaka | |
| 2013/0251050 A1 | 9/2013 | Ikeda et al. | |
| 2013/0259142 A1 | 10/2013 | Ikeda et al. | |
| 2013/0301739 A1 | 11/2013 | Sato | |
| 2013/0301743 A1 | 11/2013 | Ikeda et al. | |
| 2013/0301942 A1 | 11/2013 | Kondo | |
| 2013/0322525 A1 | 12/2013 | Tanaka | |
| 2013/0343451 A1 | 12/2013 | Sato | |
| 2014/0003510 A1 | 1/2014 | Lu et al. | |
| 2014/0023150 A1 | 1/2014 | Kondo | |
| 2014/0064362 A1 | 3/2014 | Sato | |
| 2014/0072037 A1 | 3/2014 | Sato | |
| 2014/0086322 A1 | 3/2014 | Takahashi et al. | |
| 2014/0092958 A1 | 4/2014 | Sato | |
| 2014/0105281 A1 | 4/2014 | Sato et al. | |

FOREIGN PATENT DOCUMENTS

| | | |
|---|---|---|
| WO | WO 2008/126135 A1 | 10/2008 |
| WO | WO 2009/105732 A1 | 8/2009 |
| WO | WO 2009/158113 A2 | 12/2009 |

OTHER PUBLICATIONS

Kazushi Sato, "On LBS and Quantization", Joint Collaborative Team on Video Coding (JCT-VC) of ITU-T SG16 WP3 and ISO/IEC JTC1/SC29/WG11, 4th Meeting, Document : JCTVC-D308r 1, WG11 No. m19074, Sony Corp., XP 30047642, (Jan. 20-28, 2011), 12 pages.

Chao Pang, et al., "Improved dQP Calculation Method", Joint Collaborative Team on Video Coding (JCT-VC) of ITU-T SG16 WP3 and ISO/IEC JTC1/SC29/WG11, 5th Meeting, Document No. JCTVC-E217, The Hong Kong University of Science and Technology, XP 30008723, (Mar. 16-23, 2011), 3 pages.

Madhukar Budagavi, et al., "Delta QP signaling at sub-LCU level", Joint Collaborative Team on Video Coding (JCT-VC) of ITU-T SG16 WP3 and ISO/IEC JTC1/SC29/WG11, 4th Meeting, Document :JCTVC-D038, Texas Instruments Inc., URL: http://wftp3.itu.int/av-arch/jctvc-site/,, XP 30008079, (Jan. 20-28, 2011), 5 pages.

Hirofumi Aoki, et al, "Prediction-based QP 1-20 derivation", Joint Collaborative Team on Video Coding (JCT-VC) of ITU-T SG16 WP3 and ISO/IEC JTC1/SC29/WG11, 5th Meeting, Document : JCTVC-E215, NEC Corporation, XP 30008721, (Mar. 16-23, 2011), 11 pages.

L. Dong, et al., "CU Adaptive Quantization Syntax Change for Better Decoder pipelining", Joint Collaborative Team on Video Coding (JCT-VC) of ITU-T SG16 WP3 and ISO/IEC JTC1/SC29/WG11, 4th Meeting, Document: JCTVC-D258 Sony Electronics Inc., XP 30047590, (Jan. 20-28, 2011), 4 pages.

International Search Report issued Jun. 5, 2012 in PCT/JP2012/054858.

Shun-ichi Sekiguchi, "Trend Report on Video Coding Standardization-HEVC: Next-Generation International Standardization Project", The Institute of Electronics, Information and Communication Engineers, IEICE Technical Report, Feb. 28, 2011, vol. 110, No. 457, pp. 85-90 (with English translation).

Thomas Wiegand, et al.,"WD1: Working Draft 1 of High-Efficiency Video Coding", Joint Collaborative Team on Video Coding (JCT-VC) of ITU-T SG16, WP3 and ISO/IEC JTC1/SC29/WG11, Document: JCTVC-C403, Oct. 7-15, 2010, 137 pages.

Sung-Chang Lim, et al., "Intra coding using extended block size", ITU-Telecommunications Standardization Sector, Video Coding Experts Group (VCEG), Document VCEG-AL28, Jul. 1-8, 2009, 5 pages.

Peisong Chenn, et al., "Video Coding Using Extended Block Sizes", Study Group 16-Contribution 123, International Telecommunication Union, Com 16-C 123-E, Jan. 2009, 4 pages.

U.S. Appl. No. 14/123,375, filed Dec. 2, 2012, Ikeda.

* cited by examiner

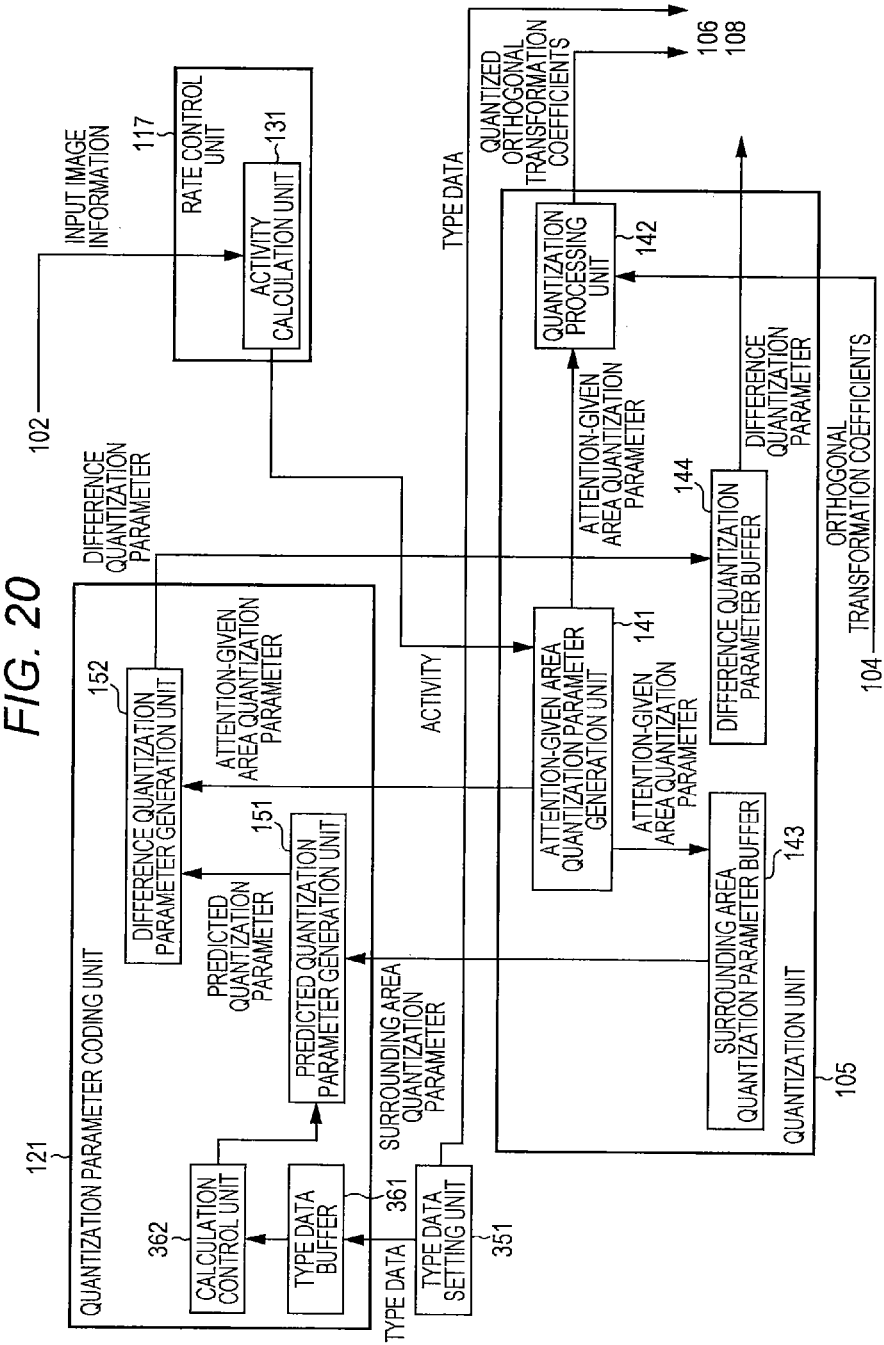

FIG. 21

| Syntax | | |  |
|---|---|---|---|
| PredQP_median_enable | WHETHER OR NOT PREDICTION QUANTIZATION PARAMETER IS TO BE SET USING MEDIAN PREDICTION CALCULATION WITH A UNIT WHICH IS SET WITH FLAG (LCU/Sliceetc) | 0 | MEDIAN PREDICTION CALCULATION IS NOT USED (CANNOT BE USED, PROHIBITED) |
| | | 1 | MEDIAN PREDICTION CALCULATION IS USED (CAN BE USED, NOT PROHIBITED) |
| PredQP_average_enable | WHETHER OR NOT PREDICTION QUANTIZATION PARAMETER IS TO BE SET USING AVERAGE PREDICTION CALCULATION WITH A UNIT WHICH IS SET WITH FLAG (LCU/Sliceetc) | 0 | AVERAGE PREDICTION CALCULATION IS NOT USED (CANNOT BE USED, PROHIBITED) |
| | | 1 | AVERAGE PREDICTION CALCULATION IS USED (CAN BE USED, NOT PROHIBITED) |
| PredQP_waverage_enable | WHETHER OR NOT PREDICTION QUANTIZATION PARAMETER IS TO BE SET USING WEIGHTED AVERAGE PREDICTION CALCULATION WITH A UNIT WHICH IS SET WITH FLAG (LCU/Sliceetc) | 0 | WEIGHTED AVERAGE PREDICTION CALCULATION IS NOT USED (CANNOT BE USED, PROHIBITED) |
| | | 1 | WEIGHTED AVERAGE PREDICTION CALCULATION IS USED (CAN BE USED, NOT PROHIBITED) |

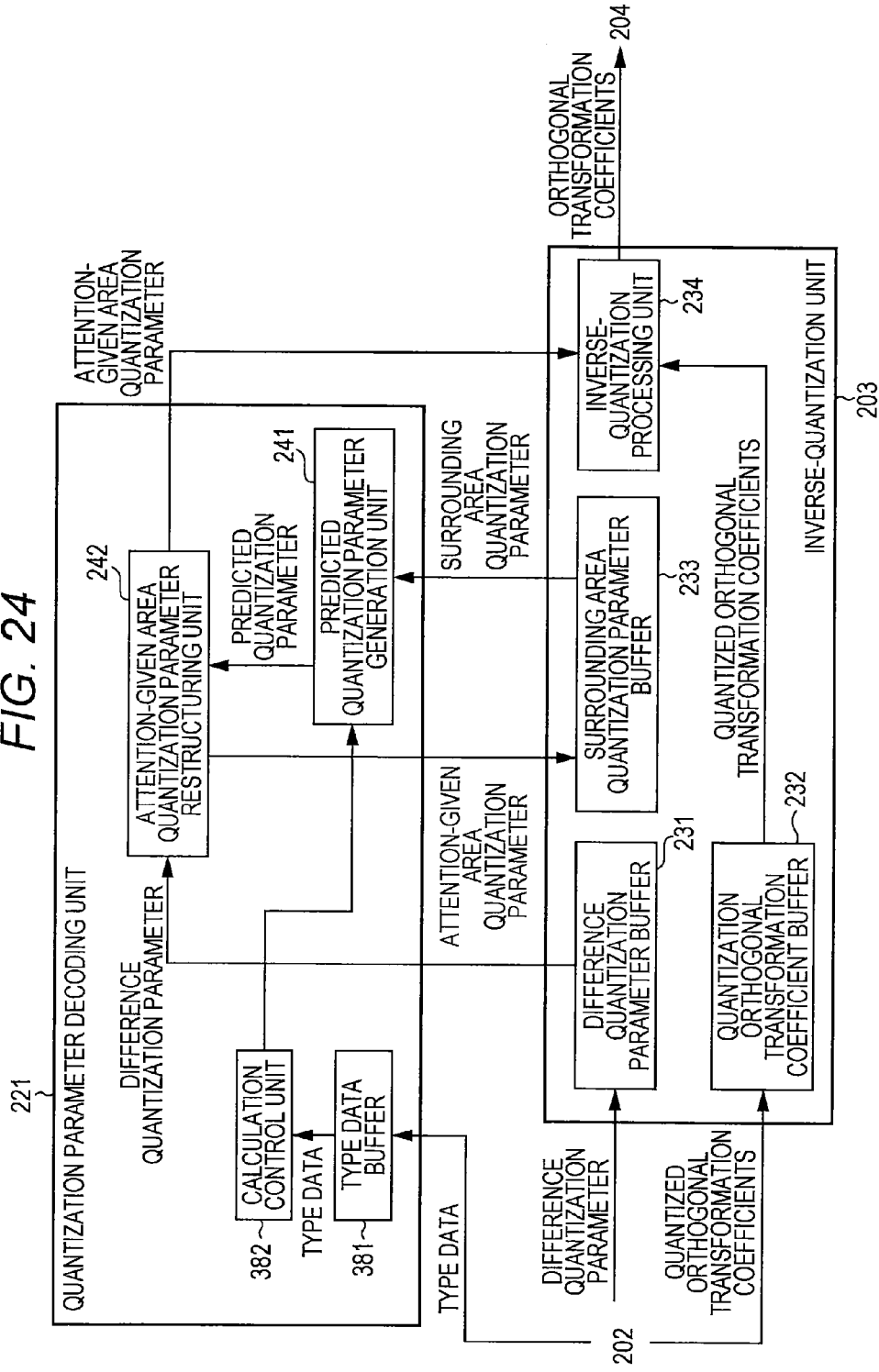

FIG. 25

| Syntax | | |
|---|---|---|
| PredQP_type_flag | WHICH TYPE OF PREDICTION CALCULATION IS USED WITH A UNIT WHICH IS SET WITH FLAG (LCU/Slice etc) | 00 | PREDICTION CALCULATION IS NOT USED (CANNOT BE USED, PROHIBITED) |
| | | 01 | ONLY MEDIAN PREDICTION CALCULATION IS USED (CAN BE USED, NOT PROHIBITED) |
| | | 10 | ONLY AVERAGE PREDICTION CALCULATION IS USED (CAN BE USED, NOT PROHIBITED) |
| | | 11 | BOTH OF MEDIAN PREDICTION CALCULATION AND AVERAGE PREDICTION CALCULATION ARE USED (CAN BE USED, NOT PROHIBITED) |

IMAGE PROCESSING APPARATUS AND METHOD

TECHNICAL FIELD

The present disclosure relates to an image processing apparatus and a method, and more particularly, to an image processing apparatus and a method capable of improving the coding efficiency for quantization parameter.

BACKGROUND ART

In recent years, image information is treated as digital, and at this occasion, for the purpose of transmitting and accumulating information with a high degree of efficiency, apparatuses based on a method such as MPEG (Moving Picture Experts Group) for compression based on orthogonal transformation such as discrete cosine transform and motion compensation by making use of redundancy unique to image information become widely available in not only information distribution such as broadcast station but also information reception at ordinary households.

In particular, MPEG2 (ISO (International Organization for Standardization)/IEC (International Electrotechnical Commission) 13818-2) is defined as a general-purpose image coding method, and with a standard covering both of an interlaced scanned image and sequentially scanned image and a standard resolution image and a high-definition image, it is now widely used for wide range of applications for professionals and consumers. When the MPEG2 compression method is used, high compression rate and high image quality can be achieved by allocating, for example, 4 to 8 Mbps as an amount of codes (bit rate) for an interlaced scanned image of a standard resolution having 720 by 480 pixels and 18 to 22 Mbps for an interlaced scanned image of a high resolution having 1920 by 1088 pixels.

MPEG2 is mainly targeted for high image quality coding suitable for broadcasting, but does not support coding method of a less amount of codes (bit rate) than MPEG1. In other words, MPEG2 does not support higher compression rate. As portable terminals become widely prevalent, needs for such coding methods are considered to grow in the future, and in order to respond to such needs, MPEG 4 coding method has been standardized. With regard to image coding method, the specification is admitted as ISO/IEC 14496-2 in international standard on December, 1998.

Further, in recent years, a standard called H.26L (ITU-T (International Telecommunication Union Telecommunication Standardization Sector) Q6/16 VCEG (Video Coding Expert Group)) is standardized for the purpose of image coding for teleconference in the first place. As compared with conventional coding methods such as MPEG2 and MPEG4, H.26L is known to require a higher amount of computation in coding and decoding thereof, but achieve a still higher degree of coding efficiency. In addition, currently, as one of activities of MPEG4, standardization of achieving a still higher degree of efficiency based on H.26L by incorporating functions not supported by H.26L is being done in Joint Model of Enhanced-Compression Video Coding.

With regard to the schedule of standardization, it was made into international standard under the name of H.264 and MPEG-4 Part 10 (Advanced Video Coding, hereinafter referred to as AVC) on March, 2003.

Further, as an expansion thereto, standardization of FRExt (Fidelity Range Extension) including 8 by 8DCT and quantization matrix defined by MPEG2 and coding tool required for business such as RGB, 4:2:2, and 4:4:4 is completed on February, 2005, and therefore, using AVC, this is made into a coding method capable of expressing film noise included in movies in a preferable manner and is beginning to be used in wide range of applications such as Blu-Ray Disc.

However, recently, the needs for coding with a still higher degree of compression rate are growing. For example, it is desired to compress an image of about 4096 by 2048 pixels which is four times the high vision image or distribute high vision image in a limited transmission capacity environment such as the Internet. Therefore, in VCEG under ITU-T as described above, improvement of the coding efficiency is continuously considered.

By the way, making a macro block size of 16 pixels by 16 pixels is not suitable for a large image frame such as UHD (Ultra High Definition; 4000 pixels by 2000 pixels) which is a target of next-generation coding method. Accordingly, as illustrated in FIG. 4, the macro block size is suggested to be made into a size such as 64 by 64 pixels and 32 pixels by 32 pixels (for example, see Non-Patent Document 1).

More specifically, in Non-Patent Document 1, hierarchical structure is employed, and for a pixel block having 16 by 16 pixels or less, a larger block is defined as a super set thereto while maintaining compatibility with a macro block of current AVC.

Non-Patent Document 1 is a suggestion for applying an extended macro block to inter-slice, but aside from this, there is a suggestion to apply an extended macro block to intra-slice (for example, see Non-Patent Document 2).

Further, there is a suggestion for defining an extended macro block using a concept called Coding Unit (for example, see Non-Patent Document 3).

The sizes of the Largest Coding Unit and the Smallest Coding Unit are designated in sequence parameter set in image compression information.

CITATION LIST

Non-Patent Document

Non-Patent Document 1: Peisong Chenn, Yan Ye, Marta Karczewicz, "Video Coding Using Extended Block Sizes", COM16-C123-E, Qualcomm Inc Non-Patent Document 2: Sung-Chang Lim, Hahyun Lee, Jinho Lee, Jongho Kim, Haechul Choi, Seyoon Jeong, Jin Soo Choi, "Intra coding using extended block size", VCEG-AL28, July, 2009

Non-Patent Document 3: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG11 3rd Meeting: Guangzhou, Conn., 7-15 Oct. 2010

SUMMARY OF THE INVENTION

Problems to be Solved by the Invention

By the way, a quantization parameter QP is used to encode a difference of quantization parameter used for coding and decoding of a previous block, but in particular, when quantization parameter is dynamically changed within a screen just like adaptive quantization, the amount of information in the image compression information may be increased.

The present disclosure is made in view of such circumstances and it is an object of the present invention to improve coding efficiency for quantization parameter.

Solutions to Problems

An aspect of the present disclosure is an image processing apparatus including a predicted quantization parameter setting unit for setting a predicted quantization parameter for a current coding unit by using multiple quantization parameters which are set for multiple surrounding coding units located around the current coding unit which is target of coding processing, a difference quantization parameter setting unit for setting a difference quantization parameter indicating a difference value between the quantization parameter which is set for the current coding unit and the predicted quantization parameter which is set by the predicted quantization parameter setting unit, a coding unit for generating a bit stream by encoding quantization data obtained by quantizing the image data, and a transmission unit for transmitting the bit stream generated by the coding unit and the difference quantization parameter which is set by the difference quantization parameter setting unit.

The predicted quantization parameter setting unit may set the predicted quantization parameter by applying prediction calculation to multiple quantization parameters which are set for the multiple surrounding coding units.

The predicted quantization parameter setting unit may set the predicted quantization parameter as a median value of multiple quantization parameters which are set for the multiple surrounding coding units, by applying median calculation to the multiple quantization parameters which are set for the multiple surrounding coding units.

When all the multiple surrounding coding units are in available state, the predicted quantization parameter setting unit may apply the median calculation to the multiple quantization parameters which are set for the multiple surrounding coding units.

The predicted quantization parameter setting unit may set the predicted quantization parameter as an average value of multiple quantization parameters which are set for the multiple surrounding coding units, by applying average calculation to the multiple quantization parameters which are set for the multiple surrounding coding units.

When the determination unit determines that one of the surrounding coding units is in available state, the predicted quantization parameter setting unit may apply average calculation to the multiple quantization parameters which are set for the multiple surrounding coding units.

The predicted quantization parameter setting unit may set the predicted quantization parameter as weighted average value of multiple quantization parameters which are set for the multiple surrounding coding units, by applying weighted average calculation to multiple quantization parameters which are set for multiple surrounding coding units which are selected by the selection unit.

The predicted quantization parameter setting unit may set the weighted average calculation such that a larger weight is given to a surrounding coding unit having the same size as a size of the current coding unit.

The predicted quantization parameter setting unit may set the weighted average calculation in such a manner that a larger weight is given to a surrounding coding unit having a larger size.

With respect to a coding unit that has been coded, the multiple surrounding coding units may include a coding unit adjacent to a left side of the current coding unit, a coding unit adjacent to an upper side of the current coding unit, and a coding unit adjacent to an upper left side of the current coding unit.

The multiple surrounding coding units may further include a coding unit adjacent to an upper right side of the current coding unit and a coding unit adjacent to a lower left side of the current coding unit.

The image processing apparatus may further include a determination unit for determining whether the surrounding coding unit is in available state or not, wherein the predicted quantization parameter setting unit may change the method of the prediction calculation in accordance with a number of coding units which are determined to be available by the determination unit.

The image processing apparatus may further include a determination unit for determining whether a surrounding coding unit located within a current maximum coding unit is in available state or not when the predicted quantization parameter is set, wherein the predicted quantization parameter setting unit may set the predicted quantization parameter by using only a quantization parameter of a coding unit that is determined to be in available state by the determination unit.

When the current coding unit is located at the front of the current maximum coding unit, the predicted quantization parameter setting unit may set, as the predicted quantization parameter, a quantization parameter of a coding unit located at the last of the maximum coding unit immediately before.

The image processing apparatus may further include a setting unit for setting type data indicating a type of the prediction calculation, wherein the transmission unit may transmit the type data which are set by the setting unit.

The setting unit may set the type data for each maximum coding unit which is a coding unit in an uppermost layer or slice.

The transmission unit may transmit type data, which are set by the setting unit, as a parameter set of a bit stream generated by the coding unit.

An aspect of the present disclosure is an image processing method for an image processing apparatus including causing a predicted quantization parameter setting unit to set a predicted quantization parameter for a current coding unit by using multiple quantization parameters which are set for multiple surrounding coding units located around the current coding unit which is target of coding processing, causing a difference quantization parameter setting unit to set a difference quantization parameter indicating a difference value between the quantization parameter which is set for the current coding unit and the predicted quantization parameter which is set by the predicted quantization parameter setting unit, causing a coding unit to generate a bit stream by encoding quantization data obtained by quantizing the image data, and causing a transmission unit to transmit the generated bit stream and the difference quantization parameter which is set.

Another aspect of the present disclosure is an image processing apparatus including a receiving unit for receiving a difference quantization parameter indicating a difference value between a quantization parameter which is set for a current coding unit which is target of decoding processing and a predicted quantization parameter obtained by predicting from multiple quantization parameters which are set for multiple surrounding coding units located around the current coding unit, and a bit stream obtained by encoding image data, a quantization parameter setting unit for setting the quantization parameter of the current coding unit using the difference quantization parameter received from the receiving unit, and a decoding unit for generating image data by dequantizing a bit stream received from the receiving unit by using the quantization parameter which is set by the quantization parameter setting unit.

Another aspect of the present disclosure is an image processing method for an image processing apparatus including causing a receiving unit to receive a difference quantization parameter indicating a difference value between a quantization parameter which is set for a current coding unit which is target of decoding processing and a predicted quantization parameter obtained by predicting from multiple quantization parameters which are set for multiple surrounding coding units located around the current coding unit, causing a quantization parameter setting unit to set the quantization parameter of the current coding unit using the difference quantization parameter received from the receiving unit, and causing a decoding unit to generate image data by dequantizing a bit stream received from the receiving unit by using the quantization parameter which is set by the quantization parameter setting unit.

Still another aspect of the present disclosure is an image processing apparatus including a determination unit for determining whether multiple surrounding coding units located around a current coding unit which is target of coding processing is in available state or not when a predicted quantization parameter is set, a predicted quantization parameter setting unit for setting a predicted quantization parameter for the current coding unit by using only a quantization parameter of a coding unit that is determined to be in available state by the determination unit, a difference quantization parameter setting unit for setting a difference quantization parameter indicating a difference value between the quantization parameter which is set for the current coding unit and the predicted quantization parameter which is set by the predicted quantization parameter setting unit, a coding unit for generating a bit stream by encoding quantization data obtained by quantizing the image data, and a transmission unit for transmitting the bit stream generated by the coding unit and the difference quantization parameter which is set by the difference quantization parameter setting unit.

When the current coding unit is located at the front of the current maximum coding unit, the predicted quantization parameter setting unit may set, as the predicted quantization parameter, a quantization parameter of a coding unit located at the last of the maximum coding unit immediately before.

Still another aspect of the present disclosure is an image processing method for an image processing apparatus including causing a determination unit to determine whether multiple surrounding coding units located around a current coding unit which is target of coding processing is in available state or not when a predicted quantization parameter is set, causing a predicted quantization parameter setting unit to set a predicted quantization parameter for the current coding unit by using only a quantization parameter of a coding unit that is determined to be in available state by the determination unit, causing a difference quantization parameter setting unit to set a difference quantization parameter indicating a difference value between the quantization parameter which is set for the current coding unit and the predicted quantization parameter which is set by the predicted quantization parameter setting unit, causing a coding unit to generate a bit stream by encoding quantization data obtained by quantizing the image data, and causing a transmission unit to transmit the generated bit stream and the difference quantization parameter which is set.

Still another aspect of the present disclosure is an image processing apparatus including a receiving unit for receiving a difference quantization parameter indicating a difference value between a quantization parameter which is set for a current coding unit which is target of decoding processing and a predicted quantization parameter which is a prediction value of the quantization parameter, and a bit stream obtained by encoding image data, a determination unit for determining whether multiple surrounding coding units located around the current coding unit is in available state or not when the predicted quantization parameter is set, a predicted quantization parameter setting unit for setting a predicted quantization parameter for the current coding unit by using only a quantization parameter of a coding unit that is determined to be in available state by the determination unit, a quantization parameter generation unit for generating a quantization parameter of the current coding unit by adding the quantization parameter which is set for the current coding unit and the difference quantization parameter received by the receiving unit, a decoding unit for decoding the bit stream received by the receiving unit, and an inverse-quantization unit for dequantizing a quantization coefficient obtained when the decoding unit decodes the bit stream, by using the quantization parameter generated by the quantization parameter generation unit.

Still another aspect of the present disclosure is an image processing method for an image processing apparatus including causing a receiving unit to receive a difference quantization parameter indicating a difference value between a quantization parameter which is set for a current coding unit which is target of decoding processing and a predicted quantization parameter which is a prediction value of the quantization parameter, and a bit stream obtained by encoding image data, causing a determination unit to determine whether multiple surrounding coding units located around the current coding unit is in available state or not when the predicted quantization parameter is set, causing a predicted quantization parameter setting unit to set a predicted quantization parameter for the current coding unit by using only a quantization parameter of a coding unit that is determined to be in available state by the determination unit, causing a quantization parameter generation unit to generate a quantization parameter of the current coding unit by adding the quantization parameter which is set for the current coding unit and the difference quantization parameter received, causing a decoding unit to decode the bit stream received, and causing an inverse-quantization unit to dequantize a quantization coefficient obtained by decoding the bit stream, by using the quantization parameter generated.

In an aspect of the present disclosure, a predicted quantization parameter for a current coding unit is set by using multiple quantization parameters which are set for multiple surrounding coding units located around the current coding unit which is target of coding processing, a difference quantization parameter is set which indicates a difference value between the quantization parameter which is set for the current coding unit and the predicted quantization parameter which is set by the predicted quantization parameter setting unit, a bit stream is generated by encoding quantization data obtained by quantizing the image data, and the bit stream thus generated and the difference quantization parameter thus set are transmitted.

In another aspect of the present disclosure, a difference quantization parameter indicating a difference value between a quantization parameter which is set for a current coding unit which is target of decoding processing and a predicted quantization parameter obtained by predicting from multiple quantization parameters which are set for multiple surrounding coding units located around the current coding unit, and a bit stream obtained by encoding image data are received, the quantization parameter of the current coding unit is set using the difference quantization parameter thus received, and generating image data are generated by dequantizing a bit stream thus received by using the quantization parameter thus set.

In still another aspect of the present disclosure, a determination is made as to whether multiple surrounding coding units located around a current coding unit which is target of coding processing is in available state or not when a predicted quantization parameter is set, a predicted quantization parameter for the current coding unit is set by using only a quantization parameter of a coding unit that is determined to be in available state by the determination unit, a difference quantization parameter is set which indicates a difference value between the quantization parameter which is set for the current coding unit and the predicted quantization parameter which is set by the predicted quantization parameter setting unit, a bit stream is generated by encoding quantization data obtained by quantizing the image data, and the bit stream thus generated and the difference quantization parameter thus set are transmitted.

In still another aspect of the present disclosure, a difference quantization parameter indicating a difference value between a quantization parameter which is set for a current coding unit which is target of decoding processing and a predicted quantization parameter which is a prediction value of the quantization parameter, and a bit stream obtained by encoding image data are received, a determination is made as to whether multiple surrounding coding units located around the current coding unit is in available state or not when the predicted quantization parameter is set, a predicted quantization parameter for the current coding unit is set by using only a quantization parameter of a coding unit that is determined to be in available state by the determination unit, a quantization parameter of the current coding unit is set by adding the quantization parameter which is set for the current coding unit and the difference quantization parameter thus received, the bit stream thus received is decoded, and a quantization coefficient obtained by decoding the bit stream is dequantized by using the quantization parameter thus generated.

Effects of the Invention

According to the present disclosure, an image can be processed. In particular, the coding efficiency for quantization parameter can be improved.

BRIEF DESCRIPTION OF DRAWINGS

FIG. 20 is a figure illustrating an example of still another configuration of a quantization parameter coding unit.

FIG. 21 is a figure explaining an example of type data.

FIG. 24 is a figure illustrating an example of still another configuration of a quantization parameter decoding unit.

FIG. 25 is a figure explaining another example of type data.

MODES FOR CARRYING OUT THE INVENTION

Hereinafter, modes for carrying out the present disclosure (hereinafter referred to as embodiments) will be explained. It should be noted that the explanation will be made in the following order.
1. First embodiment (image coding device)
2. Second embodiment (image decoding device)

3. Third embodiment (calculation method selection)
4. Fourth embodiment (weighted average)
5. Fifth embodiment (setting of type of data)
6. Sixth embodiment (prediction in unit of LCU)
7. Seventh embodiment (multi-viewpoint image coding/multi-viewpoint image decoding device)
8. Eighth embodiment (hierarchical image coding/hierarchical image decoding device)
9. Ninth embodiment (example of application)

1. First Embodiment

[Image Coding Device]

Figure 1:
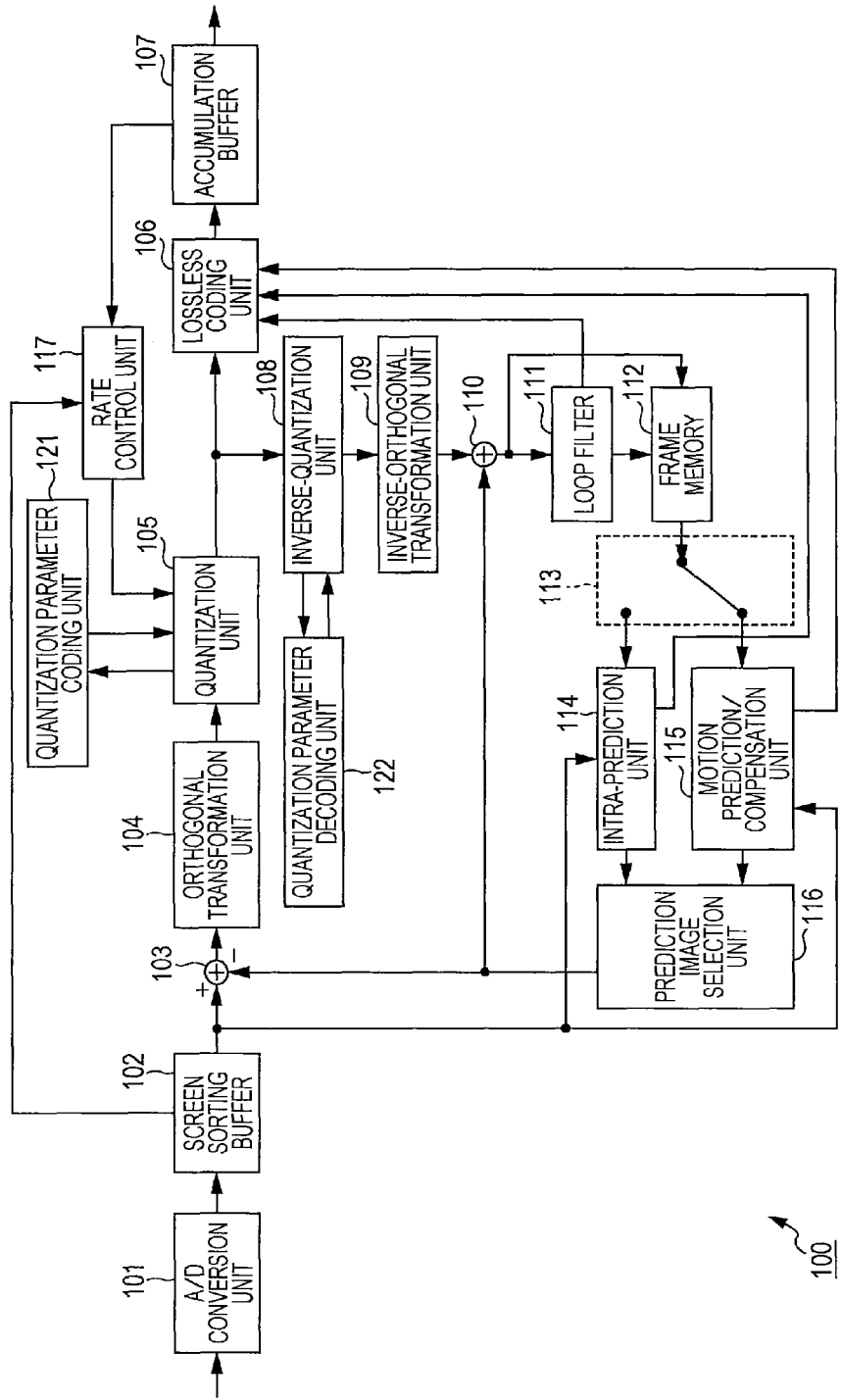
FIG. 1 is a block diagram illustrating an example of main configuration of an image coding device.

FIG. 1 is a block diagram illustrating an example of main configuration of an image coding device.

An image coding device 100 as illustrated in FIG. 1 encodes image data using prediction processing like H.264 and MPEG (Moving Picture Experts Group) 4 Part 10 (AVC (Advanced Video Coding)) coding method.

As illustrated in FIG. 1, the image coding device 100 includes an A/D conversion unit 101, a screen sorting buffer 102, a calculation unit 103, an orthogonal transformation unit 104, a quantization unit 105, a lossless coding unit 106, and an accumulation buffer 107. The image coding device 100 includes an inverse-quantization unit 108, an inverse-orthogonal transformation unit 109, a calculation unit 110, a loop filter 111, a frame memory 112, a selection unit 113, an intra-prediction unit 114, a motion prediction/compensation unit 115, a prediction image selection unit 116, and a rate control unit 117.

The image coding device 100 further includes a quantization parameter coding unit 121 and a quantization parameter decoding unit 122.

The A/D conversion unit 101 performs A/D conversion on received image data, and provides converted image data (digital data) to the screen sorting buffer 102 to store the image data therein. The screen sorting buffer 102 sorts images of frames in the stored display order into the order of frames for coding in accordance with GOP (Group Of Picture), and provides the images of which frame order has been sorted to the calculation unit 103. The screen sorting buffer 102 also provides the images of which frame order has been sorted to the intra-prediction unit 114 and the motion prediction/compensation unit 115.

The calculation unit 103 subtracts a prediction image, which is provided from the intra-prediction unit 114 or the motion prediction/compensation unit 115 via the prediction image selection unit 116, from an image read from the screen sorting buffer 102, and outputs difference information thereof to the orthogonal transformation unit 104.

For example, in a case of an inter-coded image, the calculation unit 103 subtracts a prediction image, which is provided from the motion prediction/compensation unit 115, from an image read from the screen sorting buffer 102.

The orthogonal transformation unit 104 applies orthogonal transformation such as discrete cosine transform and Karhunen-Loeve conversion on difference information provided from the calculation unit 103. It should be noted that the method of this orthogonal transformation may be any method. The orthogonal transformation unit 104 provides conversion coefficients to the quantization unit 105.

The quantization unit 105 quantizes the conversion coefficients from the orthogonal transformation unit 104. The quantization unit 105 sets and quantizes the quantization parameter on the basis of information about a target value of the amount of codes provided from the rate control unit 117. It should be noted that the method of quantization may be any method. The quantization unit 105 provides the quantized conversion coefficients to the lossless coding unit 106.

The lossless coding unit 106 encodes the conversion coefficients quantized by the quantization unit 105 using any coding method. The coefficient data are quantized under the control of the rate control unit 117, and therefore, the amount of codes becomes a target value set by the rate control unit 117 (or becomes close to the target value).

The lossless coding unit 106 obtains information indicating mode of intra-prediction and the like from the intra-prediction unit 114, and obtains information indicating mode of inter-prediction, motion vector information, and the like from the motion prediction/compensation unit 115. Further, the lossless coding unit 106 obtains filter coefficients and the like used by the loop filter 111.

The lossless coding unit 106 encodes various kinds of information as described above using any coding method, and makes them into a part of header information of coded data (multiplexing). The lossless coding unit 106 provides the coded data obtained from coding to the accumulation buffer 107 to accumulate the coded data therein.

Examples of coding methods of the lossless coding unit 106 include variable length coding or arithmetic coding. An example of variable length coding includes CAVLC (Context-Adaptive Variable Length Coding) and the like defined in H.264/AVC method. An example of arithmetic coding includes CABAC (Context-Adaptive Binary Arithmetic Coding).

The accumulation buffer 107 temporarily holds coded data provided by the lossless coding unit 106. With predetermined timing, the accumulation buffer 107 outputs the coded data held therein, as a bit stream, to, for example, a recording device (recording medium), a transmission path, and the like, not shown, provided in a later stage.

The conversion coefficients quantized by the quantization unit 105 is also provided to the inverse-quantization unit 108. The inverse-quantization unit 108 dequantizes the quantized conversion coefficients according to a method corresponding to the quantization by the quantization unit 105. The method of the inverse-quantization may be any method as long as it is a method corresponding to the quantization processing by the quantization unit 105. The inverse-quantization unit 108 provides the obtained conversion coefficients to the inverse-orthogonal transformation unit 109.

The inverse-orthogonal transformation unit 109 performs inverse-orthogonal transformation on the conversion coefficients provided by the inverse-quantization unit 108 according to a method corresponding to the orthogonal transformation processing by the orthogonal transformation unit 104. The method of the inverse-orthogonal transformation may be any method as long as it is a method corresponding to the orthogonal transformation processing by the orthogonal transformation unit 104. The output obtained from the inverse-orthogonal transformation (restored difference information) is provided to the calculation unit 110.

The calculation unit 110 adds a prediction image, which is provided from the intra-prediction unit 114 or the motion prediction/compensation unit 115 via the prediction image selection unit 116, to the inverse-orthogonal transformation result provided from the inverse-orthogonal transformation unit 109, i.e., restored difference information, and obtains locally decoded image (decoded image). The decoded image is provided to the loop filter 111 or the frame memory 112.

The loop filter 111 includes a deblock filter, an adaptive loop filter, and the like, and applies filter processing to the decoded image provided from the calculation unit 110 as necessary. For example, the loop filter 111 applies deblock filter processing to the decoded image to remove block noise from the decoded image. For example, the loop filter 111 applies loop filter processing to the deblock filter processing result (decoded image from which only the block noise has been removed) using Wiener Filter, thus improving the image equality.

It should be noted that the loop filter 111 may apply any given filter processing to the decoded image. As necessary, the loop filter 111 provides information such as filter coefficients used in the filter processing to the lossless coding unit 106 to have the lossless coding unit 106 encode it.

The loop filter 111 provides filter processing result (decoded image obtained from the filter processing) to the frame memory 112. As described above, the decoded image which is output from the calculation unit 110 can be provided to the frame memory 112 without relying on the loop filter 111. More specifically, the filter processing based on the loop filter 111 can be omitted.

The frame memory 112 stores the provided decoded image, and with predetermined timing, provides the stored decoded image to the selection unit 113 as a reference image.

The selection unit 113 selects the destination of the reference image provided from the frame memory 112. For example, in a case of inter-prediction, the selection unit 113 provides the reference image, which is provided from the frame memory 112, to the motion prediction/compensation unit 115.

The intra-prediction unit 114 uses pixel values in a processing target picture which is a reference image provided from the frame memory 112 via the selection unit 113 to perform intra-prediction (prediction within screen) for generating a prediction image by basically adopting a prediction unit (PU) as a processing unit. The intra-prediction unit 114 performs this intra-prediction with multiple modes prepared in advance (intra-prediction modes).

The intra-prediction unit 114 generates prediction images with all the intra-prediction modes which can be candidates, and uses an input image provided from the screen sorting buffer 102 to evaluate cost function value of each prediction image, thus selecting the optimum mode. When the optimum intra-prediction mode is selected, the intra-prediction unit 114 provides the prediction image generated with the optimum mode to the prediction image selection unit 116.

As described above, the intra-prediction unit 114 provides intra-prediction mode information and the like indicating the employed intra-prediction mode to the lossless coding unit 106 as necessary, and have the lossless coding unit 106 to perform encoding.

The motion prediction/compensation unit 115 uses the input image provided from the screen sorting buffer 102 and the reference image provided via the selection unit 113 from the frame memory 112 to perform motion prediction (inter-prediction) by basically adopting the PU as a processing unit, performs motion compensation processing in accordance with a detected motion vector, and generates a prediction image (inter-prediction image information). The motion prediction/compensation unit 115 performs such inter-prediction with multiple modes prepared in advance (inter-prediction mode).

The motion prediction/compensation unit 115 generates prediction images with all the inter-prediction modes which can be candidates, and evaluates cost function value of each prediction image, thus selecting the optimum mode. When the optimum inter-prediction mode is selected, the motion prediction/compensation unit 115 provides the prediction image generated with the optimum mode to the prediction image selection unit 116.

The motion prediction/compensation unit 115 provides the lossless coding unit 106 with information indicating the employed inter-prediction mode, information required to perform processing with the inter-prediction mode when the coded data are decoded, and the like, and have the lossless coding unit 106 perform encoding.

The prediction image selection unit 116 selects the source of the prediction image provided to the calculation unit 103 and the calculation unit 110. For example, in a case of inter-coding, the prediction image selection unit 116 selects the motion prediction/compensation unit 115 as a source of prediction image, and provides a prediction image, which is provided from the motion prediction/compensation unit 115 to the calculation unit 103 and the calculation unit 110.

The rate control unit 117 controls the rate of the quantization operation of the quantization unit 105 so as not to cause overflow and underflow, on the basis of the amount of codes of the coded data accumulated in the accumulation buffer 107.

The quantization parameter coding unit 121 obtains a quantization parameter of a current area which is a processing target (which is also referred to as attention area) and a quantization parameter of a surrounding area around the current area from the quantization unit 105, calculates difference therebetween, returns the difference back to the quantization unit 105, and have the lossless coding unit 106 encode and transmit it. The quantization parameter coding unit 121 also provides the difference via the inverse-quantization unit 108 to the quantization parameter decoding unit 122.

The quantization parameter decoding unit 122 uses the difference of quantization parameters in the current area and the surrounding area provided from the quantization parameter coding unit 121 and quantization parameter of the surrounding area restructured in the past to restructure the quantization parameter in the current area, and provides the restructured quantization parameter to the inverse-quantization unit 108. The inverse-quantization unit 108 uses the quantization parameter to perform inverse-quantization.

[Macro Block]

Figure 2:
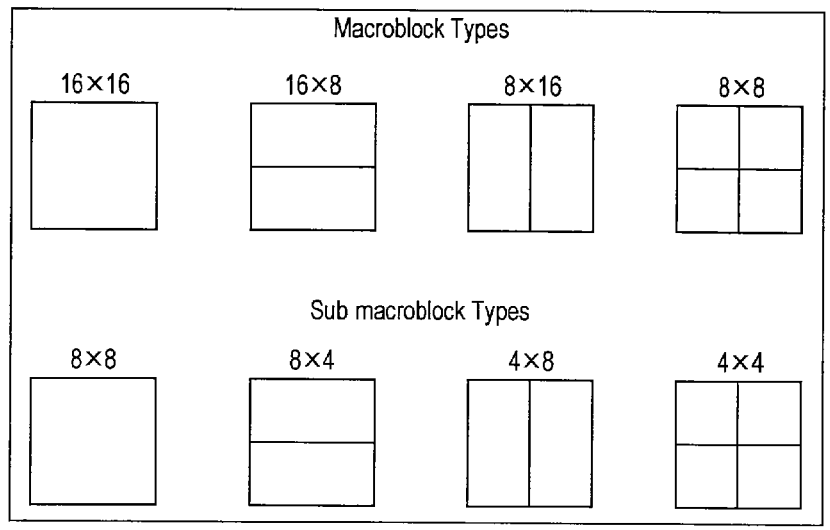
FIG. 2 is a figure illustrating an example of a macro block.

By the way, in the AVC coding method, as illustrated in FIG. 2, one macro block is divided into multiple motion compensation blocks, and different motion information may be given to each of them.

More specifically, a macro block including 16 by 16 pixels can be divided into any one of partitions, i.e., 16 by 16, 16 by 8, 8 by 16, and 8 by 8.

Further, a partition of 8 by 8 can be divided into any one of sub-partitions, i.e., 8 by 8, 8 by 4, 4 by 8, and 4 by 4. As described above, each area obtained by dividing a macro block into multiple pieces is referred to as a sub-macro block.

By the way, the macro block size of 16 pixels by 16 pixels is not suitable for a large image frame such as UHD, which is a target of next-generation coding method. Accordingly, as illustrated in FIG. 3, Non-Patent Document 1 and the like suggest to make the macro block size into a size such as 64 by 64 pixels and 32 pixels by 32 pixels.

Figure 3:
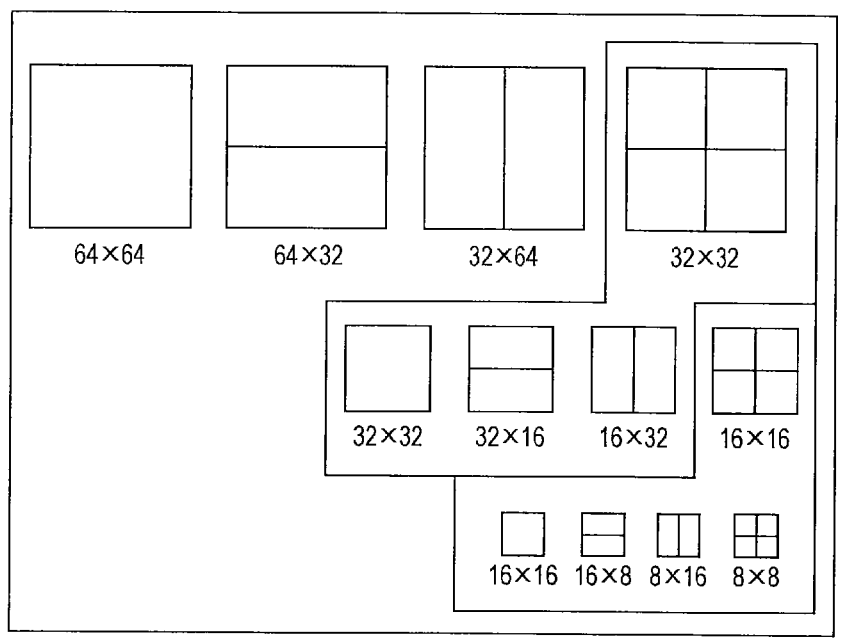
FIG. 3 is a figure illustrating another example of a macro block.

More specifically, in Non-Patent Document 1, a hierarchical structure as illustrated in FIG. 3 is employed, and for a pixel block having 16 by 16 pixels or less, a larger block is defined as a super set thereto while maintaining compatibility with a macro block of current AVC.

Non-Patent Document 1 is a suggestion for applying an extended macro block (extended partial area) to inter-slice, but Non-Patent Document 2 suggests to apply extended macro block (extended partial area) to intra-slice. In the explanation below, the macro block thus extended is also referred to as an extended macro block.

[Coding Unit]

By the way, making a macro block size of 16 pixels by 16 pixels is not suitable for a large image frame such as UHD (Ultra High Definition; 4000 pixels by 2000 pixels) which is a target of next-generation coding method.

Figure 4:
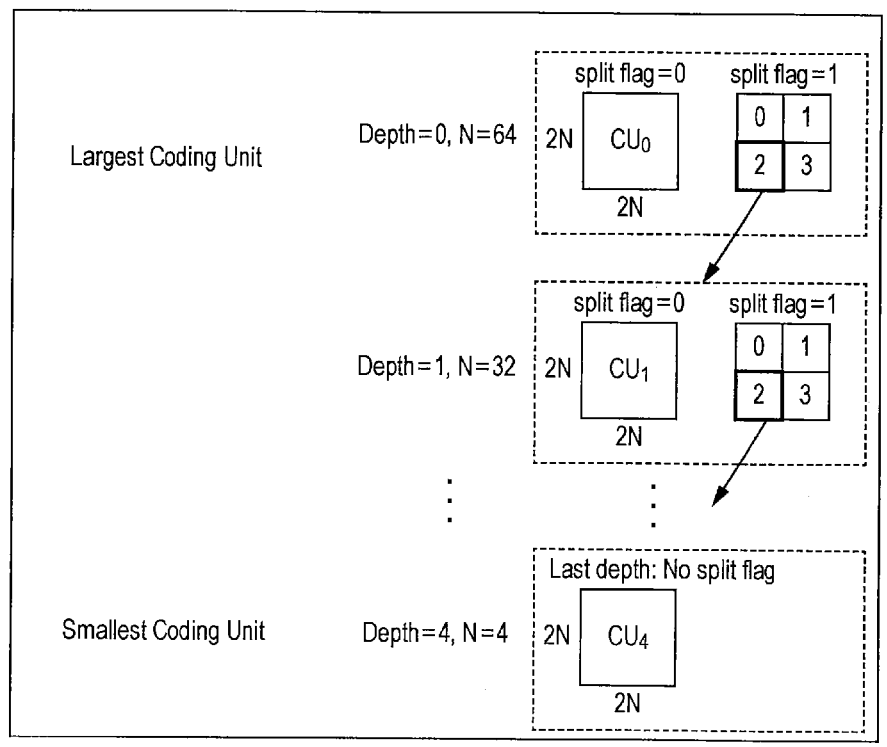
FIG. 4 is a figure illustrating an example of configuration of a coding unit.

Therefore, in the AVC, as illustrated in FIG. 2, a hierarchical structure of macro blocks and sub-macro blocks is defined. For example, in HEVC (High Efficiency Video Coding), Coding Unit (CU) is defined as illustrated in FIG. 4.

The CU is also referred to as a Coding Tree Block (CTB), and is a partial area of an image of picture unit, which is a counterpart of the macro block in AVC. In the latter, the size is fixed to 16 by 16 pixels, but in the former, the size is not fixed, and in each sequence, the size is designated in image compression information.

For example, in Sequence Parameter Set (SPS) included in the coded data which are to be output, the maximum size of the CU (LCU (Largest Coding Unit)) and the minimum size thereof ((SCU (Smallest Coding Unit)).

In each LCU, split-flag is 1 as long as the size is not less than the size of SCU, and accordingly, it is possible to divide a CU into CUs of a smaller size. In the example of FIG. 4, the size of the LCU is 128, and the maximum hierarchical depth is 5. When the value of split_flag is "1", a CU of which size is 2N by 2N is divided into CUs of which size is N by N, which is a hierarchy in one level below.

Further, the CU is divided into Prediction Units (PUs), which are areas serving as processing unit of intra- or interprediction (partial areas of image of picture unit), and divided into Transform Units (TUs) which are areas serving as processing unit of orthogonal transformation (partial areas of image of picture unit). Currently, in the HEVC, in addition to 4 by 4 and 8 by 8, it is possible to use orthogonal transformation of 16 by 16 and 32 by 32.

In a case of coding method for defining CU and performing various kinds of processing by adopting the CU as a unit just like HEVC explained above, the macro block in the AVC is considered to correspond to the LCU. However, as illustrated in FIG. 4, the CU has the hierarchical structure, and therefore, the size of the LCU in the highest level in the hierarchy is generally set as, for example, 128 by 128 pixels, which is larger than the macro block of AVC.

The present disclosure can also be applied to a coding method using such CU, PU, TU, and the like instead of the macro block. More specifically, processing unit on which quantization processing is performed may be any given area. That is, in the explanation below, a current area which is a processing target of quantization processing (which may also be referred to as area of interest or attention area) and a surrounding area which is an area located around the current area include not only such macro block and sub-macro block but also all data units such as LCU, CU, SCU, PU, and TU.

By the way, a quantization parameter QP is used to encode a difference of quantization parameter used for coding of a previous block, but in particular, when quantization parameter are dynamically changed within a screen just like adaptive quantization, the amount of information in the image compression information may be increased.

Figure 5:
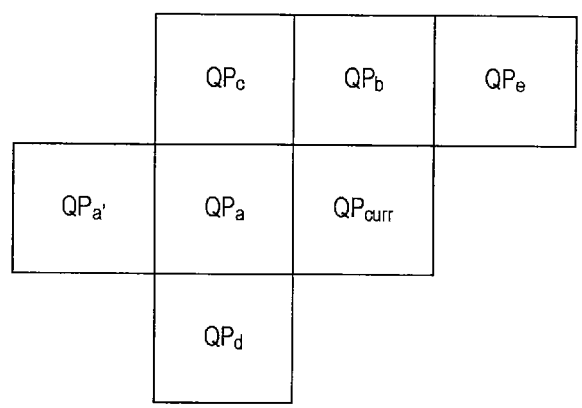
FIG. 5 is a figure explaining prediction of quantization parameter.

Accordingly, for example, as illustrated in FIG. 5, the quantization parameter coding unit 121 predicts the quantization parameter of the current area which is processing target (for example, current coding unit on the basis of the quantization parameter of the surrounding area like FIG. 5 (for example, surrounding coding unit), and calculates a difference value between the prediction value and the actual value of the quantization parameter in the current area. This difference value is encoded and transmitted to the decoding side. As described above, the image coding device 100 can reduce the amount of codes of the quantization parameters, and can improve the coding efficiency.

[Quantization Unit, Rate Control Unit, and Quantization Parameter Coding Unit]

Figure 6:
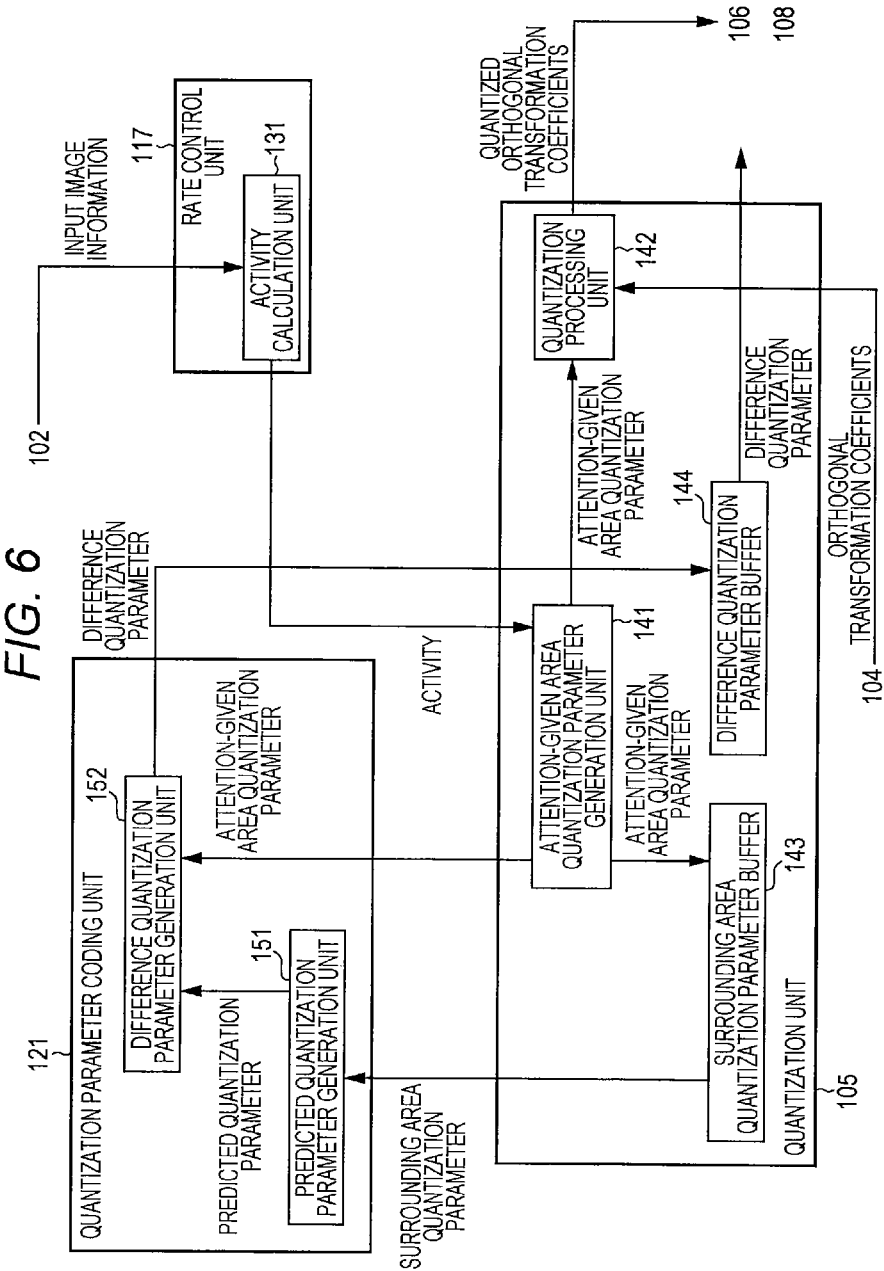
FIG. 6 is a figure illustrating an example of main configuration of a quantization unit, a rate control unit, and a quantization parameter coding unit.

Subsequently, each unit in the image coding device 100 will be explained. FIG. 6 is a block diagram illustrating an example of main configuration of the quantization unit 105, the rate control unit 117, and the quantization parameter coding unit 121.

As illustrated in FIG. 6, the rate control unit 117 has an activity calculation unit 131. The quantization unit 105 includes an attention area quantization parameter generation unit 141, a quantization processing unit 142, a surrounding area quantization parameter buffer 143, and a difference quantization parameter buffer 144.

Further, the quantization parameter coding unit 121 includes a predicted quantization parameter generation unit 151 and a difference quantization parameter generation unit 152.

The activity calculation unit 131 obtains input image information from the screen sorting buffer 102, and calculates the activity thereof according to, for example, code amount control method defined in MPEG2 TestModel ("TestModel5", ISO/IEC, JTC/SC29/WG11/N0400, 1993), and provides the activity to the attention area quantization parameter generation unit 141.

The attention area quantization parameter generation unit 141 calculates the quantization parameter for the current area (attention area) (attention area quantization parameter) on the basis of the provided activity. The attention area quantization parameter generation unit 141 provides the calculated attention area quantization parameter to the quantization processing unit 142.

The quantization processing unit 142 uses the attention area quantization parameter to quantize the orthogonal transformation coefficients provided by the orthogonal transformation unit 104, provides the quantized orthogonal transformation coefficients to the lossless coding unit 106, and has the lossless coding unit 106 perform encoding and transmission to the decoding side.

The quantization processing unit 142 also provides the quantized orthogonal transformation coefficients to the inverse-quantization unit 108.

The attention area quantization parameter generation unit 141 also provides the calculated attention area quantization parameter to the surrounding area quantization parameter buffer 143.

The surrounding area quantization parameter buffer 143 stores the provided attention area quantization parameter. In processing adopting, as the current area, another area processed after the current area, the surrounding area quantization parameter buffer 143 provides the stored attention area quantization parameter to the predicted quantization parameter generation unit 151 as the quantization parameter of the surrounding area (surrounding area quantization parameter).

The predicted quantization parameter generation unit 151 selects multiple surrounding areas of the current area, and reads the quantization parameter of each surrounding area from the surrounding area quantization parameter buffer 143 as surrounding area quantization parameter. The predicted quantization parameter generation unit 151 uses them to generate a prediction value of the quantization parameter of the current area (predicted quantization parameter). For example, predicted quantization parameter generation unit 151 performs median operation using multiple surrounding area quantization parameters to adopt the median value thereof as the predicted quantization parameter. The predicted quantization parameter generation unit 151 provides the predicted quantization parameter thus generated to the difference quantization parameter generation unit 152.

Further, the attention area quantization parameter generation unit 141 also provides the calculated attention area quantization parameter to the difference quantization parameter generation unit 152.

The difference quantization parameter generation unit 152 generates difference (difference quantization parameter) between the attention area quantization parameter obtained from the attention area quantization parameter generation unit 141 and the predicted quantization parameter obtained from the predicted quantization parameter generation unit 151. The difference quantization parameter generation unit 152 provides the generated difference quantization parameter to the difference quantization parameter buffer 144.

The difference quantization parameter buffer 144 stores the provided difference quantization parameter, and with predetermined timing or in response to occurrence of a predetermined event, the difference quantization parameter buffer 144 provides the difference quantization parameter to the lossless coding unit 106 to have the lossless coding unit 106 perform encoding and transmission to the decoding side.

The difference quantization parameter buffer 144 also provides the difference quantization parameter to the inverse-quantization unit 108.

The inverse-quantization unit 108 generates the attention area quantization parameter by causing the quantization parameter decoding unit 122 to decode the difference quantization parameter, and uses the attention area quantization parameter to dequantize the quantized orthogonal transformation coefficient obtained from the quantization processing unit 142.

The details of the inverse-quantization unit 108 and the quantization parameter decoding unit 122 will be explained later in the explanation about the image decoding device. Alternatively, the attention area quantization parameter generation unit 141 may provide the attention area quantization parameter to the inverse-quantization unit 108, and the inverse-quantization unit 108 may use the attention area quantization parameter to dequantize the quantized orthogonal transformation coefficient. In this case, the quantization parameter decoding unit 122 can be omitted.

As described above, each unit performs processing, and accordingly the image coding device 100 can improve the coding efficiency of the quantization parameter.

[Encoding of Quantization Parameter]

Subsequently, encoding of the quantization parameter will be explained more specifically.

In general, the texture of the current area (attention area) which is the processing target is considered to be correlation with the texture of any one of the surrounding areas located thereto around. By using this fact, information required for quantization parameter can be reduced.

An example of current area and surrounding area will be illustrated in FIG. 5. In FIG. 5, each rectangle represents an area of quantization processing unit, and the rectangle of $QP_{curr}$ represents the current area. $QP_{curr}$ denotes the quantization parameter of the current area.

Likewise, the rectangle of $QP_a$ represents a surrounding area A adjacent to the left side of the current area, and $QP_a$ denotes the quantization parameter of the surrounding area A. The rectangle of $QP_b$ represents a surrounding area B adjacent to the upper side of the current area, and $QP_1$ denotes the quantization parameter of the surrounding area B. The rectangle of $QP_c$ represents a surrounding area C adjacent to the upper left side of the current area, and $QP_c$ denotes the quantization parameter of the surrounding area C. The rectangle of $QP_d$ represents a surrounding area D adjacent to the lower left side of the current area, and $QP_d$ denotes the quantization parameter of the surrounding area D. The rectangle of $QP_e$ represents a surrounding area E adjacent to the upper right side of the current area, and $QP_e$ denotes the quantization parameter of the surrounding area E. Further, the rectangle of $QP_{e}$ represents a surrounding area A' adjacent to the left side of the current area, and $QP_{a'}$ denotes the quantization parameter of the surrounding area A'.

It should be noted that when the quantization unit 105 calculates the quantization parameter $QP_{curr}$ of the current area, the quantization parameters $QP_a$, $QP_b$, $QP_c$, $QP_d$, $QP_e$, and $QP_{a'}$ of the surrounding area are already calculated.

The quantization parameter $QP_{curr}$ of the current area is considered to have high degree of correlation with any one of $QP_a$, $QP_b$, and $QP_c$ which are the quantization parameters of the surrounding areas in proximity to the current area. Accordingly, first, the quantization parameter coding unit 121 generates the prediction value PredQP of the quantization parameter $QP_{curr}$ of the current area from the quantization parameters $QP_a$, $QP_b$, and $QP_c$ according to, for example, the following expression (1).

$$\text{Pred}QP=Med(QP_a,QP_b,QP_c) \quad (1)$$

Subsequently, the quantization parameter coding unit 121 subtracts the prediction value PredQP from the quantization parameter $QP_{curr}$ and obtains the difference quantization parameter dQP as illustrated in the following expression (2).

$$dQP=QP_{curr}-\text{Pred}QP \quad (2)$$

The difference quantization parameter dQP is transmitted to the decoding side. More specifically, the image coding device 100 transmits the difference quantization parameter dQP obtained by subtracting the prediction value PredQP instead of the quantization parameter $OP_{curr}$, thus reducing the amount of codes of the quantization parameter.

The quantization parameter used to calculate the prediction value PredQP may be of an area other than the surrounding area A to the surrounding area C as long as it is already calculated. For example, the quantization parameters $QP_d$ and $QP_e$ may be used to calculate the prediction value PredQP. The quantization parameter $QP_{a'}$ of the surrounding area not adjacent to the current area may be used to obtain the prediction value PredQP. Further, the prediction value PredQP may be obtained using the quantization parameter of a surrounding area other than what has been described above. For example, instead of the quantization parameters of areas located around the current area in terms of space as described above (spatial surrounding area), the prediction value PredQP may be obtained using the quantization parameter of an area around the current area in terms of time such as co-located area of the reference frame (temporal surrounding area). Further, the prediction value PredQP may be obtained using both of the quantization parameter of the spatial surrounding area and the quantization parameter of the temporal surrounding area.

When the quantization parameter $QP_{a'}$ is used, for example, instead of the quantization parameter $QP_a$ to calculate the prediction value PredQP, calculation processing for calculating the prediction value PredQP of the quantization parameter of the current area can be started without waiting for the coding processing of the surrounding area adjacent to the current area (or decoding processing), and therefore, fast processing can be achieved. The same can be said when the quantization parameter of the temporal surrounding area is used.

The calculation method of the prediction value PredQP may be any method, and may be methods other than the median explained above. For example, an average value of all or some of the quantization parameters of the surrounding areas may be adopted as the prediction value PredQP.

In general, the texture of the current area often has high degree of correlation with the texture of any one of the surrounding areas, and is less likely to have high degree of correlation with the textures of multiple surrounding areas.

For example, when there are images of two objects having different textures from each other in proximity to the current area, the image of current area is likely to be an image of any one of the objects. In this case, the texture of the current area has high degree of correlation with the texture of the surrounding area where one of the objects exist and has low degree of correlation with the texture of the surrounding area where the other of the objects exists. In such case, the texture of the current area is less likely to have high degree of correlation with the average of the texture of the surrounding area where one of the objects exists and the texture of the surrounding area where the other of the objects exists.

Therefore, in general, the accuracy of prediction of the prediction value PredQP would be improved with median.

However, for example, when an image has gradation in which texture gradually changes, the texture of the current area is likely to have high degree of correlation with the average of the textures of two surrounding areas existing in such a manner as to sandwich the current area. In such case, the accuracy of prediction of the prediction value PredQP would be easily improved with average.

It should be noted that, with average, the calculation processing would become easy, and the load of calculation is lower.

It is desired to employ optimum calculation method in view of difference of features of each calculation as described above. Alternatively, multiple calculation methods may be prepared, and may be selected in an adaptive manner.

Further, the quantization parameter coding unit 121 generates flag information (flag) indicating whether to transmit the difference quantization parameter dQP explained above, and may transmit the flag information to the decoding side.

In this case, for example, the quantization parameter coding unit 121 stores the flag information at a predetermined position of bit stream such as slice header and has it transmitted as the bit stream to the decoding side. The decoding side looks up the flag information, and, for example, if flag=1 holds, the decoding side determines that the difference quantization parameter dQP is received, and accordingly, obtains the prediction value PredQP according to the calculation explained above, and obtains the quantization parameter $QP_{curr}$ of the current area according to the calculation explained above. When flag=0 holds, coding/decoding processing of dQP according to a conventional method is performed, like the one used in the AVC.

As described above, the flag information is transmitted, which allows the decoding side to cope with multiple methods. Therefore, the coding side can select and apply the most suitable method from among multiple methods. Accordingly, the image coding device 100 can further reduce the amount of codes for the quantization parameter.

When a frame is divided into multiple slices, and each slice is processed independently from each other, the quantization parameter coding unit 121 may maintain independence of processing of each slice, and may calculate the prediction value PredQP using only the surrounding area which belongs to current slice (attention-given slice) including the current area so as not to cause unnecessary delay. In such case, without using surrounding areas located outside of the current slice, and the number of quantization parameters used for calculation of the prediction value PredQP may be reduced accordingly. Alternatively, the quantization parameter of other surrounding areas processed within the current slice may be used instead of the quantization parameter of the surrounding area located outside of the current slice.

In MPEG2 and AVC, the coding processing is performed while the difference quantization parameter dQP is difference between the quantization parameter of the current area and the quantization parameter used for coding processing or decoding processing immediately before, i.e., difference between $QP_a$ and $QP_{curr}$ in the example of FIG. 5. However, the correlation between the current area and the surrounding area A may not be necessarily high. Therefore, the accuracy of prediction may be reduced when such fixed processing is performed.

In contrast, the quantization parameter coding unit 121 performs prediction using the quantization parameter of multiple surrounding areas, so that the difference quantization parameter dQP can be calculated using the quantization parameter which is considered to have the highest degree of correlation. More specifically, a higher compression rate can be achieved as compared with what is suggested by MPEG2 and AVC.

In the method explained above, it is not necessary to change syntax concerning dQP of the image compression information, and the method can be achieved only by changing the coding and decoding method. Therefore, the method can be easily applied to existing coding device and decoding device with a slight change.

[Flow of Coding Processing]

Subsequently, the flow of each processing executed by the image coding device 100 explained above will be explained. First, an example of flow of coding processing will be explained with reference to the flowchart of FIG. 7.

In step S101, the A/D conversion unit 101 performs A/D conversion on a received image. In step S102, the screen sorting buffer 102 stores images that have been subjected to the A/D conversion, and sorts them from the order in which pictures are displayed into the order in which they are encoded.

In step S103, the intra-prediction unit 114 performs the intra-prediction processing of the intra-prediction mode. In step S104, the motion prediction/compensation unit 115 performs inter-motion prediction processing for performing motion prediction and motion compensation in the inter-prediction mode.

In step S105, the prediction image selection unit 116 determines the optimum mode on the basis of each cost function value which is output from the intra-prediction unit 114 and the motion prediction/compensation unit 115. More specifically, the prediction image selection unit 116 selects any one of the prediction image generated by the intra-prediction unit 114 and the prediction image generated by the motion prediction/compensation unit 115.

In step S106, the calculation unit 103 calculates difference between the image sorted in the processing in step S102 and the prediction image selected in the processing in step S105. The amount of data of the difference data is reduced as compared with the original image data. Therefore, the amount of data can be compressed as compared with a case where an image is compressed as it is.

In step S107, the orthogonal transformation unit 104 performs orthogonal transformation on difference information generated by the processing in step S106. More specifically, orthogonal transformation such as discrete cosine transform and Karhunen-Loeve conversion and like is performed and, conversion coefficients are output.

In step S108, the quantization unit 105 quantizes the orthogonal transformation coefficients obtained in the processing in step S107.

As a result of the processing in step S108, the quantized difference information is locally decoded as follows. More specifically, in step S109, the inverse-quantization unit 108 dequantizes the quantized orthogonal transformation coefficient generated in the processing in step S108 (which may also referred to as quantization coefficients) according to the characteristics corresponding to the characteristics of the quantization unit 105. In step S110, the inverse-orthogonal transformation unit 109 performs inverse-orthogonal transformation on the orthogonal transformation coefficients obtained the processing in step S107 according to the characteristics corresponding to the characteristics of the orthogonal transformation unit 104.

In step S111, the calculation unit 110 adds the prediction image to difference information locally decoded, and generates a locally decoded image (image corresponding to input to the calculation unit 103). In step S112, as necessary, the loop filter 111 applies loop filter processing including deblock filter processing, adaptive loop filter processing, and the like, to the decoded image obtained in the processing in step S111.

In step S113, the frame memory 112 stores the decoded image to which the loop filter processing is applied in the processing in step S112. It should be noted that the frame memory 112 also receives an image to which filter processing is not applied by the loop filter 111 from the calculation unit 110, and stores such image.

In step S114, the lossless coding unit 106 encodes the conversion coefficients quantized in the processing in step S108. More specifically, lossless coding such as variable length coding and arithmetic coding is applied to the difference image.

The lossless coding unit 106 encodes the quantization parameters calculated in step S108, and adds them to the coded data. The lossless coding unit 106 encodes information about the prediction mode of the prediction image selected in the processing in step S105, and adds the information to the coded data obtained by encoding the difference image. More specifically, the lossless coding unit 106 encodes, e.g., the optimum intra-prediction mode information provided from the intra-prediction unit 114 or information according to the optimum inter-prediction mode provided from the motion prediction/compensation unit 115, and adds the information to the coded data.

In step S115, the accumulation buffer 107 accumulates the coded data obtained in the processing in step S114. The coded data accumulated in the accumulation buffer 107 are read as necessary, and transmitted to the decoding side via the transmission path and the recording medium.

In step S116, the rate control unit 117 controls the rate of the quantization operation of the quantization unit 105 so as not to cause overflow and underflow, on the basis of the amount of codes of the coded data accumulated in the accumulation buffer 107 (the amount of codes generated) in the processing in step S115.

When the processing in step S116 is finished, the coding processing is terminated.

[Flow of Quantization Processing]

Subsequently, an example of flow of the quantization processing executed in step S108 of FIG. 7 will be explained with reference to the flowchart of FIG. 8.

When the quantization processing is started, the activity calculation unit 131 calculates the activity of the current area in step S131.

In step S132, the attention area quantization parameter generation unit 141 generates an attention area quantization parameter on the basis of the activity calculated in step S131.

In step S133, the surrounding area quantization parameter buffer 143 stores the attention area quantization parameter generated in step S132.

In step S134, the quantization processing unit 142 uses the attention area quantization parameter generated in step S132 to quantizes the orthogonal transformation coefficients of the current area.

In step S135, the predicted quantization parameter generation unit 151 generates a predicted quantization parameter.

In step S136, the difference quantization parameter generation unit 152 generates a difference quantization parameter which is difference between the attention area quantization parameter generated in step S132 and the predicted quantization parameter generated in step S135.

Figure 7:
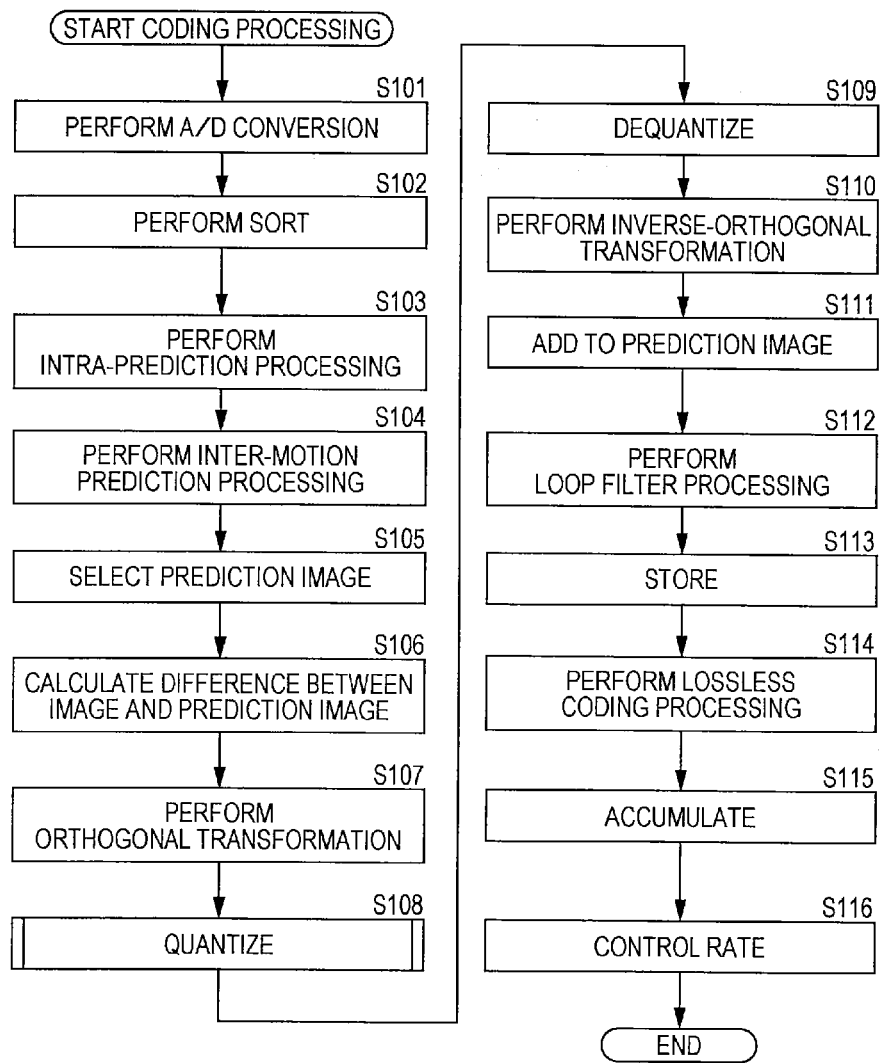
FIG. 7 is a flowchart explaining an example of a flow of coding processing.

When the difference quantization parameter is generated, the difference quantization parameter generation unit 152 terminates the quantization processing, and returns the processing back to FIG. 7.

[Flow of Predicted Quantization Parameter Generation Processing]

Subsequently, an example of flow of predicted quantization parameter generation processing executed in step S135 of FIG. 8 will be explained with reference to the flowchart of FIG. 9.

In step S151, the predicted quantization parameter generation unit 151 selects multiple surrounding areas for which candidates of predicted quantization parameters are obtained.

In step S152, the predicted quantization parameter generation unit 151 reads the surrounding area quantization parameter of each surrounding area thus selected, from the surrounding area quantization parameter buffer 143.

In step S153, for example, the predicted quantization parameter generation unit 151 performs median prediction on multiple surrounding area quantization parameters obtained in step S152, and adopts a median value as a predicted quantization parameter.

Figure 8:
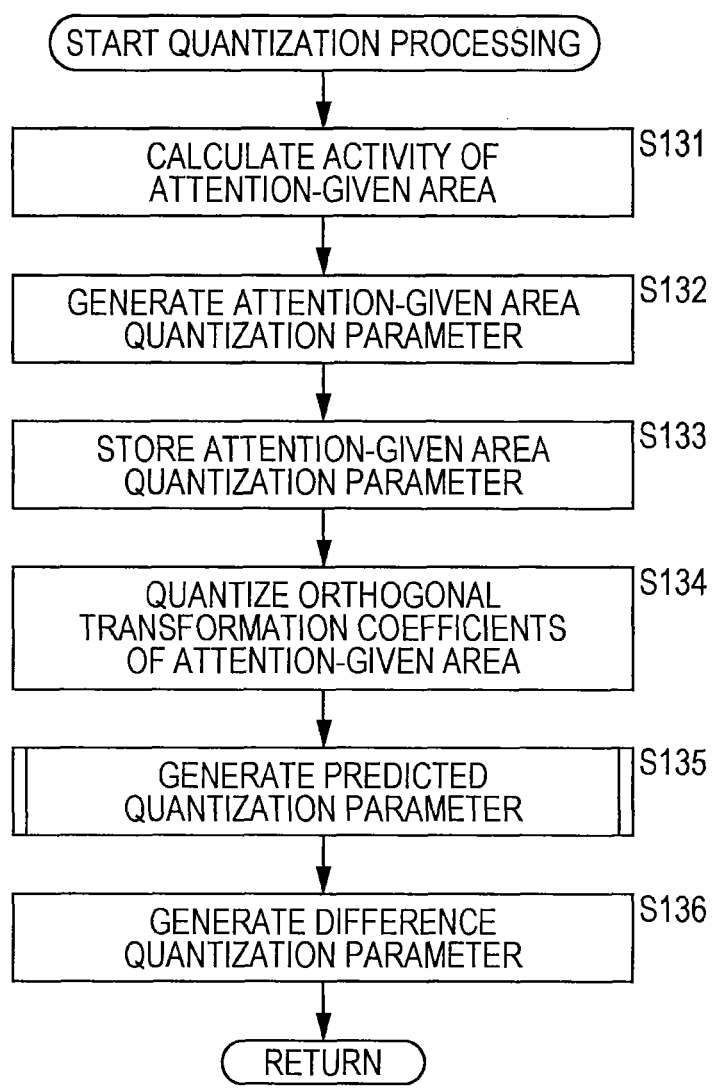
FIG. 8 is a flowchart explaining an example of a flow of quantization processing.
Figure 9:
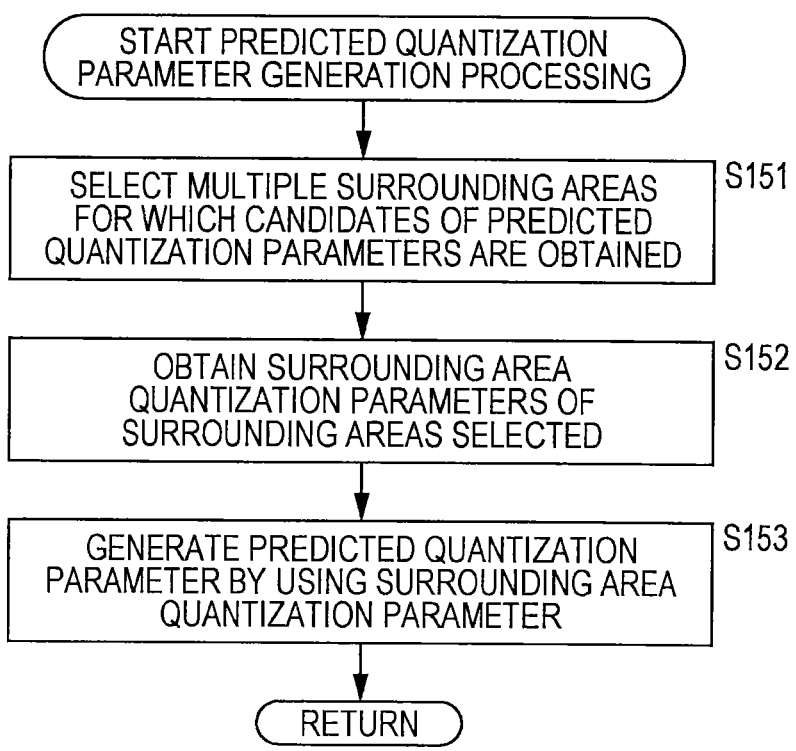
FIG. 9 is a flowchart explaining an example of a flow of predicted quantization parameter generation processing.

When the processing in step S153 is finished, the predicted quantization parameter generation unit 151 terminates the predicted quantization parameter generation processing, and returns the processing back to FIG. 8.

As described above, by performing each processing, the image coding device 100 can transmit the difference quantization parameter instead of the attention area quantization parameter, and therefore, the coding efficiency for quantization parameter can be improved.

2. Second Embodiment

[Image Decoding Device]

Figure 10:
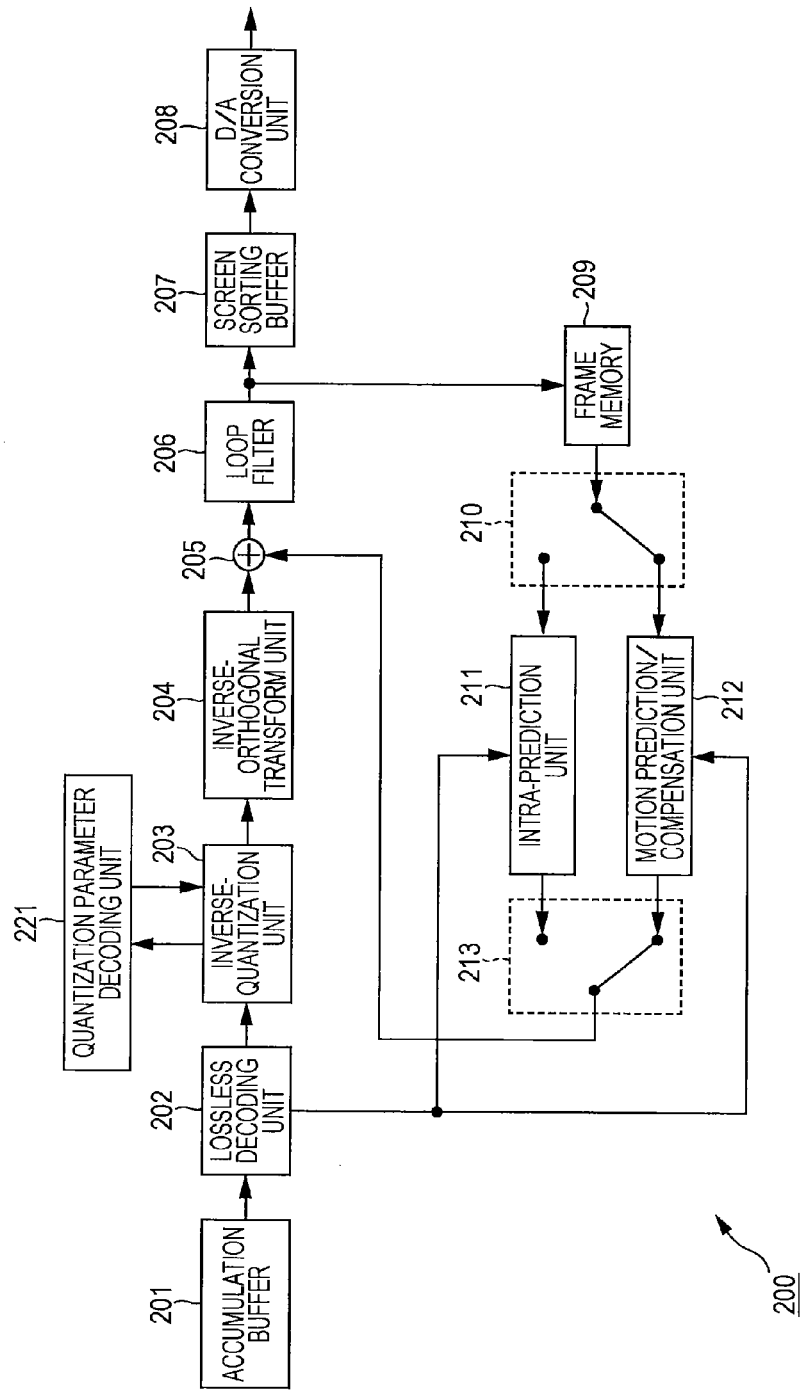
FIG. 10 is a block diagram illustrating an example of main configuration of an image decoding device.

FIG. 10 is a block diagram illustrating an example of main configuration of an image decoding device. As illustrated in FIG. 10, an image decoding device 200 decodes coded data generated by the image coding device 100 in accordance with decoding method corresponding to the encoding method of the image coding device 100. Like the image coding device 100, the image decoding device 200 performs quantization processing on each of the areas.

As illustrated in FIG. 10, the image decoding device 200 includes an accumulation buffer 201, a lossless decoding unit 202, an inverse-quantization unit 203, an inverse-orthogonal transformation unit 204, a calculation unit 205, a loop filter 206, a screen sorting buffer 207, and a D/A conversion unit 208. Further, the image decoding device 200 includes a frame memory 209, a selection unit 210, an intra-prediction unit 211, a motion prediction/compensation unit 212, and a selection unit 213.

Further, the image decoding device 200 includes a quantization parameter decoding unit 221.

The accumulation buffer 201 accumulates received coded data, and provides the coded data to the lossless decoding unit 202 with predetermined timing. The lossless decoding unit 202 decodes information, which is provided by the accumulation buffer 201 and encoded by the lossless coding unit 106 of FIG. 1, in accordance with the method corresponding to the encoding method of the lossless coding unit 106. The lossless decoding unit 202 provides the inverse-quantization unit 203 with quantized coefficient data of the difference image obtained as a result of decoding.

The lossless decoding unit 202 determines whether the intra-prediction mode or the inter-prediction mode is selected as the optimum prediction mode, and provides information about the optimum prediction mode to the intra-prediction unit 211 or the motion prediction/compensation unit 212 of which mode is determined to be selected. More specifically, for example, when the image coding device 100 selects the inter-prediction mode as the optimum prediction mode, information about the optimum prediction mode is provided to the motion prediction/compensation unit 212.

The inverse-quantization unit 203 quantizes the quantized coefficient data, which are obtained from decoding process of the lossless decoding unit 202, in accordance with the method corresponding to the quantization method of the quantization unit 105 of the FIG. 1, and provides the obtained coefficient data to the inverse-orthogonal transformation unit 204.

The inverse-orthogonal transformation unit 204 performs inverse-orthogonal transformation on the coefficient data, which are provided from the inverse-quantization unit 203, in accordance with the method corresponding to the orthogonal transformation method of the orthogonal transformation unit 104 of the FIG. 1. As a result of this inverse-orthogonal transformation processing, the inverse-orthogonal transformation unit 204 obtains decoded residual data corresponding to residual data before the orthogonal transformation is performed by the image coding device 100.

The obtained decoded residual data obtained from the inverse-orthogonal transformation is provided to the calculation unit 205. The calculation unit 205 receives a prediction image from the intra-prediction unit 211 or the motion prediction/compensation unit 212 via the selection unit 213.

The calculation unit 205 adds the decoded residual data and the prediction image, and obtains decoded image data corresponding to image data before the prediction image is subtracted by the calculation unit 103 of the image coding device 100. The calculation unit 205 provides the decoded image data to the loop filter 206.

As necessary, the loop filter 206 applies loop filter processing including deblock filter processing, adaptive loop filter processing, and the like, to the provided decoded image, and provides it to the screen sorting buffer 207.

The loop filter 206 includes a deblock filter, an adaptive loop filter, and the like, and applies filter processing to the decoded image provided from the calculation unit 205 as necessary. For example, the loop filter 206 applies deblock filter processing to the decoded image to remove block noise from the decoded image. For example, the loop filter 206 applies loop filter processing to the deblock filter processing result (decoded image from which only the block noise has been removed) using Wiener Filter, thus improving the image equality.

It should be noted that the loop filter 206 may apply any given filter processing to the decoded image. The loop filter 206 may also apply filter processing using filter coefficients provided from the image coding device 100 of FIG. 1.

The loop filter 206 provides filter processing result (decoded image obtained from the filter processing) to the screen sorting buffer 207 and the frame memory 209. The decoded image which is output from the calculation unit 205 can be provided to the screen sorting buffer 207 and the frame memory 209 without relying on the loop filter 206. More specifically, the filter processing based on the loop filter 206 can be omitted.

The screen sorting buffer 207 sorts images. More specifically, the order of frames sorted for the order of encoding by the screen sorting buffer 102 of FIG. 1 is sorted into the original order for display. The D/A conversion unit 208 performs D/A conversion on an image provided from the screen sorting buffer 207, outputs the image to a display, not shown, and causes the display to show the image.

The frame memory 209 stores the provided decoded image, and provides the stored decoded image to the selection unit 210 as a reference image with predetermined timing or on the basis of external request such as the intra-prediction unit 211 and the motion prediction/compensation unit 212.

The selection unit 210 selects the destination of the reference image provided from the frame memory 209. When the intra-coded image is decoded, the selection unit 210 provides the intra-prediction unit 211 with the reference image provided from the frame memory 209. When the inter-coded image is decoded, the selection unit 210 provides the motion prediction/compensation unit 212 with the reference image provided from the frame memory 209.

As necessary, the lossless decoding unit 202 provides the intra-prediction unit 211 with, e.g., information indicating intra-prediction mode obtained by decoding the header information. The intra-prediction unit 211 performs intra-prediction mode using the reference image obtained from the frame memory 209 in the intra-prediction mode used by the intra-prediction unit 114 of FIG. 1, and generates a prediction image. The intra-prediction unit 211 provides the generated prediction image to the selection unit 213.

The motion prediction/compensation unit 212 obtains information obtained by decoding the header information (optimum prediction mode information, difference information, and a code number and the like of prediction motion vector information) from the lossless decoding unit 202.

The motion prediction/compensation unit 212 generates a prediction image by applying inter-prediction using the reference image obtained from the frame memory 209 in the inter-prediction mode used by the motion prediction/compensation unit 115 of FIG. 1.

The quantization parameter decoding unit 221 adds the predicted quantization parameter of the current area generated using the surrounding area quantization parameter (attention area quantization parameter restructured in the past) to the difference quantization parameter provided from the image coding device 100, and restructures the attention area quantization parameter. The quantization parameter decoding unit 221 provides the attention area quantization parameter to the inverse-quantization unit 203.

The inverse-quantization unit 203 uses the attention area quantization parameter provided from the quantization parameter decoding unit 221 to dequantize the quantized orthogonal transformation coefficients provided from the lossless decoding unit 202.

By doing so, the inverse-quantization unit 203 can perform the inverse-quantization according to the method corresponding to the quantization processing of the quantization unit 105. More specifically, the image decoding device 200 can achieve improvement of the coding efficiency for quantization parameter.

[Inverse-Quantization Unit and Quantization Parameter Decoding Unit]

Figure 11:
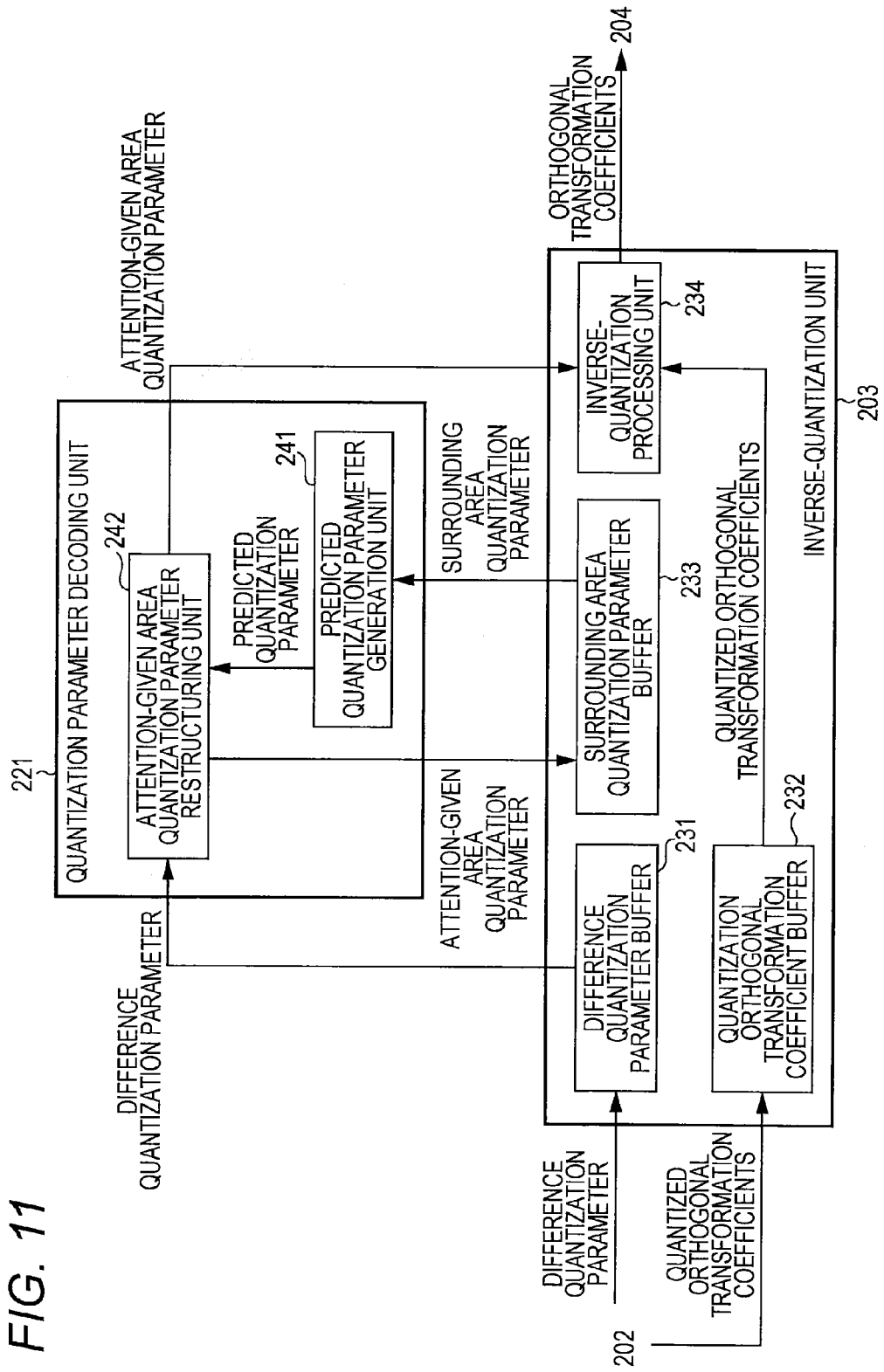
FIG. 11 is a block diagram illustrating an example of main configuration of an inverse-quantization unit and quantization parameter decoding unit.

FIG. 11 is a block diagram illustrating an example of main configuration of the inverse-quantization unit 203 and the quantization parameter decoding unit 221.

As illustrated in FIG. 11, the inverse-quantization unit 203 includes a difference quantization parameter buffer 231, a quantization orthogonal transformation coefficient buffer 232, a surrounding area quantization parameter buffer 233, and an inverse-quantization processing unit 234.

The quantization parameter decoding unit 221 includes a predicted quantization parameter generation unit 241 and an attention area quantization parameter restructuring unit 242.

The difference quantization parameter buffer 231 stores a difference quantization parameter which is provided from the lossless decoding unit 202 and transmitted from the image coding device 100. The difference quantization parameter buffer 231 provides the stored difference quantization parameter to the attention area quantization parameter restructuring unit 242, with predetermined timing or on the basis of occurrence of a predetermined event such as request from the attention area quantization parameter restructuring unit 242.

The predicted quantization parameter generation unit 241 obtains multiple surrounding area quantization parameters stored in the surrounding area quantization parameter buffer 233, and uses them to generate the predicted quantization parameter of the current area.

It should be noted that the calculation method of the predicted quantization parameter is the same as the calculation method of the quantization parameter coding unit 121 (predicted quantization parameter generation unit 151). For example, when the predicted quantization parameter generation unit 151 calculates the predicted quantization parameter from multiple surrounding area quantization parameters by using median, the predicted quantization parameter generation unit 241 also calculates the predicted quantization parameter from multiple surrounding area quantization parameters by using median. When predicted quantization parameter generation unit 151 adopts the average of multiple surrounding area quantization parameters as a predicted quantization parameter, the predicted quantization parameter generation unit 241 also adopts the average of multiple surrounding area quantization parameters as the predicted quantization parameter.

This method of calculation may be determined in advance, but flag information and the like may be transmitted from the image coding device 100, and the predicted quantization parameter generation unit 241 may recognize the method of calculation selected by the image coding device 100, and the method corresponding thereto may be selected.

The predicted quantization parameter generation unit 241 provides the generated predicted quantization parameter to the attention area quantization parameter restructuring unit 242.

The attention area quantization parameter restructuring unit 242 restructures the attention area quantization parameter by adding the predicted quantization parameter obtained from the predicted quantization parameter generation unit 241 to the difference quantization parameter obtained from the difference quantization parameter buffer 231.

The attention area quantization parameter restructuring unit 242 provides the restructured attention area quantization parameter to the surrounding area quantization parameter buffer 233.

The surrounding area quantization parameter buffer 233 stores the attention area quantization parameter provided from the attention area quantization parameter restructuring unit 242. In processing adopting, as the current area, another area processed after the current area, the surrounding area quantization parameter buffer 233 provides the stored attention area quantization parameter to the predicted quantization parameter generation unit 241 as the surrounding area quantization parameter.

The attention area quantization parameter restructuring unit 242 also provides the restructured attention area quantization parameter to the inverse-quantization processing unit 234.

The quantization orthogonal transformation coefficient buffer 232 stores the quantized orthogonal transformation coefficient which is provided from the lossless decoding unit 202 and transmitted from the image coding device 100. The quantization orthogonal transformation coefficient buffer 232 provides the stored quantized orthogonal transformation coefficients to the inverse-quantization processing unit 234 with predetermined timing or on the basis of occurrence of a predetermined event such as request from the inverse-quantization processing unit 234.

The inverse-quantization processing unit 234 uses the attention area quantization parameter obtained from the attention area quantization parameter restructuring unit 242 and dequantizes the quantized orthogonal transformation coefficients obtained from the quantization orthogonal transformation coefficient buffer 232. The inverse-quantization processing unit 234 provides the orthogonal transformation coefficients obtained by the inverse-quantization to the inverse-orthogonal transformation unit 204.

As described above, each unit performs processing, and accordingly the quantization parameter decoding unit 221 can correctly restructure the attention area quantization parameter used in the quantization processing in the image coding device 100, and the inverse-quantization unit 203 performs inverse-quantization according to the method corresponding to the quantization processing by the quantization unit 105 of the image coding device 100. More specifically, the image decoding device 200 can achieve improvement of the coding efficiency for quantization parameter.

As illustrated in FIG. 1, the inverse-quantization unit 108 and the quantization parameter decoding unit 122 of the image coding device 100 has the same configuration as the inverse-quantization unit 203 and the quantization parameter decoding unit 221, and performs the same processing.

[Flow of Decoding Processing]

Subsequently, the flow of each processing executed by the image decoding device 200 explained above will be explained. First, an example of flow of decoding processing will be explained with reference to the flowchart of FIG. 12.

When the decoding processing is started, the accumulation buffer 201 accumulates a received bit stream in step S201. In step S202, the lossless decoding unit 202 decodes the bit stream provided from the accumulation buffer 201. More specifically, I picture, P picture, and B picture encoded by the lossless coding unit 106 of FIG. 1 are decoded. In addition, various kinds of information such as the difference motion information and the difference quantization parameter other than the difference image information included in the bit stream are also decoded.

In step S203, the inverse-quantization unit 203 and the quantization parameter decoding unit 221 dequantizes the quantized orthogonal transformation coefficients obtained in the processing in step S202.

In step S204, the inverse-orthogonal transformation unit 204 performs inverse-orthogonal transformation on the orthogonal transformation coefficients dequantized in step S203.

In step S205, the intra-prediction unit 211 or the motion prediction/compensation unit 212 performs prediction processing using the provided information.

In step S206, the selection unit 213 selects the prediction image generated in step S205.

In step S207, the calculation unit 205 adds the prediction image selected in step S206 to the difference image information obtained from the inverse-orthogonal transformation in step S204. Thus, the decoded image can be obtained.

In step S208, as necessary, the loop filter 206 applies loop filter processing including deblock filter processing, adaptive loop filter processing, and the like, to the decoded image obtained in step S207.

In step S209, the screen sorting buffer 207 sorts images filtered in step S208. More specifically, the order of frames sorted for encoding by the screen sorting buffer 102 of the image coding device 100 is sorted into the original order for display.

In step S210, the D/A conversion unit 208 performs D/A conversion on the images in which frames are sorted in step S209. The images are output to a display, not shown, and the images are displayed.

In step S211, the frame memory 209 stores the image filtered in step S208. This image is used as a reference image for generation of a prediction image in step S205.

When the processing in step S211 is finished, the decoding processing is terminated.

[Flow of Inverse-Quantization Processing]

Subsequently, an example of flow of the inverse-quantization processing executed in step S203 of FIG. 12 will be explained with reference to the flowchart of FIG. 13.

When the inverse-quantization processing is started, the difference quantization parameter buffer 231 obtains the difference quantization parameter generated by the image coding device 100 in step S231.

In step S232, the predicted quantization parameter generation unit 241 generates the predicted quantization parameter of the current area. This processing is performed in the same manner as the encoding side. More specifically, each processing explained with reference to the flowchart of FIG. 9 is executed.

In step S233, the attention area quantization parameter restructuring unit 242 adds the predicted quantization parameter generated in step S232 to the difference quantization parameter obtained in step S231, thus restructuring the attention area quantization parameter.

In step S234, the surrounding area quantization parameter buffer 233 stores the attention area quantization parameter generated in step S233. This attention area quantization parameter is used as the surrounding area quantization parameter in the inverse-quantization processing adopting, as the current area, another area processed after the current area.

In step S235, the quantization orthogonal transformation coefficient buffer 232 obtains the quantized orthogonal transformation coefficient.

In step S236, the inverse-quantization processing unit 234 uses the attention area quantization parameter restructured in step S235 to dequantize the quantized orthogonal transformation coefficient obtained in step S235.

Figure 12:
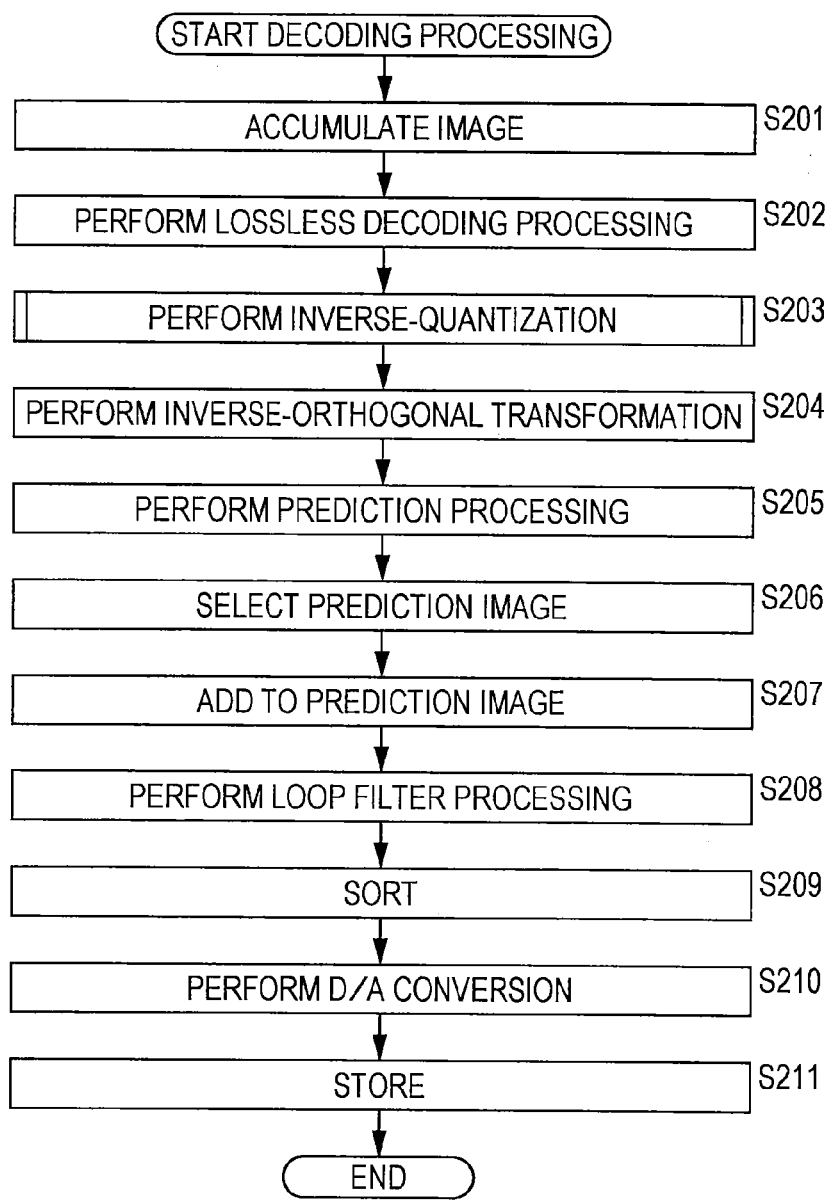
FIG. 12 is a flowchart explaining an example of a flow of decoding processing.
Figure 13:
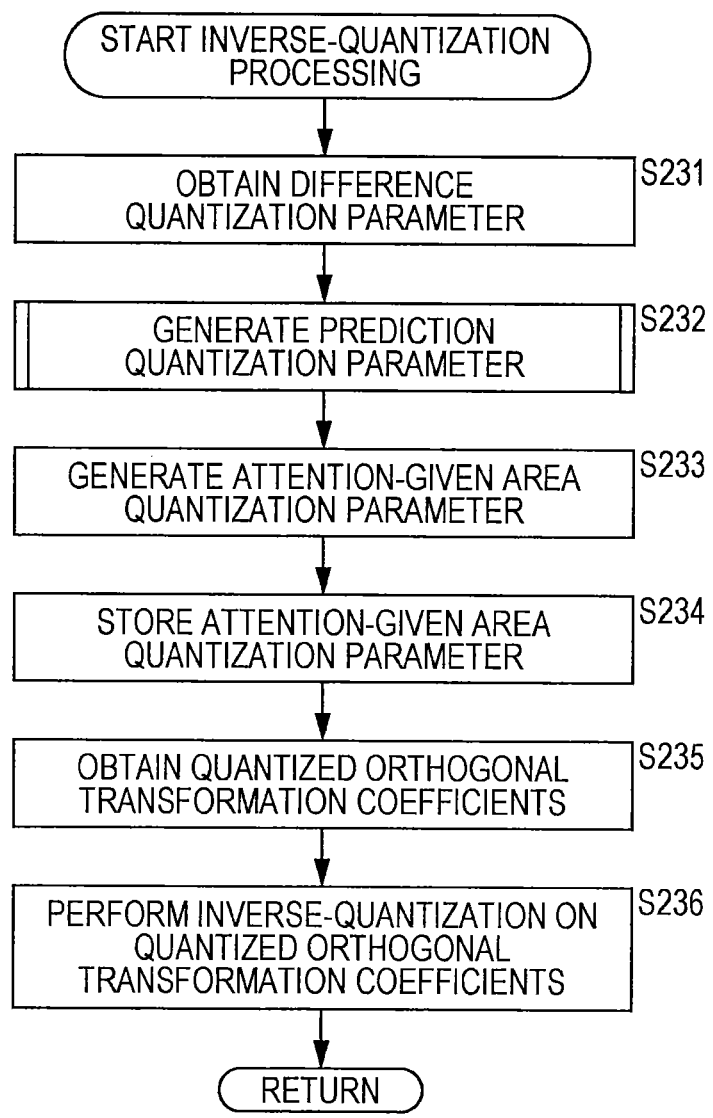
FIG. 13 is a flowchart explaining an example of a flow of inverse-quantization processing.

When the inverse-quantization is finished, the inverse-quantization processing unit 234 terminates the inverse-quantization processing, and returns the processing back to FIG. 12.

As described above, by performing various kinds of processing, the image decoding device 200 can achieve improvement of the coding efficiency for quantization parameter.

3. Third Embodiment

[Control of Method of Calculation of Predicted Quantization Parameter]

It should be noted that the method of calculating the predicted quantization parameter is not limited to the example explained above. For example, a determination may be made as to whether the quantization parameter of each surrounding area can be used as the surrounding area quantization parameter or not.

For example, in the example of FIG. 5, suppose that, when the predicted quantization parameter of the current area is generated, the quantization parameters of the surrounding areas A to C are used. At this occasion, depending on the position of the current area, any one of the surrounding areas A to C may be, for example, located outside of the image frame, or located other than the current slice, so that the quantization parameter may not be used (in "unavailable" state).

Accordingly, in generation of the predicted quantization parameter, the quantization parameter coding unit 121 determines whether each surrounding area can be used or not (in available state or in unavailable state), and uses only the usable (available) surrounding area to generate the predicted quantization parameter. Further, in accordance with the determination result (the state of whether each surrounding area can be used or not), the calculation method for generating the predicted quantization parameter may be determined.

[Quantization Parameter Coding Unit]

Figure 14:
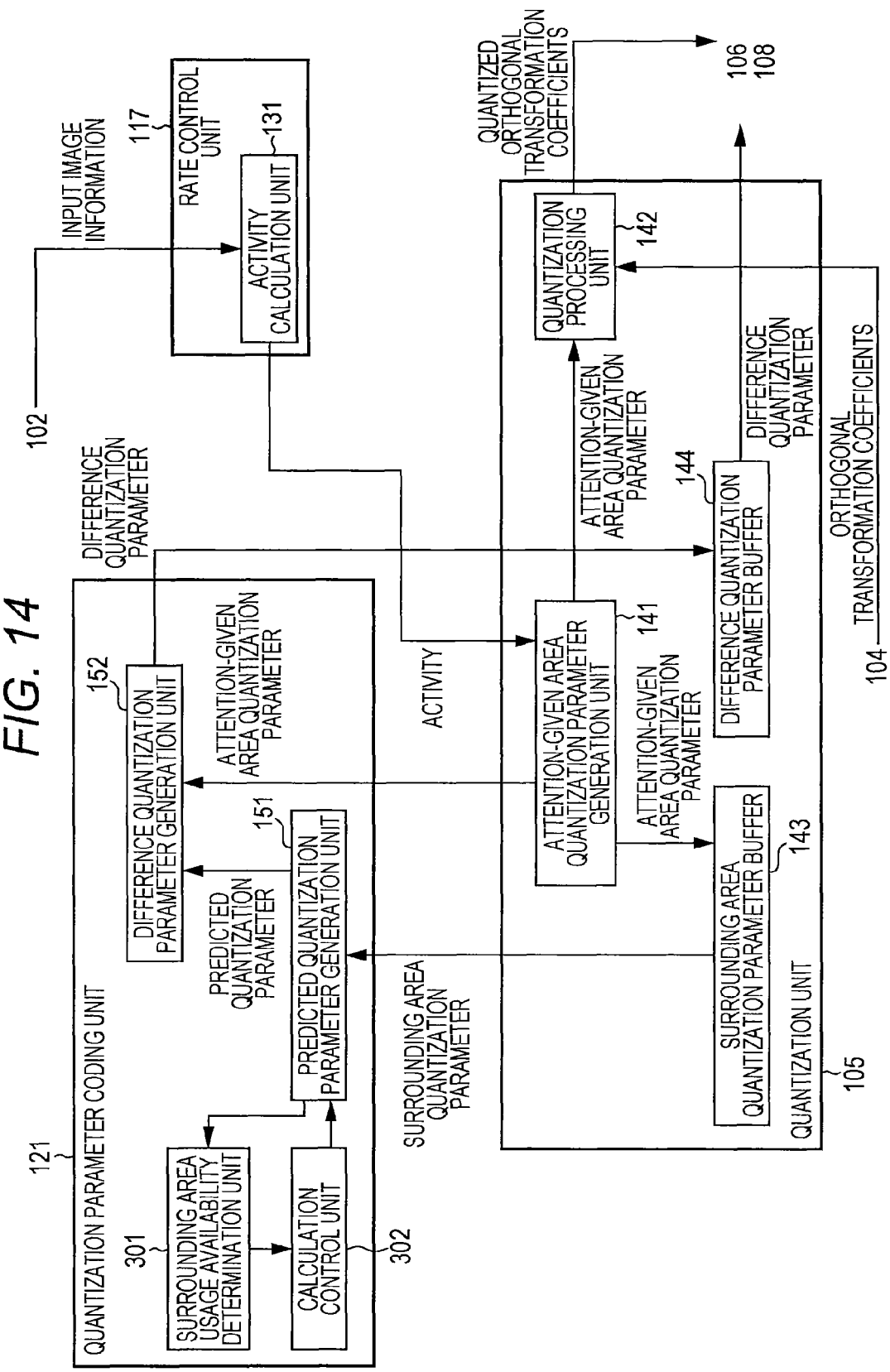
FIG. 14 is a figure illustrating an example of another configuration of a quantization parameter coding unit.

FIG. 14 is a block diagram illustrating an example of main configuration of the quantization parameter coding unit 121 in such case. As illustrated in FIG. 14, the quantization parameter coding unit 121 in this case includes not only the configuration of the first embodiment (FIG. 6) but also a surrounding area usage availability determination unit 301 and a calculation control unit 302.

When the predicted quantization parameter generation unit 151 generates the predicted quantization parameter, the surrounding area usage availability determination unit 301 determines whether each surrounding area of the current area can be used or not. The reason why it can be used or not is not limited. The surrounding area usage availability determination unit 301 provides the determination result to the calculation control unit 302.

In accordance with the determination result provided from the surrounding area usage availability determination unit 301, the calculation control unit 302 determines the calculation method of the predicted quantization parameter generation, and provides the predicted quantization parameter generation unit 151 with information indicating the determined calculation method and the determination result provided from the surrounding area usage availability determination unit 301.

The predicted quantization parameter generation unit 151 obtains the quantization parameter of the surrounding area determined to be usable (available state) by the surrounding area usage availability determination unit 301 from the surrounding area quantization parameter buffer 143 as the surrounding area quantization parameter. The predicted quantization parameter generation unit 151 uses the surrounding area quantization parameter to generate the predicted quantization parameter in accordance with the calculation method determined by the calculation control unit 302.

A more specific example will be explained. For example, in FIG. 5, the surrounding areas A to C are adopted as candidates of areas for obtaining the surrounding area quantization parameter. Suppose that the predicted quantization parameter generation unit 151 can perform the median calculation and the average calculation explained above.

For example, when the surrounding area usage availability determination unit 301 determines that all of the surrounding areas A to C are usable (available state), the calculation control unit 302 selects median calculation as the calculation method for generating the predicted quantization parameter. Therefore, in this case, predicted quantization parameter generation unit 151 reads the surrounding area quantization parameters $QP_a$, $QP_b$, and $QP_c$ from the surrounding area quantization parameter buffer 143, and uses them to perform the median calculation according to the expression (1) explained above.

For example, when the surrounding area usage availability determination unit 301 determines that two of the surrounding areas A to C are usable (available state), the calculation control unit 302 selects average calculation as the calculation method for generating the predicted quantization parameter.

Therefore, for example, when the area A is unusable (unavailable state), the predicted quantization parameter generation unit 151 reads the surrounding area quantization parameters $QP_b$ and $QP_c$ from the surrounding area quantization parameter buffer 143, and uses them to perform the average calculation (Avr ( ) according to the expression (3) explained above.

$$\mathrm{Pred}QP=Avr(QP_b,QP_c) \qquad (3)$$

When the area B is unusable (unavailable state), the predicted quantization parameter generation unit 151 reads the surrounding area quantization parameters $QP_a$ and $QP_c$ from the surrounding area quantization parameter buffer 143, and uses them to perform the average calculation (Avr ( ) according to the expression (4) explained above.

$$\mathrm{Pred}QP=Avr(QP_a,QP_c) \qquad (4)$$

When the area C is unusable (unavailable state), the predicted quantization parameter generation unit 151 reads the surrounding area quantization parameters $QP_a$ and $QP_b$ from the surrounding area quantization parameter buffer 143, and uses them to perform the average calculation (Avr ( ) ) according to the expression (5) explained above.

$$\mathrm{Pred}QP=Avr(QP_a,QP_b) \qquad (5)$$

For example, when the surrounding area usage availability determination unit 301 determines that any one of the surrounding areas A to C is usable (available state), the calculation control unit 302 selects normal prediction in which the quantization parameter of the surrounding area is the predicted quantization parameter.

In this case, the predicted quantization parameter generation unit 151 reads the quantization parameter of the surrounding area that is determined to be usable from among the surrounding area quantization parameters $QP_a$, $QP_b$, and $QP_c$ from the surrounding area quantization parameter buffer 143, and adopts it as the predicted quantization parameter as shown in the expressions (6) to (8) below.

When the area A is usable (available state):

$$\mathrm{Pred}QP=QP_a \qquad (6)$$

When the area B is usable (available state):

$$\mathrm{Pred}QP=QP_b \qquad (7)$$

When the area C is usable (available state):

$$\mathrm{Pred}QP=QP_c \qquad (8)$$

[Flow of Predicted Quantization Parameter Generation Processing]

Figure 15:
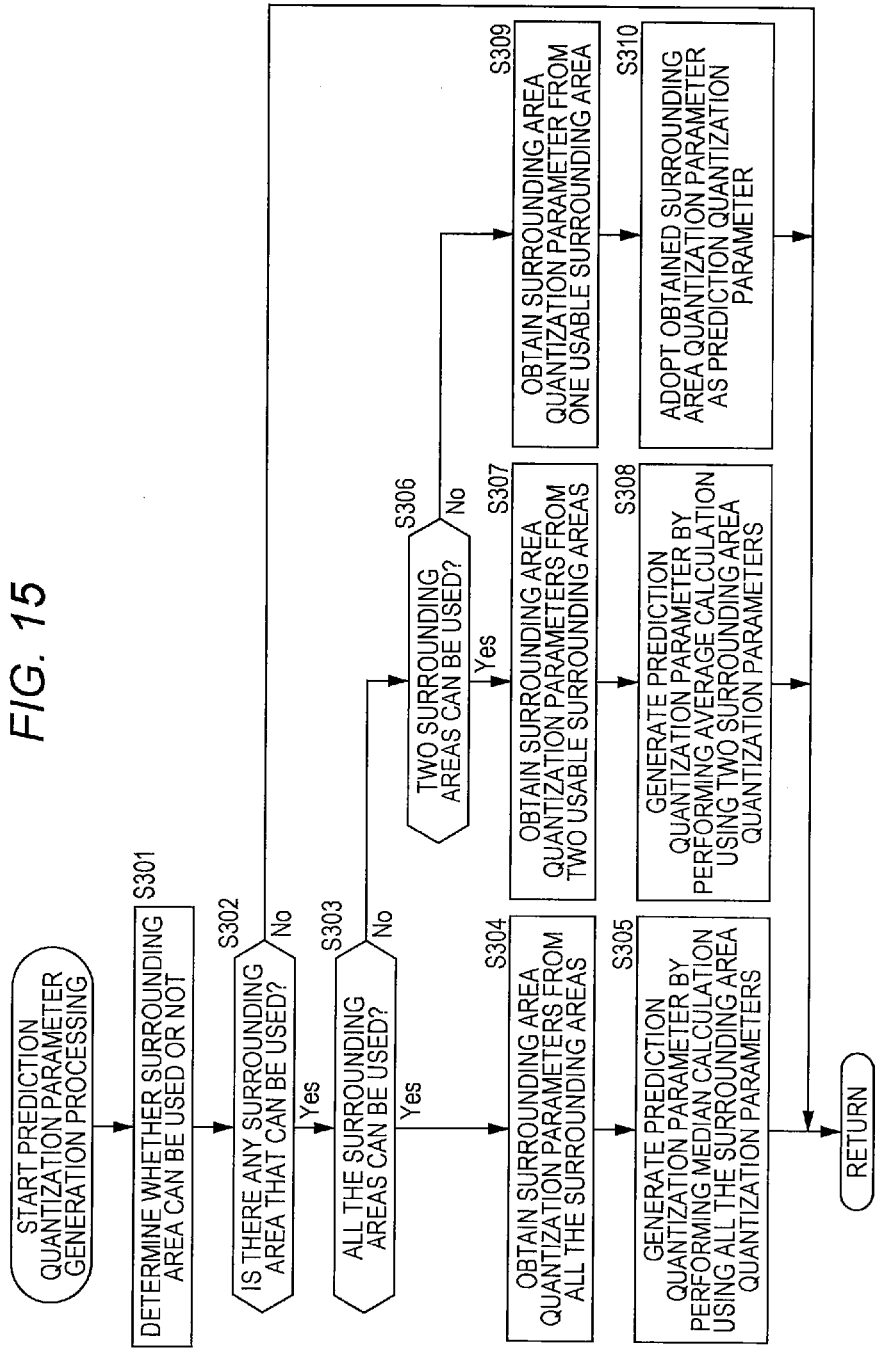
FIG. 15 is a flowchart explaining another example of a flow of predicted quantization parameter generation processing.

An example of flow of predicted quantization parameter generation processing in this case will be explained with reference to the flowchart of FIG. 15. In this case, the surrounding areas A to C of FIG. 5 are adopted as candidates of areas for obtaining the surrounding area quantization parameters. Suppose that the predicted quantization parameter generation unit 151 can perform the median calculation and the average calculation explained above.

When the predicted quantization parameter generation processing is started, the surrounding area usage availability determination unit 301 determines whether each surrounding area can be used or not with regard to the current area for which the predicted quantization parameter generation unit 151 generates the prediction quantization in step S301. More specifically, the surrounding area usage availability determination unit 301 determines whether each of the surrounding areas A to C is usable or not.

In step S302, the calculation control unit 302 determines whether there is any usable surrounding area with regard to the current area. When all of the surrounding areas A to C are determined to be unusable (unavailable state), the calculation control unit 302 terminates the predicted quantization parameter generation processing so as not to generate the predicted quantization parameter (or generate a predicted quantization parameter of which value is zero or an initial value), and returns the processing back to FIG. 8.

In step S302, when it is determined that there are usable surrounding areas, the calculation control unit 302 proceeds to the processing in step S303. In step S303, the calculation control unit 302 determines whether all of the surrounding areas are usable (available state) or not. When all of the surrounding areas A to C are determined to be usable, the calculation control unit 302 selects median calculation as the calculation method of the predicted quantization parameter generation, and proceeds to processing in step S304.

When the median calculation is selected, the predicted quantization parameter generation unit 151 obtains the quantization parameters $QP_a$, $QP_b$, and $QP_c$ of the surrounding areas A to C as the surrounding area quantization parameters in step S304.

In step S305, the predicted quantization parameter generation unit 151 generates the predicted quantization parameter by using the median calculation using all of the surrounding area quantization parameters obtained in step S304. More specifically, the predicted quantization parameter generation unit 151 adopts the median value of the area quantization parameters $QP_a$, $QP_b$, and $QP_c$ as the predicted quantization parameter. When the processing in step S305 is finished, the predicted quantization parameter generation unit 151 terminates the predicted quantization parameter generation processing, and returns the processing back to FIG. 8.

When only some of the surrounding areas are determined to be usable and it is difficult to execute median calculation in step S303, the calculation control unit 302 proceeds to processing in step S306. In step S306, the calculation control unit 302 determines whether two of the three surrounding areas are usable or not. When two of the surrounding areas are determined to be usable, the calculation control unit 302 selects average calculation as the calculation method of the predicted quantization parameter generation, and proceeds to processing in S307.

When the average calculation is selected, the predicted quantization parameter generation unit 151 obtains quantization parameters of the usable (available state) areas from among the surrounding areas A to C (more specifically, two of the quantization parameters $QP_a$, $QP_b$, and $QP_c$) as the surrounding area quantization parameters in step S307.

In step S308, the predicted quantization parameter generation unit 151 generates the predicted quantization parameter by using the average calculation using the surrounding area quantization parameters obtained in step S307. More specifically, the predicted quantization parameter generation unit 151 adopts the average value of two of the area quantization parameters $QP_a$, $QP_b$, and $QP_c$ as the predicted quantization parameter. When the processing in step S308 is finished, the predicted quantization parameter generation unit 151 terminates the predicted quantization parameter generation processing, and returns the processing back to FIG. 8.

When a surrounding area is determined to be usable in step S306, the calculation control unit 302 selects normal prediction as the method of the predicted quantization parameter generation, and proceeds to processing in S309.

When the normal calculation is selected, the predicted quantization parameter generation unit 151 obtains quantization parameter of the usable (available state) area from among the surrounding areas A to C (more specifically, one of the quantization parameters $QP_a$, $QP_b$, and $QP_c$) as the surrounding area quantization parameter in step S309.

In step S310, the predicted quantization parameter generation unit 151 adopts the surrounding area quantization parameter obtained in step S309 as the predicted quantization parameter. More specifically, the predicted quantization parameter generation unit 151 adopts any one of the area quantization parameters $QP_a$, $QP_b$, and $QP_c$ as the predicted quantization parameter. When the processing in step S310 is finished, the predicted quantization parameter generation unit 151 terminates the predicted quantization parameter generation processing, and returns the processing back to FIG. 8.

As described above, a determination is made as to whether the surrounding areas are usable or not, and therefore, the quantization parameter coding unit 121 can generate the predicted quantization parameter using only the surrounding area quantization parameters of the usable surrounding areas in a more reliable manner. As described above, any condition may be used to determine as to whether the surrounding areas are usable or not, and therefore, the quantization parameter coding unit 121 can generate a desired predicted quantization parameter using only surrounding area quantization parameters of desired usable surrounding areas in a more reliable manner.

As described above, the method of calculation of the predicted quantization parameter is determined in accordance with the number of usable surrounding areas, and therefore, the quantization parameter coding unit 121 can generate the predicted quantization parameter by applying more appropriate calculation method in a more reliable manner.

In the explanation above, the surrounding areas A to C of the example of FIG. 5 are used as the surrounding areas for the current area, but the surrounding areas may include areas other than those areas. The number of areas adopted as the surrounding areas may be any number. For example, it may be determined in accordance with relationship in terms of size between the current area and the surrounding areas.

In the explanation above, the condition of selection of the median calculation is that all the surrounding areas are usable, but the embodiment is not limited thereto. It may be that the as many surrounding areas as the number of surrounding areas at which the median calculation can be executed are usable. For example, when the number of surrounding areas is five, the condition of selection of the median calculation may be that three or more surrounding areas are usable.

Further, when the median calculation is not applied, the calculation control unit 302 may select the average calculation at all times.

[Quantization Parameter Decoding Unit]

Figure 16:
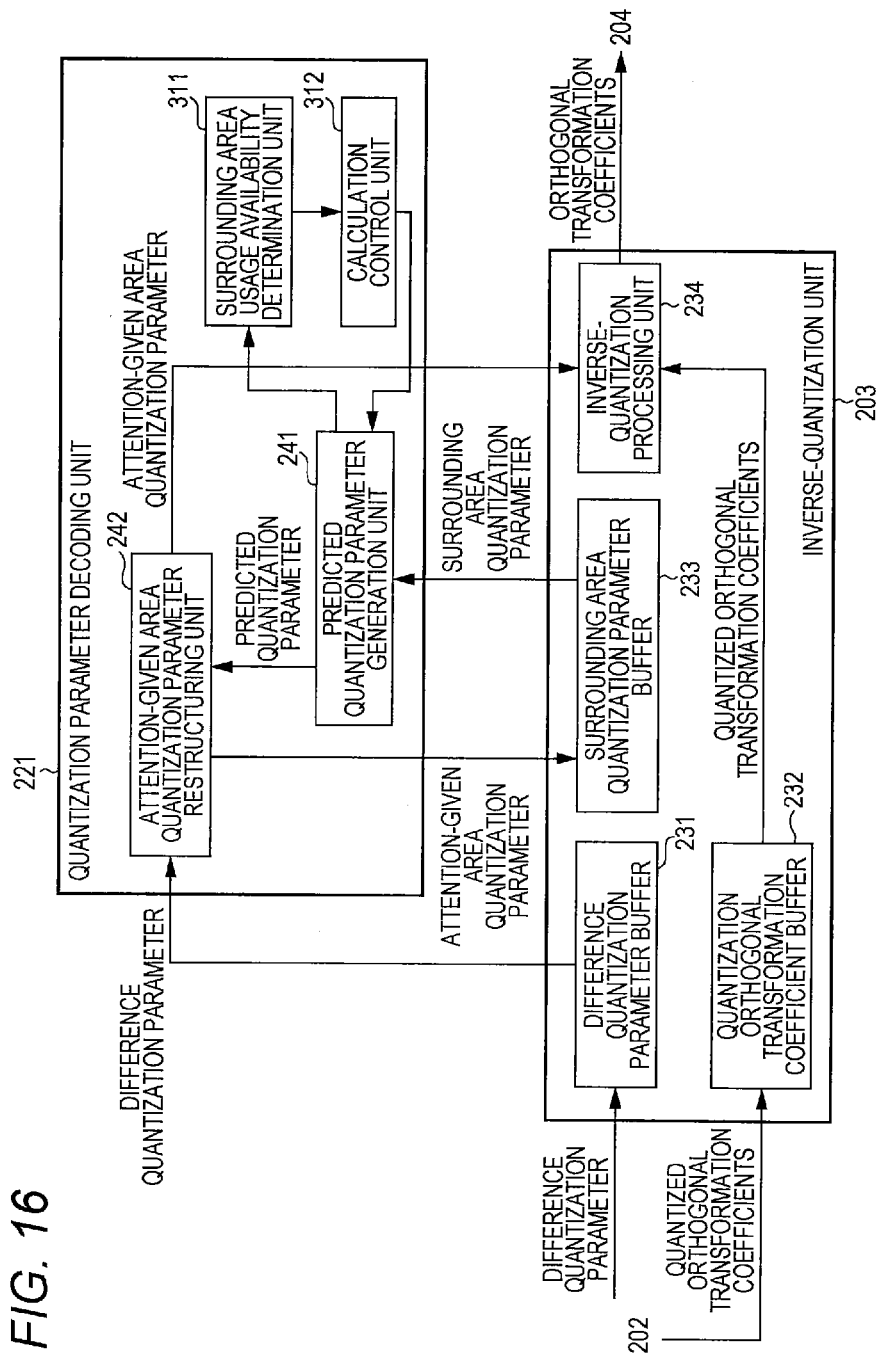
FIG. 16 is a figure illustrating an example of another configuration of a quantization parameter decoding unit.

FIG. 16 is a block diagram illustrating an example of main configuration of the quantization parameter decoding unit 221 in this case. As illustrated in FIG. 16, the quantization parameter decoding unit 221 has the configuration as illustrated in FIG. 14, and corresponds to the quantization parameter coding unit 121 for generating the predicted quantization parameter according to the method as described above, and the quantization parameter coding unit 121 correctly generates the attention area quantization parameter from the generated difference quantization parameter. More specifically, as illustrated in FIG. 16, the quantization parameter decoding unit 221 generates the predicted quantization parameter according to the same method as the quantization parameter coding unit 121 as illustrated in FIG. 14.

As illustrated in FIG. 16, the quantization parameter decoding unit 221 in this case includes not only the configuration of the second embodiment (FIG. 9) but also a surrounding area usage availability determination unit 311 and a calculation control unit 312.

When the predicted quantization parameter generation unit 241 generates the predicted quantization parameter according to the same method as the surrounding area usage availability determination unit 301, the surrounding area usage availability determination unit 311 determines whether each surrounding area of the current area can be used or not. The surrounding area usage availability determination unit 311 provides the determination result to the calculation control unit 312.

In accordance with the determination result provided from the surrounding area usage availability determination unit 301, the calculation control unit 312 determines the calculation method of the predicted quantization parameter generation according to the same method as the calculation control unit 302, and provides the predicted quantization parameter generation unit 241 with information indicating the determined calculation method and the determination result provided from the surrounding area usage availability determination unit 301.

In accordance with the same method as the predicted quantization parameter generation unit 151, the predicted quantization parameter generation unit 241 obtains the quantization parameter of the surrounding area, which is determined to be usable (available state) by the surrounding area usage availability determination unit 311, from the surrounding area quantization parameter buffer 233 as the surrounding area quantization parameter, and uses the surrounding area quantization parameter to generate the predicted quantization parameter in accordance with the calculation method determined by the calculation control unit 312.

More specifically, the quantization parameter decoding unit 221 performs the same processing as each processing explained with reference to the flowchart of FIG. 15 in the predicted quantization parameter generation processing.

As described above, each unit performs processing, and accordingly the quantization parameter decoding unit 221 can correctly restructure the attention area quantization parameter used in the quantization processing in the image coding device 100 even in this case.

4. Fourth Embodiment

[Weighted Average]

The method of calculation of the predicted quantization parameter may be a method other than each of the calculation methods explained above. For example, weighted average calculation, in which each surrounding area quantization parameter is weighted and added, may be applied. At this occasion, weights may be given based on any index, but, for example, the weights may be given in accordance with the size of the surrounding area.

[Quantization Parameter Coding Unit]

Figure 17:
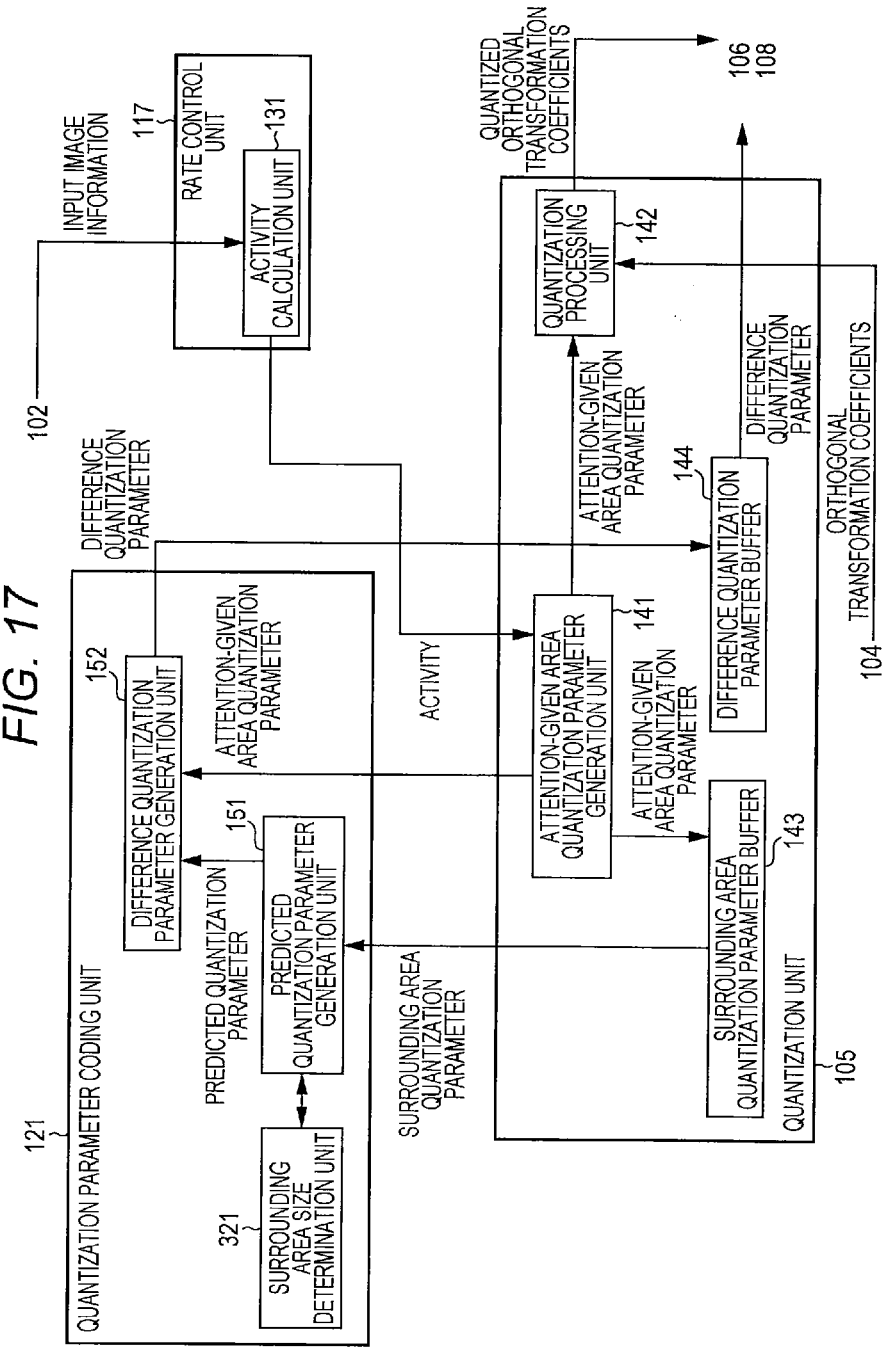
FIG. 17 is a figure illustrating an example of still another configuration of a quantization parameter coding unit.

FIG. 17 is a block diagram illustrating an example of main configuration of the quantization parameter coding unit 121 in such case. As illustrated in FIG. 17, in this case, the quantization parameter coding unit 121 includes not only the configuration of the first embodiment (FIG. 6) but also a surrounding area size determination unit 321.

The surrounding area size determination unit 321 determines the size of each surrounding area with regard to the current area for which the predicted quantization parameter generation unit 151 generates the predicted quantization parameter. The surrounding area size determination unit 321 notifies the determination result to the predicted quantization parameter generation unit 151.

In accordance with the determination result, i.e., on the basis of the size of each surrounding area, the predicted quantization parameter generation unit 151 gives weights to the surrounding area quantization parameters, and obtains the average thereof. More specifically, the predicted quantization parameter generation unit 151 calculates the weighted average of the surrounding area quantization parameters, and adopts it as the predicted quantization parameter.

How the weight is given to each surrounding area quantization parameter is not limited. For example, a quantization parameter for a surrounding area of which size is larger may be given a larger weight (an increased weight). More specifically, the predicted quantization parameter is calculated according to the expression (9) below.

$$PredQP=(x \times QP_a + y \times QP_b + z \times QP_c)/(x+y+z) \quad (9)$$

As described above, the quantization parameter coding unit 121 can make the predicted quantization parameter reflecting the quantization parameter of the surrounding area in a more accurate manner, and this can improve the accuracy of prediction of the predicted quantization parameter.

For example, alternatively, a quantization parameter for a surrounding area of which size is close to the size of the current area may be given a larger weight (an increased weight). More specifically, the weight for the quantization parameter for the surrounding area having the same size as the current area may be set at the highest level. It should be noted that only the weight for the quantization parameter for the surrounding area having the same size as the current area may be increased.

The size of area tends to depend on the features of the image, and a similar image is likely to be divided into areas having similar size. Therefore, areas located closely and having similar sizes are likely to be similar images, and accordingly, their quantization parameters may be similar to each other. Therefore, the predicted quantization parameter generation unit 151 is configured such that a quantization parameter for a surrounding area of which size is close to the size of the current area may be given a larger weight (an increased weight), so that this is expected to improve the accuracy of prediction of the predicted quantization parameter.

The predicted quantization parameter generation unit 151 provides the predicted quantization parameter to the difference quantization parameter generation unit 152.

[Flow of Predicted Quantization Parameter Generation Processing]

Figure 18:
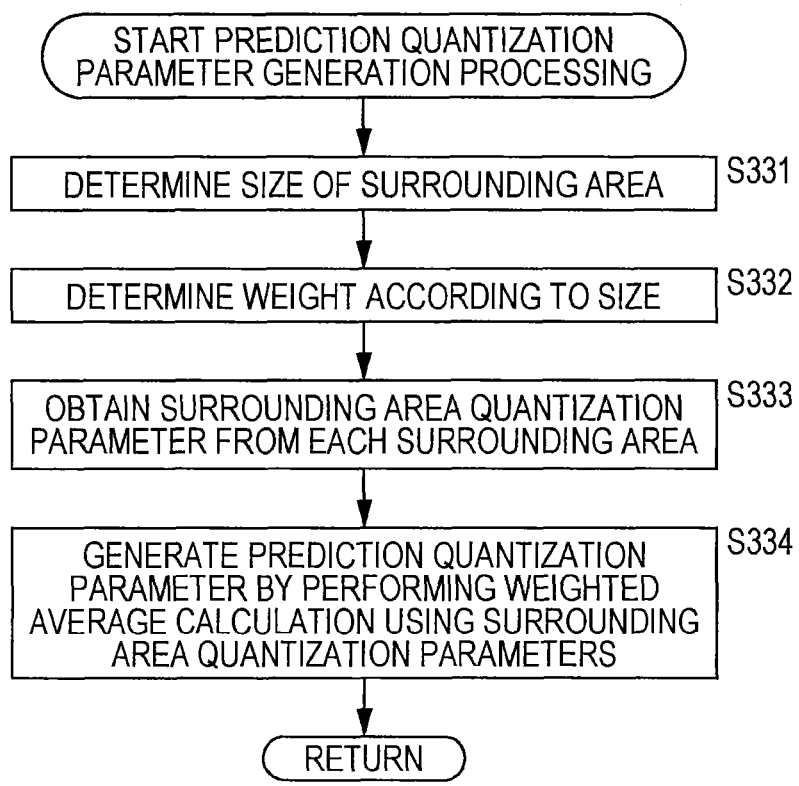
FIG. 18 is a flowchart explaining still another example of a flow of a predicted quantization parameter generation processing.

An example of flow of predicted quantization parameter generation processing in this case will be explained with reference to the flowchart of FIG. 18.

When the predicted quantization parameter generation processing is started, the surrounding area size determination unit 321 determines the size of the surrounding area in step S331.

In step S332, the predicted quantization parameter generation unit 151 determines the weight given to each surrounding area quantization parameter in accordance with the size of each surrounding area determined in step S331.

In step S333, the predicted quantization parameter generation unit 151 obtains the surrounding area quantization parameter. In step S334, the predicted quantization parameter generation unit 151 performs weighted average using the surrounding area quantization parameters, and generates the predicted quantization parameter.

When the processing in step S334 is finished, the predicted quantization parameter generation unit 151 terminates the predicted quantization parameter generation processing, and returns the processing back to FIG. 8.

As described above, by performing weighted average in accordance with the sizes of the surrounding areas, the quantization parameter coding unit 121 can generate the predicted quantization parameter correctly reflecting the quantization parameter of the surrounding area. Therefore, the quantization parameter coding unit 121 can improve the accuracy of prediction of the predicted quantization parameter. Accordingly, the image coding device 100 can improve the coding efficiency.

[Quantization Parameter Decoding Unit]

Figure 19:
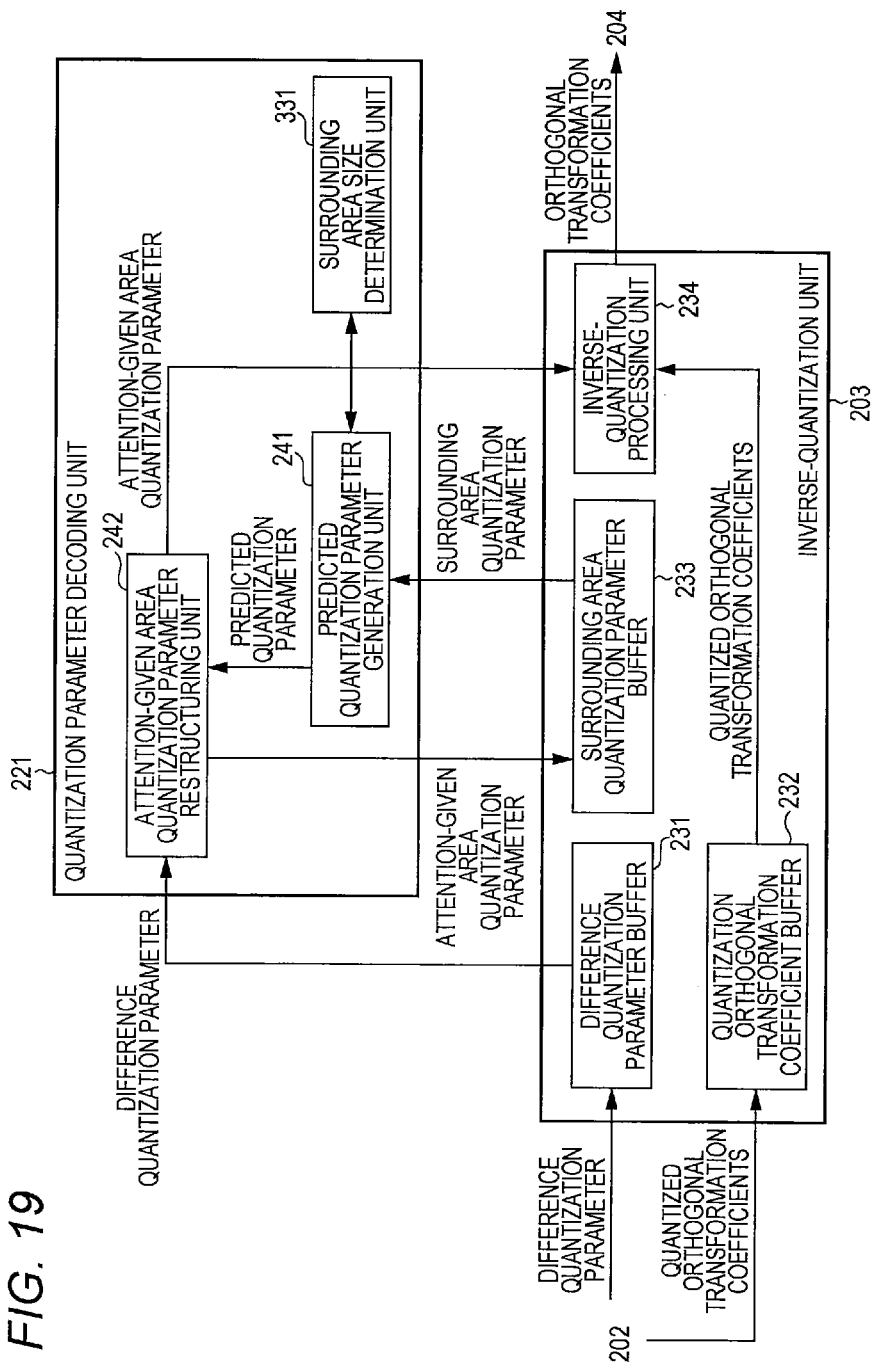
FIG. 19 is a figure illustrating an example of still another configuration of a quantization parameter decoding unit.

FIG. 19 is a block diagram illustrating an example of main configuration of the quantization parameter decoding unit 221 in this case. As illustrated in FIG. 19, the quantization parameter decoding unit 221 has the configuration as illustrated in FIG. 17, and corresponds to the quantization parameter coding unit 121 for generating the predicted quantization parameter according to the weighted average calculation as described above, and the quantization parameter coding unit 121 correctly generates the attention area quantization parameter from the generated difference quantization parameter. More specifically, as illustrated in FIG. 19, the quantization parameter decoding unit 221 generates the predicted quantization parameter according to the same method as the quantization parameter coding unit 121 as illustrated in FIG. 17.

As illustrated in FIG. 19, in this case, the quantization parameter decoding unit 221 includes not only the configuration of the second embodiment (FIG. 9) but also a surrounding area size determination unit 331.

The surrounding area size determination unit 331 determines the size of each surrounding area with regard to the current area for which the predicted quantization parameter generation unit 241 generates the predicted quantization parameter in accordance with the same method as the surrounding area size determination unit 321. The surrounding area size determination unit 331 notifies the determination result to the predicted quantization parameter generation unit 241.

The predicted quantization parameter generation unit 241 generates the predicted quantization parameter in accordance with the same method as the predicted quantization parameter generation unit 151. More specifically, the predicted quantization parameter generation unit 241 calculates the weighted average of the surrounding area quantization parameters on the basis of the size of each surrounding area, and adopts it as the predicted quantization parameter.

More specifically, the quantization parameter decoding unit 221 performs the same processing as each processing explained with reference to the flowchart of FIG. 18 in the predicted quantization parameter generation processing.

As described above, each unit performs processing, and accordingly the quantization parameter decoding unit 221 can correctly restructure the attention area quantization parameter used in the quantization processing in the image coding device 100 even in this case.

5. Fifth Embodiment

[Setting of Type of Data]

A user and the like may be allowed to make setting as to whether to allow usage of various kinds of calculations as described for calculating the predicted quantization parameter. This setting may be configured to be transmitted as type data to the decoding side.

[Quantization Parameter Coding Unit and the Like]

FIG. 20 is a block diagram illustrating an example of main configuration of the quantization parameter coding unit 121 and the like in this case. As illustrated in FIG. 20, the image coding device 100 in this case includes not only the configuration of the first embodiment (FIG. 1) but also a type data setting unit 351.

The type data setting unit 351 sets as to whether to allow usage of various kinds of calculations for calculating the predicted quantization parameter on the basis of, e.g., user's instruction, external instruction of processing, and the like, and generates type data including the setting. The type data setting unit 351 provides the generated type data to the quantization parameter coding unit 121. The type data setting unit 351 also provides the generated type data to the lossless coding unit 106 to have the lossless coding unit 106 encode then, and, for example, the type data are transmitted to the decoding side in such a manner that, e.g., the data are included in sequence parameter set or picture parameter set.

In this case, as illustrated in FIG. 20, the quantization parameter coding unit 121 includes not only the configuration of the first embodiment (FIG. 6) but also a type data buffer 361 and a calculation control unit 362.

The type data buffer 361 obtains and stores the type data provided from the type data setting unit 351. The type data buffer 361 reads the stored type data with predetermined timing or on the basis of external request, and provides the type data to the calculation control unit 362.

The calculation control unit 362 reads, from the type data buffer 361, type data corresponding to the current area for which the predicted quantization parameter generation unit 151 generates the predicted quantization parameter. The calculation control unit 362 determines, in accordance with the type data and the like, the calculation method with which the predicted quantization parameter is calculated, and notifies the calculation method to the predicted quantization parameter generation unit 151.

The predicted quantization parameter generation unit 151 calculates the predicted quantization parameter generation in accordance with the method designated by the calculation control unit 362.

[Type Data]

Subsequently, the details of the type data will be explained. FIG. 21 shows an example of type data. As illustrated in FIG. 21, type data include, for example, three flags, i.e., PredQP_median_enable, PredQP_average_enable, and PredQP_waverage_enable. The type data are set for each of any given data unit such as picture, slice, LCU, and CU.

PredQP_median_enable is flag information indicating whether median calculation is applied to calculation of the predicted quantization parameter generation or not in the data unit with which this flag is set. When the value of this flag is "0", the use of the median calculation is prohibited, and the calculation control unit 362 cannot select the median calculation for calculation of the predicted quantization parameter generation. When the value of this flag is "1", the use of the median calculation is not prohibited, and the calculation control unit 362 can select the median calculation for calculation of the predicted quantization parameter generation.

PredQP_average_enable is flag information indicating whether average calculation is applied to calculation of the predicted quantization parameter generation or not in the data unit with which this flag is set. When the value of this flag is "0", the use of the average calculation is prohibited, and the calculation control unit 362 cannot select the average calculation for calculation of the predicted quantization parameter generation. When the value of this flag is "1", the use of the average calculation is not prohibited, and the calculation control unit 362 can select the average calculation for calculation of the predicted quantization parameter generation.

PredQP_waverage_enable is flag information indicating whether weighted average calculation is applied to calculation of the predicted quantization parameter generation or not in the data unit with which this flag is set. When the value of this flag is "0", the use of the weighted average calculation is prohibited, and the calculation control unit 362 cannot select the weighted average calculation for calculation of the predicted quantization parameter generation. When the value of this flag is "1", the use of the weighted average calculation is not prohibited, and the calculation control unit 362 can select the weighted average calculation for calculation of the predicted quantization parameter generation.

[Flow of Type Data Setting Processing]

Figure 22:
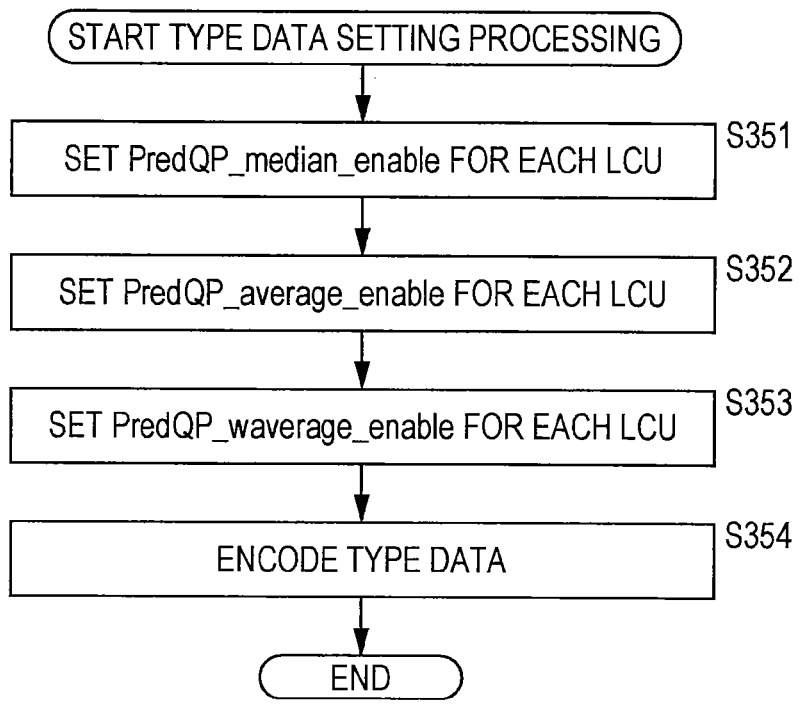
FIG. 22 is a flowchart explaining an example of a flow of type data setting processing.

Subsequently, an example of flow of type data setting processing for setting the type data will be explained with reference to the flowchart of FIG. 22. In the explanation below, for the sake of explanation, the type data are set for each LCU.

When type data setting processing is started, the type data setting unit 351 sets PredQP_median_enable for each LCU in step S351. In step S352, the type data setting unit 351 sets PredQP_average_enable for each LCU. In step S353, the type data setting unit 351 sets PredQP_waverage_enable for each LCU.

In step S354, the type data setting unit 351 provides the type data including various kinds of flags generated in step S351 to step S353 to the lossless coding unit 106 to have the lossless coding unit 106 encode them, and, for example, has them transmitted to the decoding side in such a manner that they are included in sequence parameter set (SPS), picture parameter set (PPS), and the like.

When the processing in step S354 is finished, the type data setting unit 351 terminates the type data setting processing.

[Flow of Predicted Quantization Parameter Generation Processing]

Figure 23:
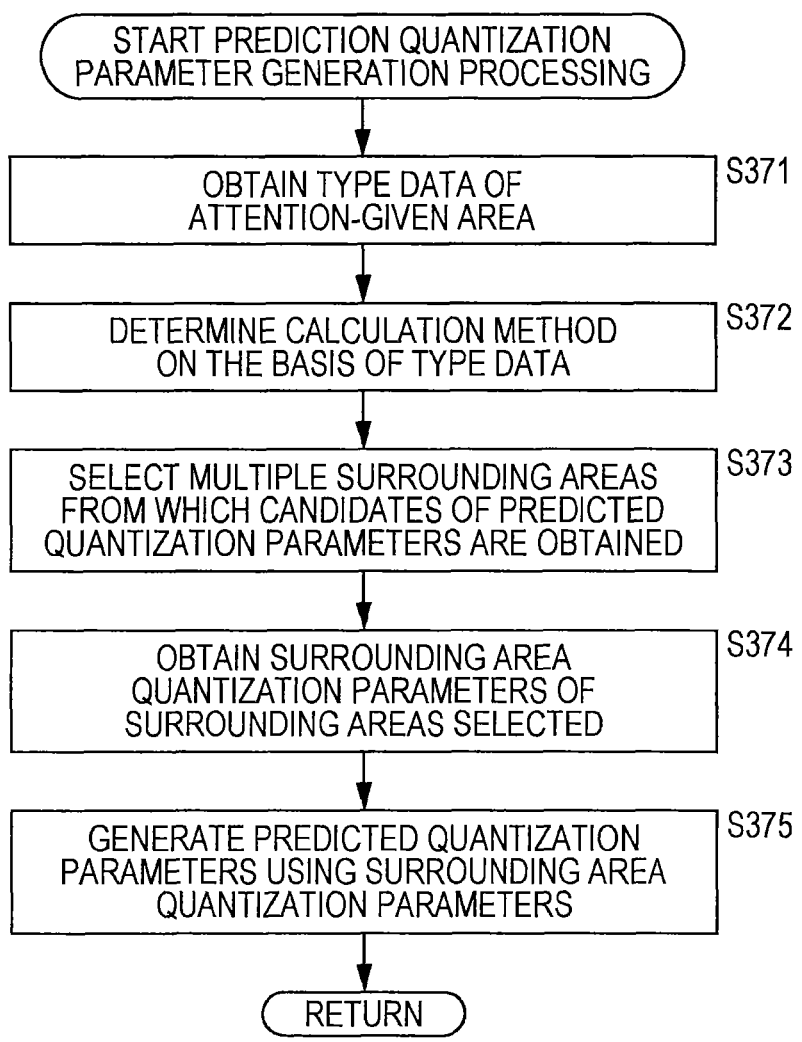
FIG. 23 is a flowchart explaining still another example of a flow of predicted quantization parameter generation processing.

Subsequently, an example of flow of predicted quantization parameter generation processing in this case will be explained with reference to the flowchart of FIG. 23. When the predicted quantization parameter generation processing is started, the type data buffer 361 obtains the type data of the current area in step S371. In step S372, the calculation control unit 362 determines the calculation method of the predicted quantization parameter generation on the basis of the type data obtained in step S371.

In step S373, the predicted quantization parameter generation unit 151 selects multiple surrounding areas from which candidates of predicted quantization parameters are obtained. In step S374, the predicted quantization parameter generation unit 151 obtains the surrounding area quantization parameters of the surrounding areas selected. In step S375, the predicted quantization parameter generation unit 151 generates the predicted quantization parameters using the surrounding area quantization parameters.

When the processing in step S375 is finished, the predicted quantization parameter generation unit 151 terminates the predicted quantization parameter generation processing, and returns the processing back to FIG. 8.

As described above, the predicted quantization parameter generation unit 151 generates a predicted quantization parameter in accordance with the type data. Accordingly, the predicted quantization parameter generation unit 151 can select more appropriate calculation method.

[Quantization Parameter Decoding Unit and the Like]

FIG. 24 is a block diagram illustrating an example of main configuration of the quantization parameter decoding unit 221 and the like in this case. As illustrated in FIG. 24, the quantization parameter decoding unit 221 has the configuration as illustrated in FIG. 20, and corresponds to the quantization parameter coding unit 121 for generating the predicted quantization parameter according to the method as described above, and the quantization parameter coding unit 121 correctly generates the attention area quantization parameter from the generated difference quantization parameter. More specifically, as illustrated in FIG. 24, the quantization parameter decoding unit 221 generates the predicted quantization parameter according to the same method as the quantization parameter coding unit 121 as illustrated in FIG. 20.

As illustrated in FIG. 24, the quantization parameter decoding unit 221 in this case includes a type data buffer 381 and a calculation control unit 382.

The type data buffer 381 obtains and stores the type data which is extracted by the lossless decoding unit 202 and transmitted from the decoding side. The type data buffer 381 provides the stored type data buffer 381 to the calculation control unit 382 with predetermined timing or in accordance with external request.

The calculation control unit 382 reads, from the type data buffer 381, type data corresponding to the current area for which the predicted quantization parameter generation unit 241 generates the predicted quantization parameter, in accordance with the same method as the calculation control unit 362. The calculation control unit 382 determines, in accordance with the type data and the like, the calculation method with which the predicted quantization parameter is calculated, and notifies the calculation method to the predicted quantization parameter generation unit 241.

The predicted quantization parameter generation unit 241 calculates the predicted quantization parameter generation in accordance with the method designated by the calculation control unit 382.

More specifically, the quantization parameter decoding unit 221 performs the same processing as each processing explained with reference to the flowchart of FIG. 23 in the predicted quantization parameter generation processing.

As described above, by doing so, the quantization parameter decoding unit 221 can correctly restructure the attention area quantization parameter used in the quantization processing in the image coding device 100 even in this case.

[Type Data]

The calculation method corresponding to the type data may be any method, and may be methods other than those explained above. Alternatively, the type data may not correspond to some or all of the calculation methods explained above. Further, flags included in the type data are not limited, and those other than the flags explained above may also be included in the type data. For example, as illustrated in FIG. 25, PredQP_type_flag may be included.

PredQP_type_flag is flag information indicating calculation method that can be used for calculation of the predicted quantization parameter generation in the data unit with which this flag is set. For example, when the value of this flag is "00", the use of all of the calculation methods is prohibited, and the predicted quantization parameter generation unit 151 cannot execute the prediction calculation. When the value of this flag is "01", the use of the median calculation is not prohibited, and the calculation control unit 362 can select the median calculation for calculation of the predicted quantization parameter generation.

When the value of this flag is "10", the use of the average calculation is not prohibited, and the calculation control unit 362 can select the average calculation for calculation of the predicted quantization parameter generation. When the value of this flag is "11", the use of both of the median calculation and the average calculation are not prohibited, and the calculation control unit 362 can make selection from both of the median calculation and the average calculation.

It may also be configured such that which value allows or prohibits the use of which calculation. The type and the number of calculation methods controlled with PredQP_type_flag are not what have been described above. Further, the bit length of PredQP_type_flag may be three or more.

[Flow of Type Data Setting Processing]

When PredQP_type_flag explained above is adopted as type data, the configuration of the quantization parameter coding unit 121 and the like is the same as what has been described above with reference to FIG. 20. The flow of the predicted quantization parameter generation processing is the same as what has been described with reference to the flowchart of FIG. 23.

Figure 26:
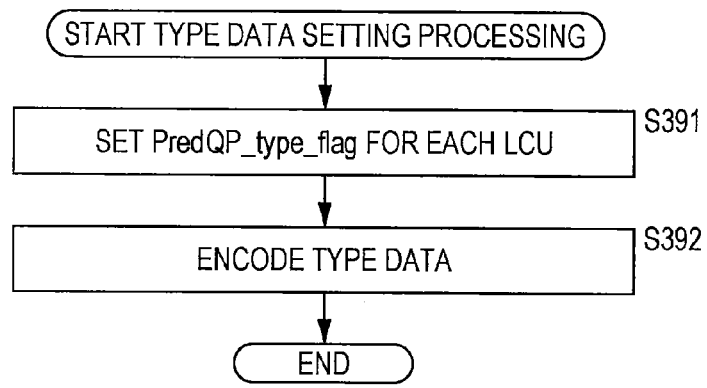
FIG. 26 is a flowchart explaining another example of a flow of type data setting processing.

An example of flow of type data setting processing where such PredQP_type_flag is adopted as type data will be explained with reference to the flowchart of FIG. 26.

When type data setting processing is started, the type data setting unit 351 sets PredQP_type_flag for each LCU in step S391. This setting is provided and held in the type data buffer 361. In step S392, the type data setting unit 351 provides the type data set in the processing in step S391 to the lossless coding unit 106 to have the lossless coding unit 106 encode the data and transmit the encoded data to the decoding side.

As described above, the predicted quantization parameter generation unit 151 generates a predicted quantization parameter in accordance with the type data. Accordingly, the predicted quantization parameter generation unit 151 can select more appropriate calculation method.

PredQP_type_flag can also be set for each of any given data unit such as picture, slice, LCU, CU.

The number and type of prediction calculation controlled by the type data may be changeable. Even in such case, information indicating the number and type of prediction calculation controlled by the type data may also be transmitted to the decoding side.

For example, the present technique can be applied to an image coding device and an image decoding device which are used when receiving image information (bit stream) compressed by orthogonal transformation such as discrete cosine transform and motion compensation such as MPEG, H.26×, via network medium such as satellite broadcast, cable television, the Internet, or cellular phone. The present technique can be applied to an image coding device and an image decoding device used for processing on recording media such as optical, magnetic disks, and flash memories. Further, this technique can also be applied to a motion prediction compensation device included in the image coding device, the image decoding device, and the like.

6. Sixth Embodiment

[Prediction of LCU Unit]

By the way, when the processing is done with LCU (maximum coding unit) unit (LCU-based), the processing is closed within the LCU, and therefore, rate control becomes easy. However, in this case, the buffer used to calculate the quantization parameter (difference quantization parameter/predicted quantization parameter) is also controlled with the LCU unit, and the data are reset (discarded) with the LCU unit.

When the processing is done with the LOU unit (LOU-based), the prediction of the quantization parameter is done with a unit less than the LCU such as CU and TU. For example, when the prediction of the quantization parameter is done for each CU, and the current CU is a CU at the first position (at the upper left corner in a case of raster scan) of the coding order (decoding order) within the LCU, the surrounding CU looked up during prediction is located outside of the current LCU (within another LCU).

Accordingly, with the resetting of the buffer, the quantization parameter is discarded, and the state is likely to be unusable (unavailable state (not available state)).

Therefore, when the processing is done with the LCU unit (LCU-based), and the prediction of the quantization parameter is done for each area which is less than the LCU (for example, CU), then the processing may be performed as follows. When the surrounding area of the current area (for example, Current CU) is located outside of the current LCU, the quantization parameter of the area processed immediately before (prior thereto) (for example, Previous CU) may be looked up. More specifically, the quantization parameter of the area for which the difference quantization parameter is calculated immediately before may be adopted as the predicted quantization parameter (or may be used for calculation of the predicted quantization parameter).

This will be explained more specifically with reference to FIG. 27. Suppose that the processing is done with the LCU unit (LCU-based), and the prediction of the quantization parameter is done for each CU. Each CU within the LCU is done in the order of raster scan. Further, supposed that the current CU (Current CU) is located at the upper left corner of the current LCU (Current LCU) (more specifically, CU that is subjected to encoding processing within the current LCU at the beginning). Suppose that the CU processed immediately before (Previous CU) is located at the lower right of the LCU adjacent to the left side of the current LCU (LCU processed immediately before (Previous LCU)) (more specifically, CU that is subjected to the encoding processing within the Previous LCU at the last).

When the surrounding CUs looked up in the prediction of the quantization parameter of the current CU (Current CU) are CU (A), CU (B), and CU (C), all the CUs are located outside of the current LCU. Therefore, all of these CUs are determined to be unusable (unavailable state (not available state)), and instead of them, the quantization parameter $QP_{prev}$ of the CU processed immediately before (Previous CU) is adopted as predicted quantization parameter PredQP. More specifically, the difference quantization parameter dQP of quantization parameter $QP_{curr}$ of the current CU and the predicted quantization parameter PredQP is calculated according to the following expression (10).

$$dQP = QP_{curr} - \text{Pred}QP = QP_{curr} - QP_{prev} \qquad (10)$$

Figure 27:
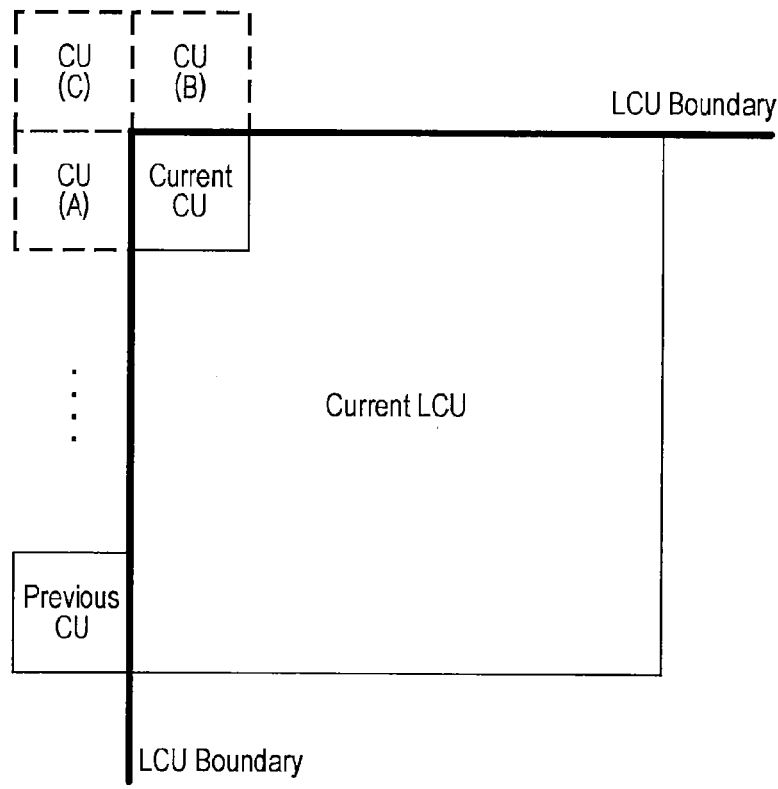
FIG. 27 is a figure illustrating an example of when prediction is done in unit of LCU.

For example, in the third embodiment, the surrounding area usage availability determination unit 301 of the quantization parameter coding unit 121 (FIG. 14) determines whether the surrounding area (for example, CU (A) to CU (C) in FIG. 27) is usable or not (available state or not) from the position of the current area (for example, Current CU in FIG. 27) and the like. As shown in the example of FIG. 27, when all the surrounding areas are determined to be unusable (located outside of the Current LCU, and not available state), the calculation control unit 302 designates the area processed before (for example, Previous CU in FIG. 27) as a reference target. The predicted quantization parameter generation unit 151 adopts the quantization parameter of the area processed before (for example, Previous CU in FIG. 27) as the predicted quantization parameter. The difference quantization parameter generation unit 152 generates the difference quantization parameter which is difference between the predicted quantization parameter and the quantization parameter of the current area (for example, Current CU in FIG. 27).

By doing so, the image coding device 100 performs the processing with the LCU unit (LCU-based), thus making the rate control easy and more reliably generating the predicted quantization parameter.

This kind of method can be applied to not only the predicted quantization parameter generation that is performed during encoding but also the predicted quantization parameter generation that is performed during the decoding. For example, as illustrated in FIG. 16, the quantization parameter decoding unit 221 generates the predicted quantization parameter in accordance with the same method as the quantization parameter coding unit 121 as illustrated in FIG. 14.

In this case, for example, the surrounding area usage availability determination unit 311 of the quantization parameter decoding unit 221 (FIG. 16) determines whether the surrounding area (for example, CU (A) to CU (C) in FIG. 27) is usable or not (available state or not) from the position of the current area (for example, Current CU in FIG. 27) and the like. As shown in the example of FIG. 27, when all the surrounding areas are determined to be unusable (located outside of the Current LCU, and not available state), the calculation control unit 312 designates the area processed before (for example, Previous CU in FIG. 27) as a reference target. The predicted quantization parameter generation unit 241 adopts the quantization parameter of the area processed before (for example, Previous CU in FIG. 27) as the predicted quantization parameter. The attention area difference quantization parameter restructuring unit 242 adds the predicted quantization parameter and the difference quantization parameter of the current area (for example, Current CU in FIG. 27), thus restructuring the attention area quantization parameter. The inverse-quantization processing unit 234 uses the attention area quantization parameter to perform inverse-quantization processing on the orthogonal transformation coefficient.

By doing so, the image decoding device 200 performs the processing with the LCU unit (LOU-based), thus making the rate control easy and more reliably generating the predicted quantization parameter.

7. Seventh Embodiment

[Application to Multi-View Image Point Coding/Multi-Viewpoint Image Decoding]

Figure 28:
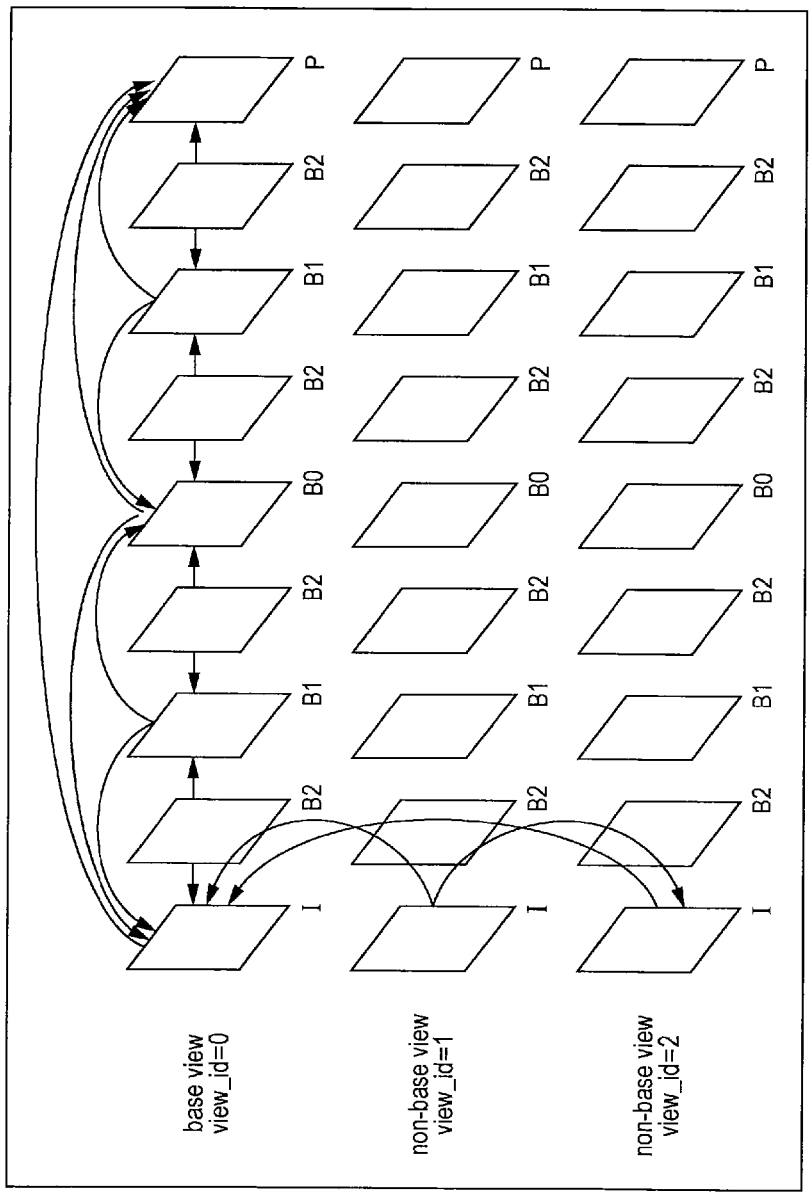
FIG. 28 is a figure illustrating an example of a multi-viewpoint image coding method.

The above series of processing can be applied to multi-viewpoint image coding/multi-viewpoint image decoding. FIG. 28 illustrates an example of multi-viewpoint image coding method.

As illustrated in FIG. 28, a multi-viewpoint image includes images for multiple view points, and images of predetermined viewpoint of the multiple viewpoints are designated as base view images. Images of viewpoints other than the base view image are treated as non-base view images.

When multi-viewpoint image coding as shown in FIG. 28 is done, the difference of the quantization parameter can be obtained in each view (same view).

(1) base view:

$$dQP(\text{base view}) = 4P_{curr}(\text{base view}) - \text{Pred}QP(\text{base view})$$

(2) non-base view:

$$dQP(\text{non-base view}) = QP_{curr}(\text{non-base view}) - \text{Pred}QP(\text{non-base view})$$

The difference of the quantization parameter can be obtained in each view (different view).

(3) base view/non-base view:

$$dQP(\text{inter view}) = QP_{curr}(\text{base view}) - QP_{curr}(\text{non-base view})$$

(4) non-base view/non-base view:

$$dQP(\text{inter view}) = QP_{curr}(\text{non-base view } i) - QP_{curr}(\text{non-base view } j)$$

Using the quantization parameter of an area of a different view, the prediction value PredQP of the quantization parameter $QP_{curr}$ of the current area may be generated by any calculation such as median, average, weighted average, or the like.

(5) base view:
(5-1) PredQP(base view)=Med($QP_a$(non-base view), $QP_b$(non-base view), $QP_c$(non-base view))
(5-2) PredQP(base view)=Avr($QP_a$(non-base view), $QP_b$(non-base view), $QP_c$(non-base view))
(5-3) PredQP(base view)=(x×$QP_a$(non-base view)+y×$QP_b$(non-base view)+z×$QP_c$(non-base view))/(x+y+z)

(6) non-base view:
(6-1) PredQP(non-base view i)=Med($QP_a$(non-base view j), $QP_b$(non-base view j), $QP_c$(non-base view j))
(6-2) PredQP(non-base view i)=Avr($QP_a$(non-base view j), $QP_b$(non-base view j), $QP_c$(non-base view j))
(6-3) PredQP(non-base view i)=(x×$QP_a$(non-base view j)+y×$QP_b$(non-base view j)+z×$QP_c$(non-base view j))/(x+y+z)

It is to be understood that, even in such case, whether the surrounding area used for calculation of the predicted quantization parameter is usable or not may be confirmed as explained in the third embodiment. Then, the prediction value PredQP may be calculated using only the usable area. The method of calculation of the prediction value PredQP may be determined on the basis of the usable area. For example, as explained in the third embodiment, calculation used for prediction may be selected from among the calculation methods such as median and average in accordance with the number of usable areas.

Even in such case, as explained in the fourth embodiment, the prediction value PredQP may be calculated on the basis of the weighted average calculation of the quantization parameters of multiple surrounding areas of views different from that of the current area. In this case, weights may be given in accordance with the size of the surrounding area, or may be given in accordance with the similarity with the size of the current area.

Further, even in such case, as explained in the fifth embodiment, setting as to whether to allow usage of various kinds of calculations for calculating the predicted quantization parameter may be done on the basis of, for example, user's instruction, external instruction of processing. The type data including the setting may be transmitted to the decoding side. The type data may include flags indicating whether applicable or not for each calculation method, or include usable calculation method.

The flags included in the type data may be set individually for each of the base view image and non-base view image, or may be set as common information for both of the base view image and non-base view image.

The prediction of the quantization parameter as described above is also performed in the same manner in the image decoding device as explained in the second to fifth embodiments.

For each dQP explained above, a flag may be set to distinguish whether there is any dQP of which value is not zero.

[Multi-Viewpoint Image Coding Device]

Figure 29:
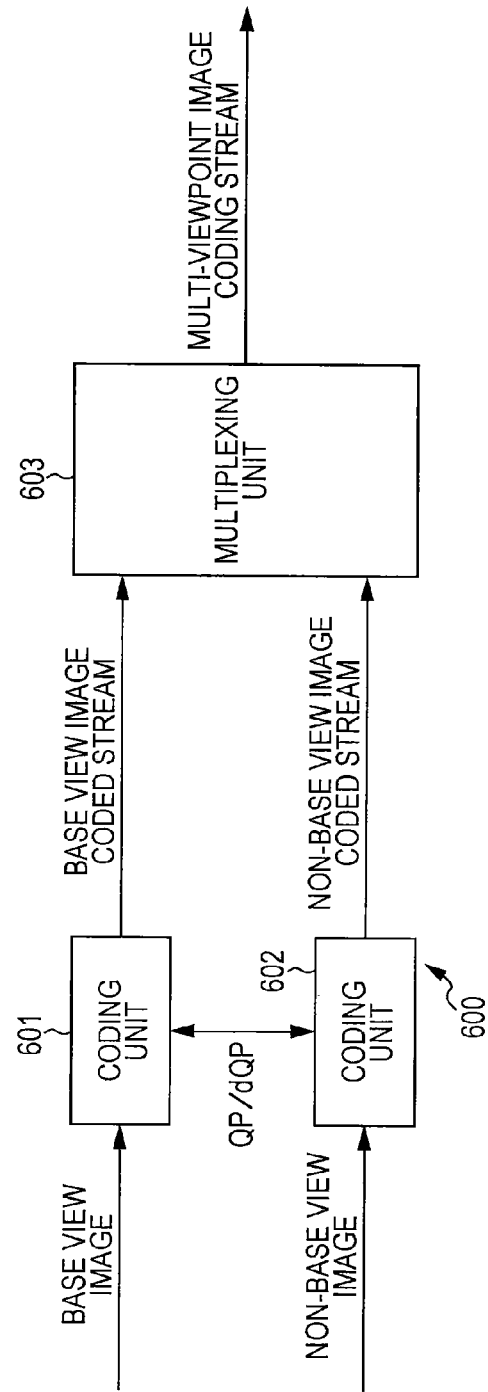
FIG. 29 is a figure illustrating an example of main configuration of a multi-viewpoint image coding device to which the present technique is applied.

FIG. 29 is a figure illustrating a multi-viewpoint image coding device performing the multi-viewpoint image coding explained above. As illustrated in FIG. 29, a multi-viewpoint image coding device 600 includes a coding unit 601, a coding unit 602, and a multiplexing unit 603.

The coding unit 601 encodes base view images, and generates a base view image coded stream. The coding unit 602 encodes non-base view images, and generates a non-base view image coded stream. The multiplexing unit 603 multiplexes the base view image coded stream generated by the coding unit 601 and the non-base view image coded stream generated by the coding unit 602, and generates a multi-viewpoint image coded stream.

The image coding device 100 (FIG. 1) can be applied to the coding unit 601 and coding unit 602 of the multi-viewpoint image coding device 600. In this case, the multi-viewpoint image coding device 600 sets and transmits a difference value between the quantization parameter set by the coding unit 601 and the quantization parameter set by the coding unit 602.

[Multi-Viewpoint Image Decoding Device]

Figure 30:
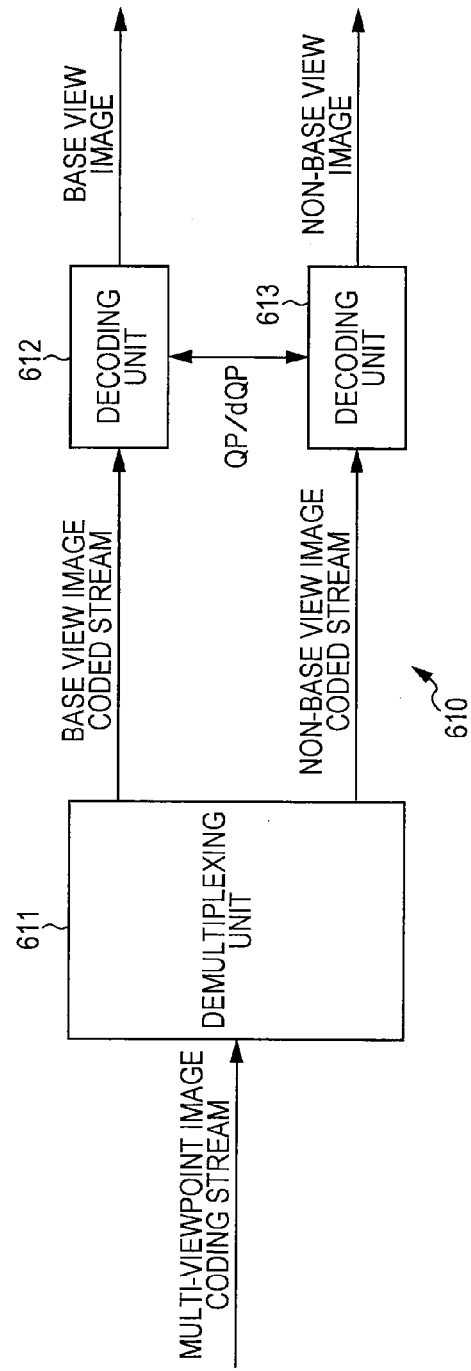
FIG. 30 is a figure illustrating an example of main configuration of a multi-viewpoint image decoding device to which the present technique is applied.

FIG. 30 is a figure illustrating a multi-viewpoint image decoding device that performs the multi-viewpoint image decoding explained above. As illustrated in FIG. 30, the multi-viewpoint image decoding device 610 includes a demultiplexing unit 611, a decoding unit 612, and a decoding unit 613.

The demultiplexing unit 611 demultiplexes the multi-viewpoint image coded stream obtained by multiplexing the base view image coded stream and the non-base view image coded stream, and extracts the base view image coded stream and the non-base view image coded stream. The decoding unit 612 decodes the base view image coded stream extracted by the demultiplexing unit 611, and obtains the base view images. The decoding unit 613 decodes the non-base view image coded stream extracted by the demultiplexing unit 611, and obtains the non-base view images.

The image decoding device 200 (FIG. 10) can be applied to the decoding unit 612 and decoding unit 613 of the multi-viewpoint image decoding device 610. In this case, the multi-viewpoint image decoding device 610 sets the quantization parameter from the difference value between the quantization parameter set by the coding unit 601 and the quantization parameter set by the coding unit 602, and performs the inverse-quantization.

8. Eighth Embodiment

[Application to Hierarchical Image Point]Coding/Hierarchical Image Decoding

Figure 31:
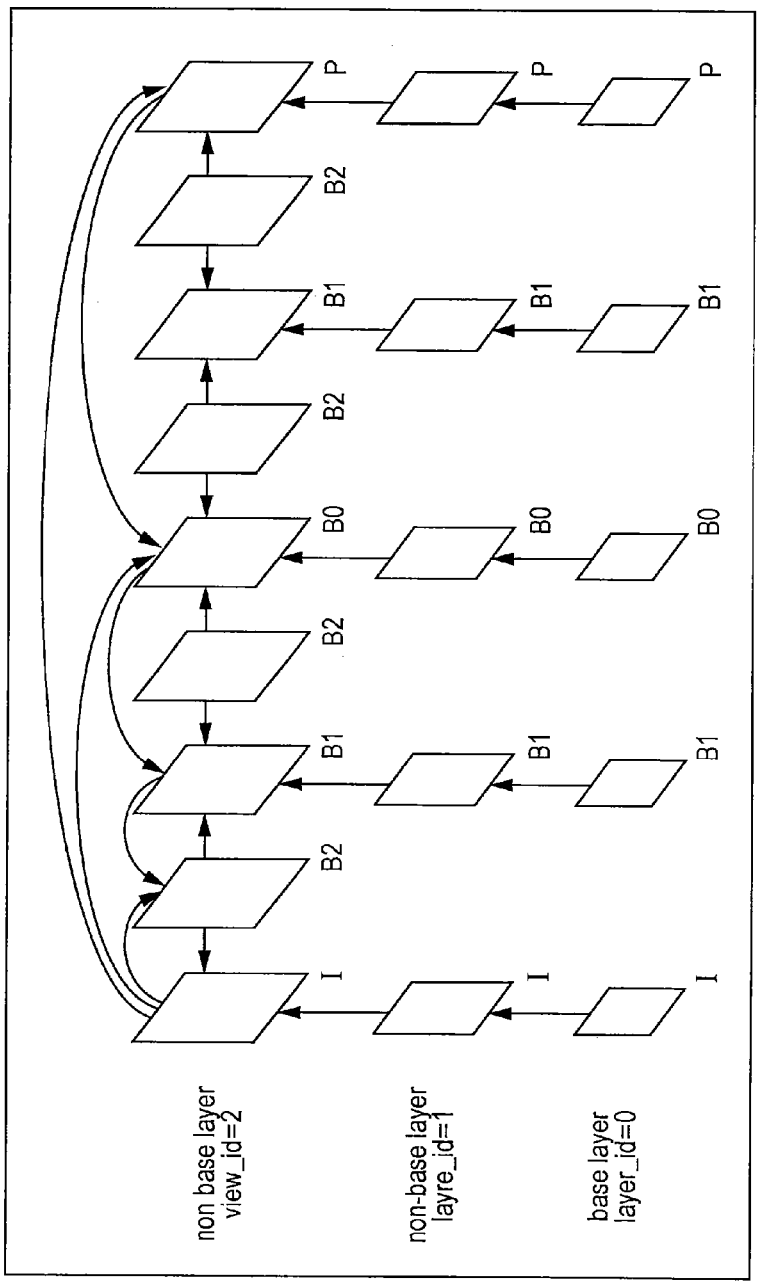
FIG. 31 is a figure illustrating an example of a hierarchical image coding method.

The above series of processing can be applied to hierarchical image coding/hierarchical image decoding. FIG. 31 illustrates an example of multi-viewpoint image coding method.

As illustrated in FIG. 31, a hierarchical image includes images of multiple hierarchical (resolution), and a hierarchical image of a predetermined one of the multiple resolution is designated as a base layer image. Images of hierarchies other than the base layer image are treated as non-base layer images.

The hierarchical image coding (spatial scalability) as illustrated in FIG. 31 is performed, difference of the quantization parameters may be obtained in each layer (the same layer).

(1) base layer:

$dQP(\text{base layer})=QP_{curr}(\text{base layer})-\text{Pred}QP(\text{base layer})$ (2) non-base layer:

$dQP(\text{non-base layer})=QP_{curr}(\text{non-base layer})-\text{Pred}QP(\text{non-base layer})$ Alternatively, difference of the quantization parameters may be obtained in each layer (different layers).

(3) base layer/non-base layer:

$dQP(\text{inter layer})=QP_{curr}(\text{base layer})-QP_{curr}(\text{non-base layer})$ (4) non-base layer/non-base layer:

$dQP(\text{inter layer})=QP_{curr}(\text{non-base layer } i)-QP_{curr}(\text{non-base layer } j)$ Using the quantization parameter of an area of a different layer, the prediction value PredQP of the quantization parameter $QP_{curr}$ of the current area may be generated by any calculation such as median, average, weighted average, or the like.

(5) base layer:

(5-1) $\text{PredQP}(\text{base layer})=\text{Med}(QP_a(\text{non-base layer}), QP_b(\text{non-base layer}), QP_c(\text{non-base layer}))$ (5-2) $\text{PredQP}(\text{base layer})=\text{Avr}(QP_a(\text{non-base layer}), QP_b(\text{non-base layer}), QP_c(\text{non-base layer}))$ (5-3) $\text{PredQP}(\text{base layer})=(x \times QP_a(\text{non-base layer})+y \times QP_b(\text{non-base layer})+z \times QP_c(\text{non-base layer}))/(x+y+z)$ (6) non-base layer:

(6-1) $\text{PredQP}(\text{non-base layer } i)=\text{Med}(QP_a(\text{non-base layer } j), QP_b(\text{non-base layer } j), QP_c(\text{non-base layer } j))$ (6-2) $\text{PredQP}(\text{non-base layer } i)=\text{Avr}(QP_a(\text{non-base layer } j), QP_b(\text{non-base layer } j), QP_c(\text{non-base layer } j))$ (6-3) $\text{PredQP}(\text{non-base layer } i)=(x \times QP_a(\text{non-base layer } j)+y \times QP_b(\text{non-base layer } j)+z \times QP_c(\text{non-base layer } j))/(x+y+z)$ It is to be understood that, even in such case, whether the surrounding area used for calculation of the predicted quantization parameter is usable or not may be confirmed as explained in the third embodiment. Then, the prediction value PredQP may be calculated using only the usable area. The method of calculation of the prediction value PredQP may be determined on the basis of the usable area. For example, as explained in the third embodiment, calculation used for prediction may be selected from among the calculation methods such as median and average in accordance with the number of usable areas.

Even in such case, as explained in the fourth embodiment, the prediction value PredQP may be calculated on the basis of the weighted average calculation of the quantization parameters of multiple surrounding areas of layers different from that of the current area. In this case, weights may be given in accordance with the size of the surrounding area, or may be given in accordance with the similarity with the size of the current area.

Further, even in such case, as explained in the fifth embodiment, setting as to whether to allow usage of various kinds of calculations for calculating the predicted quantization parameter may be done on the basis of, for example, user's instruction, external instruction of processing. The type data including the setting may be transmitted to the decoding side. The type data may include flags indicating whether applicable or not for each calculation method, or include usable calculation method.

The flags included in the type data may be set individually for each of the base layer image and non-base layer image, or may be set as common information for both of the base layer image and non-base layer image.

The prediction of the quantization parameter as described above is also performed in the same manner in the image decoding device as explained in the second to fifth embodiments.

Like the method explained above, for each dQP explained above, a flag may be set to distinguish whether there is any dQP of which value is not zero.

[Hierarchical Image Coding Device]

Figure 32:
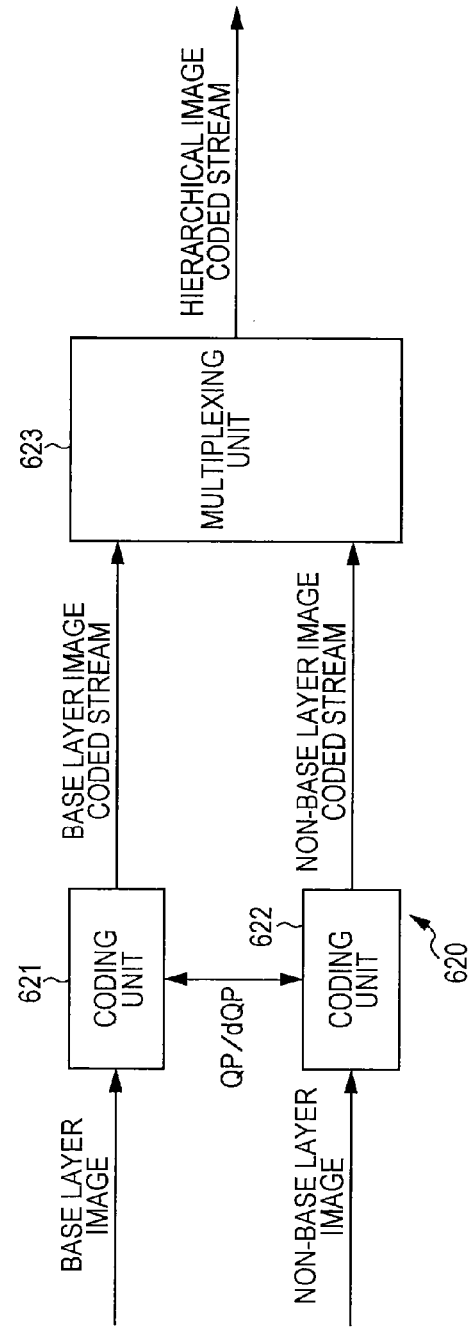
FIG. 32 is a figure illustrating an example of main configuration of a hierarchical image coding device to which the present technique is applied.

FIG. 32 is a figure illustrating a hierarchical image coding device that performs the hierarchical image coding explained above. As illustrated in FIG. 32, the hierarchical image coding device 620 includes a coding unit 621, a coding unit 622, and a multiplexing unit 623.

The coding unit 621 encodes base layer images, and generates a base layer image coded stream. The coding unit 622 encodes non-base layer images, and generates a non-base layer image coded stream. The multiplexing unit 623 multiplexes the base layer image coded stream generated by the coding unit 621 and the non-base layer image coded stream generated by the coding unit 622, and generates a hierarchical image coded stream.

The image coding device 100 (FIG. 1) can be applied to the coding unit 621 and the coding unit 622 of the hierarchical image coding device 620. In this case, hierarchical image coding device 620 sets and transmits a difference value between the quantization parameter set by the coding unit 621 and the quantization parameter set by the coding unit 622.

[Hierarchical Image Decoding Device]

Figure 33:
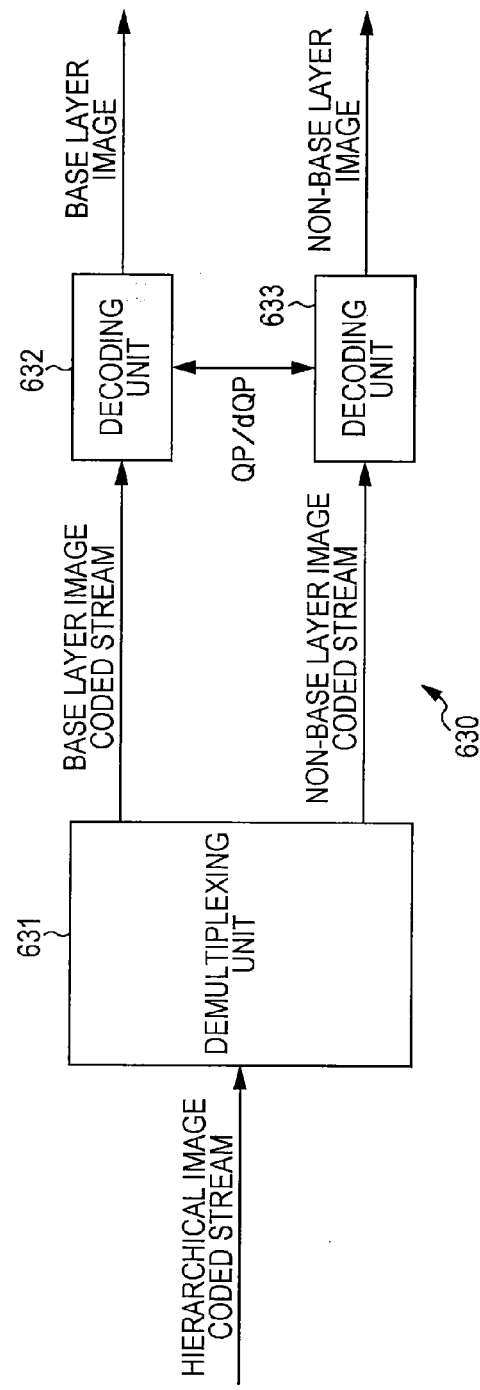
FIG. 33 is a figure illustrating an example of main configuration of a hierarchical image decoding device to which the present technique is applied.

FIG. 33 is a figure illustrating a hierarchical image decoding device that performs the hierarchical image decoding explained above. As illustrated in FIG. 33, the hierarchical image decoding device 630 includes a demultiplexing unit 631, a decoding unit 632, and a decoding unit 633.

The demultiplexing unit 631 demultiplexes the hierarchical image coded stream obtained by multiplexing the base layer image coded stream and the non-base layer image coded stream, and extracts the base layer image coded stream and the non-base layer image coded stream. The decoding unit 632 decodes the base layer image coded stream extracted by the demultiplexing unit 631, and obtains the base layer image. The decoding unit 633 decodes the non-base layer image coded stream extracted by the demultiplexing unit 631, and obtains the non-base layer image.

The image decoding device 200 (FIG. 10) can be applied to the decoding unit 632 and the decoding unit 633 of the hierarchical image decoding device 630. In this case, the hierarchical image decoding device 630 sets the quantization parameter setting from the difference value between the quantization parameter set by the coding unit 621 and the quantization parameter set by the coding unit 622, and performs the inverse-quantization.

9. Ninth Embodiment

[Computer]

The above series of processing may be executed by hardware, or may be executed by software. When the series of processing is executed by software, programs constituting the software are installed to the computer. In this case, the computer includes a computer embedded into dedicated hardware and a general-purpose computer capable of executing various kinds of functions by installing various kinds of programs.

Figure 34:
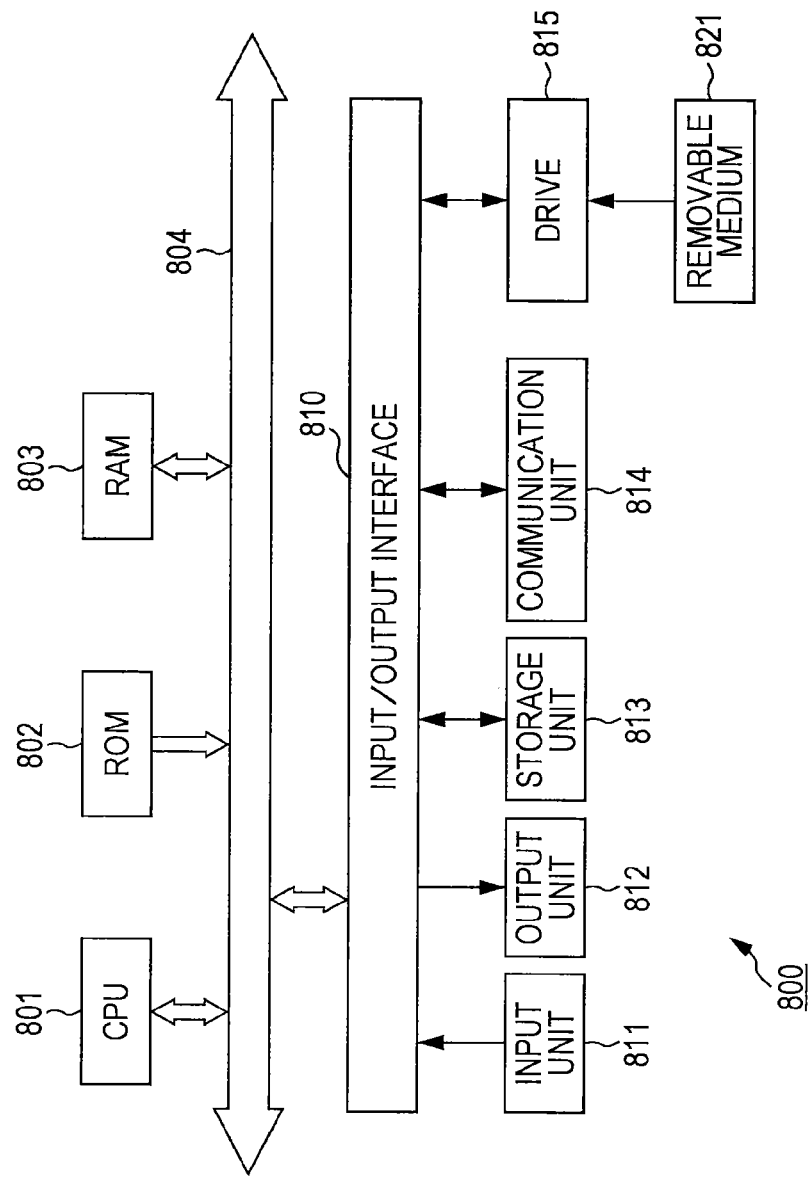
FIG. 34 is a block diagram illustrating an example of main configuration of a computer.

In FIG. 34, a CPU (Central processing Unit) 801 of a computer 800 executes various kinds of processing in accordance with a program stored in a ROM (Read Only Memory) 802 or program loaded from a storage unit 813 to a RAM (Random Access Memory) 803. As necessary, the RAM 803 also stores, e.g., data required for allowing the CPU 801 to execute various kinds of processing.

The CPU 801, the ROM 802, and the RAM 803 are connected to each other via a bus 804. This bus 804 is also connected to an input/output interface 810.

Input/output interface 810 is connected to an input unit 811 made of a keyboard, a mouse, and the like, a display made of a CRT (Cathode Ray Tube), an LCD (Liquid Crystal Display), and the like, an output unit 812 made of a speaker and the like, a storage unit 813 constituted by a hard disk and the like, and a communication unit 814 constituted by a modem and the like. The communication unit 814 performs communication unit via a network including the Internet.

The input/output interface 810 is also connected to a drive 815 as necessary, and removable medium 821 such as a magnetic disk, an optical disk, a magneto-optical disk, or a semiconductor memory is loaded as necessary, and a computer program read therefrom is installed to a storage unit 813 as necessary.

When the above series of processing is executed by software, programs constituting the software are installed from a network or a recording medium.

For example, as illustrated in FIG. 34, this recording medium is constituted by not only a removable medium 821 made of, e.g., a magnetic disk (including a flexible disk) recorded with a program, an optical disk (including CD-ROM (Compact Disc-Read Only Memory), a DVD (Digital Versatile Disc)), a magneto optical disk (including MD (Mini Disc)), or a semiconductor memory, which are distributed to distribute programs to users separately from the device main body but also the ROM 802 recorded with a program and a hard disk included in the storage unit 813 which are distributed to users while they are incorporated into the device main body in advance.

The program executed by the computer may be a program with which processing in performed in time sequence according to the order explained in this specification, or may be a program with which processing is performed in parallel or with necessary timing, e.g., upon call.

In this specification, steps describing the program recorded in the recording medium include processing performed in time sequence according to the described order. The steps may not be necessarily performed in time sequence, and the steps include processing executed in parallel or individually.

In this specification, the system includes the entire apparatus constituted by a plurality of devices.

A configuration explained as a device (or a processing unit) in the above explanation may be divided, and structured as multiple devices (or processing units). A configuration explained as multiple devices (or processing units) in the above explanation may be combined, and structured as a device (or a processing unit). Alternatively, it is to be understood that the configuration of each device (or each processing unit) may be added with any configuration other than the above. Further, when the configuration and operation of the entire system are substantially the same, a part of configuration of a certain device (or processing unit) may be included in the configuration of another device (or another processing unit). More specifically, this technique is not limited to the above embodiment, and may be changed in various manners as long as it is within the gist of this technique.

The image coding device and image decoding device according to the embodiments explained above can be applied to various kinds of electronic devices such as a transmitter or a receiver for distribution to terminals by satellite broadcasting, cable broadcasting such as cable television, distribution on the Internet, cellular communication, recording devices for recording images to a medium such as an optical disk, magnetic disk, and flash memory, or a reproduction device for reproducing images from these recording media. Hereinafter, four examples of applications will be explained.

First Example of Application

Television Device

Figure 35:
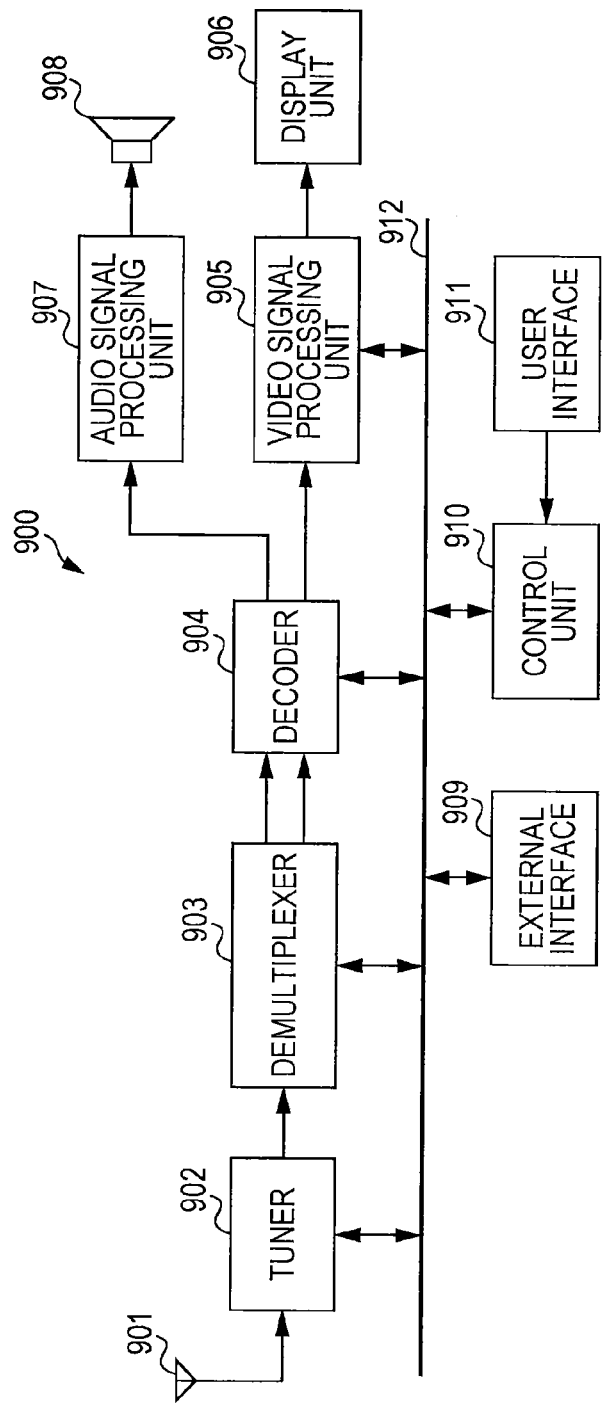
FIG. 35 is a block diagram illustrating an example of schematic configuration of a television device.

FIG. 35 illustrates an example of schematic configuration illustrating a television device to which the above embodiments are applied. The television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901, and demodulates the extracted signal. Then, the tuner 902 outputs the bit stream obtained from demodulation to the demultiplexer 903. More specifically, the tuner 902 plays a role of a transmission unit of the television device 900 for receiving the bit stream in which images are encoded.

The demultiplexer 903 separates the video stream and the audio stream of a viewing target program from the bit stream, and outputs each separated stream to the decoder 904. The demultiplexer 903 extracts auxiliary data such as EPG (Electronic Program Guide) from the bit stream, and provides the extracted data to the control unit 910. When the bit stream is scrambled, the demultiplexer 903 may perform descrambling.

The decoder 904 decodes the video stream and the audio stream received from the demultiplexer 903. Then, decoder 904 outputs the video data generated from the decoding processing to the video signal processing unit 905. The decoder 904 outputs the audio data generated from the decoding processing to the audio signal processing unit 907.

The video signal processing unit 905 plays the video data received from the decoder 904, and causes the display unit 906 to display the video. The video signal processing unit 905 may display, on the display unit 906, an application screen provided via the network. The video signal processing unit 905 may perform additional processing such as noise reduction on the video data in accordance with setting. Further, the video signal processing unit 905 generates an image of GUI (Graphical User Interface) such as menu, buttons, or cursor, and overlays the generated image on the output image.

The display unit 906 is driven by a driving signal provided from the video signal processing unit 905, and displays video or image on a video screen of a display device (such as liquid crystal display, plasma display or OELD (Organic Electro Luminescence Display) (organic EL display) and the like).

The audio signal processing unit 907 performs reproduction processing such as D/A conversion and amplification of audio data received from the decoder 904, and causes the speaker 908 to output audio. The audio signal processing unit 907 may perform additional processing such as noise reduction on the audio data.

The external interface 909 is an interface for connection between the television device 900 and external device or network. For example, a video stream or an audio stream received via the external interface 909 may be decoded by the decoder 904. More specifically, the external interface 909 also has a role of receiving the bit stream in which images are encoded and as a transmission unit of the television device 900.

The control unit 910 has a processor such as a CPU and the like, and memory such as RAM and ROM. The memory stores, e.g., programs executed by the CPU, program data, EPG data, and data obtained via the network. The program stored in the memory may be, for example, read and executed by the CPU when the television device 900 is activated. The CPU executes the program to control operation of the television device 900 in accordance with operation signal received from the user interface 911, for example.

The user interface 911 is connected to the control unit 910. The user interface 911 includes, e.g., buttons and switches with which the user operates the television device 900, and a reception unit for receiving a remote control signal. The user interface 911 generates an operation signal by detecting user's operation via these constituent elements, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 with each other.

In the television device 900 configured as described above, the decoder 904 has a function of an image decoding device according to the embodiments explained above. Accordingly, when the television device 900 decodes images, the coding efficiency for quantization parameter can be improved.

Second Example of Application

Cellular Phone

Figure 36:
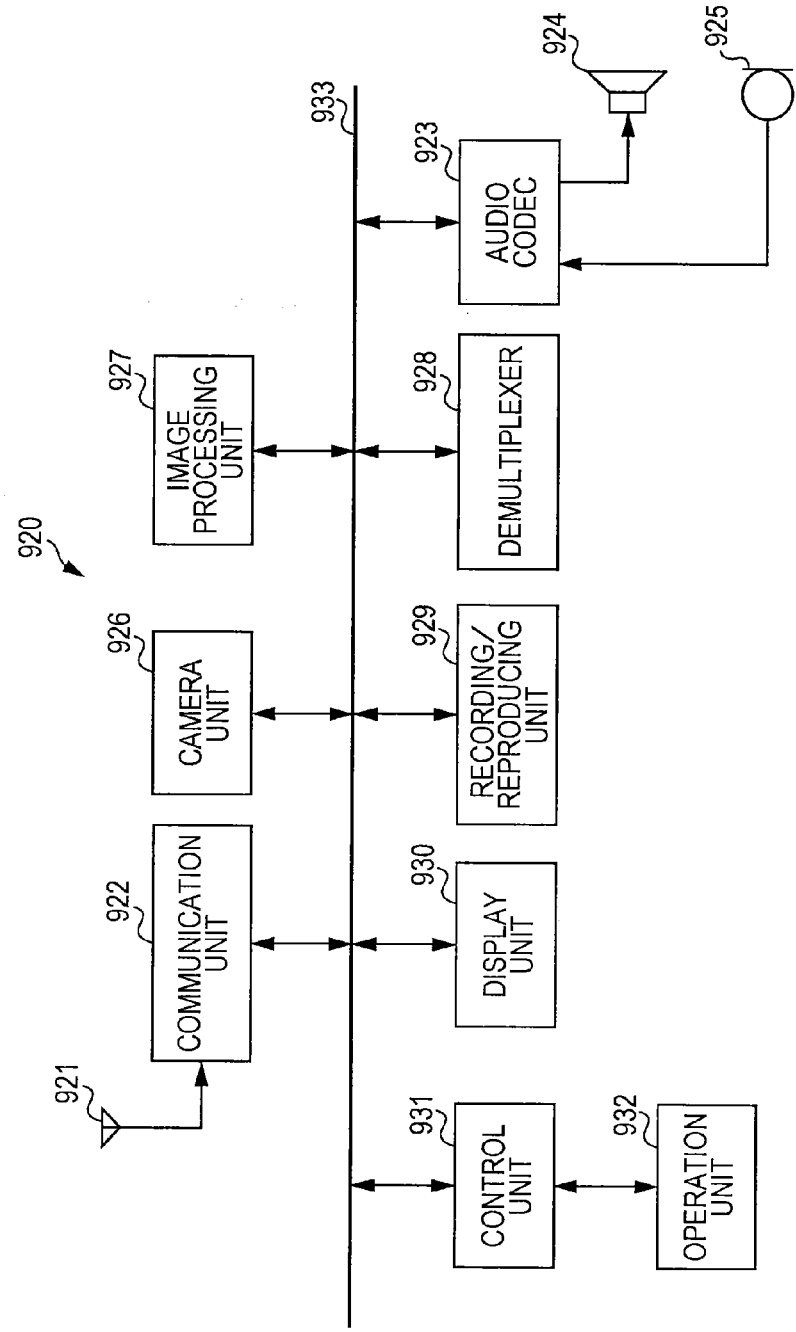
FIG. 36 is a block diagram illustrating an example of schematic configuration of a cellular phone.

FIG. 36 illustrates an example of schematic configuration illustrating a cellular phone to which the above embodiments are applied. The cellular phone 920 includes an antenna 921, a communication unit 922, an audio codec 923, speaker 924, a microphone 925, a camera unit 926, an image processing unit 927, a demultiplexer 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the demultiplexer 928, the recording/reproducing unit 929, the display unit 930, and the control unit 931 with each other.

The cellular phone 920 performs operation such as transmission/reception of audio signals, transmission/reception of e-mails or image data, capturing images, and recording data in various kinds of modes including audio phone call mode, data communication mode, shooting mode, and video call mode.

In the audio phone call mode, an analog audio signal generated by the microphone 925 is provided to the audio codec 923. The audio codec 923 converts an analog audio signal into audio data, performs A/D conversion on the converted audio data, and compresses the audio data. Then, the audio codec 923 outputs the compressed audio data to the communication unit 922. The communication unit 922 encodes and modulates the audio data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 generates audio data by demodulating and decoding a reception signal, and outputs the generated audio data to the audio codec 923. The audio codec 923 decompresses the audio data, performs D/A conversion, and generates an analog audio signal. Then, the audio codec 923 provides the generated audio signal to the speaker 924, and outputs audio.

In the data communication mode, for example, the control unit 931 generates text data constituting an e-mail in accordance given with user's operation with operation unit 932. The control unit 931 displays characters on the display unit 930. The control unit 931 generates e-mail data in accordance with user's transmission instruction given with the operation unit 932, and outputs the generated e-mail data to the communication unit 922. The communication unit 922 encodes and modulates e-mail data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 restores e-mail data by demodulating and decoding the reception signal, and outputs the restored e-mail data to the control unit 931. The control unit 931 displays the contents of the e-mail on the display unit 930, and stores the e-mail data to the recording medium of the recording/reproducing unit 929.

The recording/reproducing unit 929 has any given recording medium that can be read and written. For example, the recording medium may be an internal recording medium such as RAM or flash memory, and may be an externally-attached recording medium such as a hard disk, a magnetic disk, a magneto-optical disk, an optical disk, a USB (Unallocated Space Bitmap) memory, or a memory card.

In the shooting mode, for example, the camera unit 926 captures an image of a subject, generates image data, and outputs the generated image data to the image processing unit

927. The image processing unit 927 encodes the image data received from the camera unit 926, and records the bit stream to the recording medium of the recording reproduction unit 929.

In the video call mode, for example, the demultiplexer 928 multiplexes the video stream encoded by the image processing unit 927 and the audio stream received from the audio codec 923, and outputs the multiplexed stream to the communication unit 922. The communication unit 922 encodes and modulates the stream, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. The transmission signal and the reception signal may include a bit stream. Then, the communication unit 922 restores the stream by demodulating and decoding the reception signal, and outputs the restored stream to the demultiplexer 928. The demultiplexer 928 separates the video stream and the audio stream from the received stream, and outputs the video stream to the image processing unit 927 and the audio stream to the audio codec 923. The image processing unit 927 decodes the video stream, and generates video data. The video data are provided to the display unit 930, and the display unit 930 displays a series of images. The audio codec 923 decompresses the audio stream, performs D/A conversion, and generates an analog audio signal. Then, the audio codec 923 provides the generated audio signal to the speaker 924, and outputs audio.

In the cellular phone 920 configured as described above, the image processing unit 927 has a function of the image coding device and the image decoding device according to the embodiments explained above. Accordingly, when the cellular phone 920 encodes and decodes images, the coding efficiency for quantization parameter can be improved.

Third Example of Application

Recording/Reproducing Device

Figure 37:
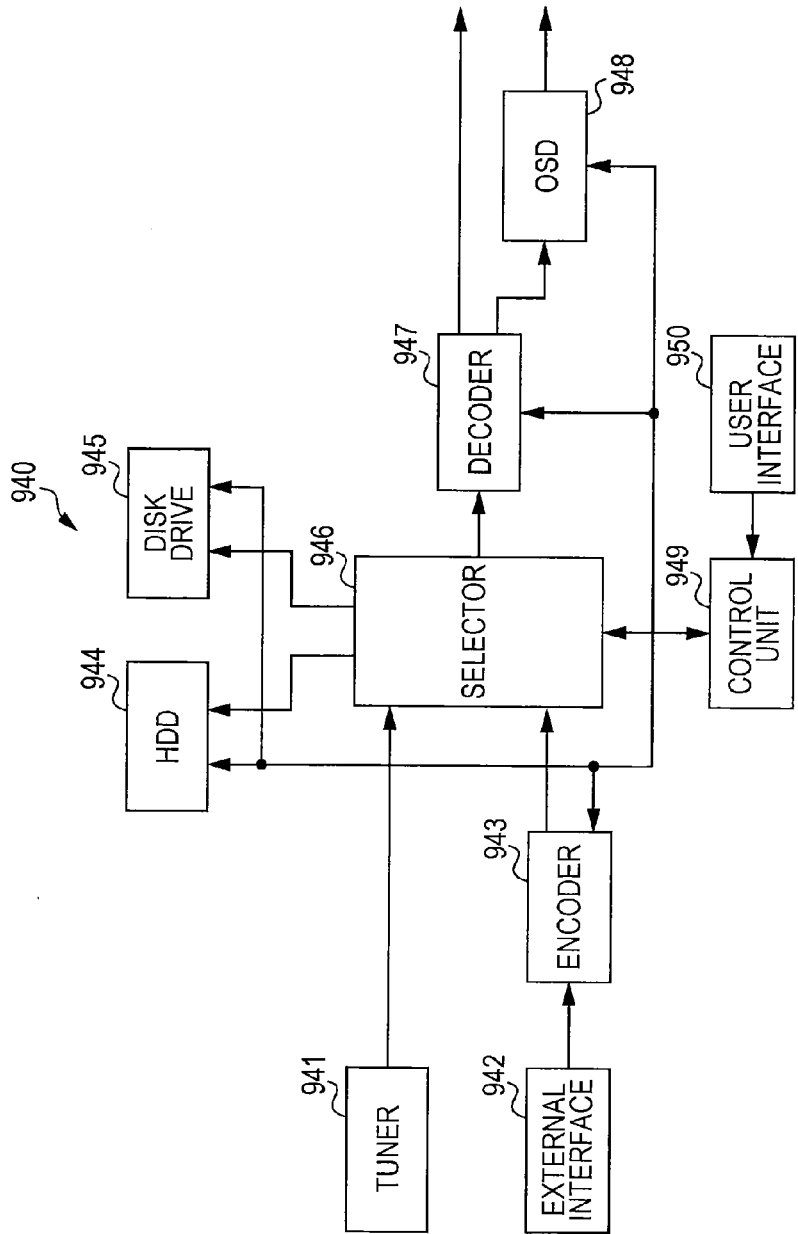
FIG. 37 is a block diagram illustrating an example of schematic configuration of a recording/reproducing device.

FIG. 37 illustrates an example of schematic configuration illustrating a recording/reproducing device to which the above embodiments are applied. For example, the recording/reproducing device 940 encodes the audio data and the video data of received broadcasting program, and records them to the recording medium. For example, the recording/reproducing device 940 may encode the audio data and the video data of obtained from another device, and may record them to the recording medium. For example, the recording/reproducing device 940 reproduces the data recorded on the recording medium using the monitor and the speaker in accordance with user's instruction. At this occasion, the recording/reproducing device 940 decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcasting signal received via an antenna (not shown), and demodulates the extracted signal. Then, the tuner 941 outputs the bit stream obtained from demodulation to the selector 946. More specifically, the tuner 941 plays the role of a transmission unit of the recording/reproducing device 940.

The external interface 942 is an interface for connection between the recording/reproducing device 940 and external device or network. The external interface 942 may be, for example, an IEEE1394 interface, a network interface, a USB interface, a flash memory interface, or the like. For example, the video data and audio data received via the external interface 942 are input into the encoder 943. More specifically, the external interface 942 plays the role of a transmission unit of the recording/reproducing device 940.

When the video data and the audio data received from the external interface 942 are not encoded, the encoder 943 encodes the video data and the audio data. Then, the encoder 943 outputs the bit stream to the selector 946.

The HDD 944 records, within the internal hard disk, the bit stream obtained by compressing the content data such as video and audio and, various kinds of programs, and other data. When the video and audio are reproduced, the HDD 944 reads the data from the hard disk.

The disk drive 945 records and reads data to/from the recording medium loaded. The recording medium loaded to the disk drive 945 may be, for example, a DVD disk (DVD-Video, DVD-RAM, DVD-R, DVD-RW, DVD+R, DVD+RW, and the like) or Blu-ray (registered trademark) disk.

When the video and audio are recorded, the selector 946 selects the bit stream received from the tuner 941 or the encoder 943, and outputs the selected bit stream to the HDD 944 or the disk drive 945. When the video and audio are reproduced, the selector 946 outputs the bit stream received from the HDD 944 or the disk drive 945 to the decoder 947.

The decoder 947 decodes the bit stream, and generates video data and audio data. Then, the decoder 947 outputs the generated video data to an OSD 948. The decoder 904 outputs the generated audio data to an external speaker.

The OSD 948 reproduces the video data received from the decoder 947, and displays video. The OSD 948 may overlays images of GUI such as menu, buttons, or cursor, on the displayed video.

The control unit 949 has a processor such as a CPU and the like, and memory such as RAM and ROM. The memory records programs executed by the CPU, program data, and the like. The program stored in the memory may be, for example, read and executed by the CPU when the recording/reproducing device 940 is activated. The CPU executes the program to control operation of the recording/reproducing device 940 in accordance with operation signal received from the user interface 950, for example.

The user interface 950 is connected to the control unit 949. The user interface 950 includes, e.g., buttons and switches with which the user operates the recording/reproducing device 940, and a reception unit for receiving a remote control signal. The user interface 950 generates an operation signal by detecting user's operation via these constituent elements, and outputs the generated operation signal to the control unit 949.

In the recording/reproducing device 940 configured as described above, the encoder 943 has a function of the image coding device according to the above embodiment. The decoder 947 has a function of an image decoding device according to the embodiments explained above. Accordingly, when the recording/reproducing device 940 encodes and decodes images, the coding efficiency for quantization parameter can be improved.

Fourth Example of Application

[Image-Capturing]Device

Figure 38:
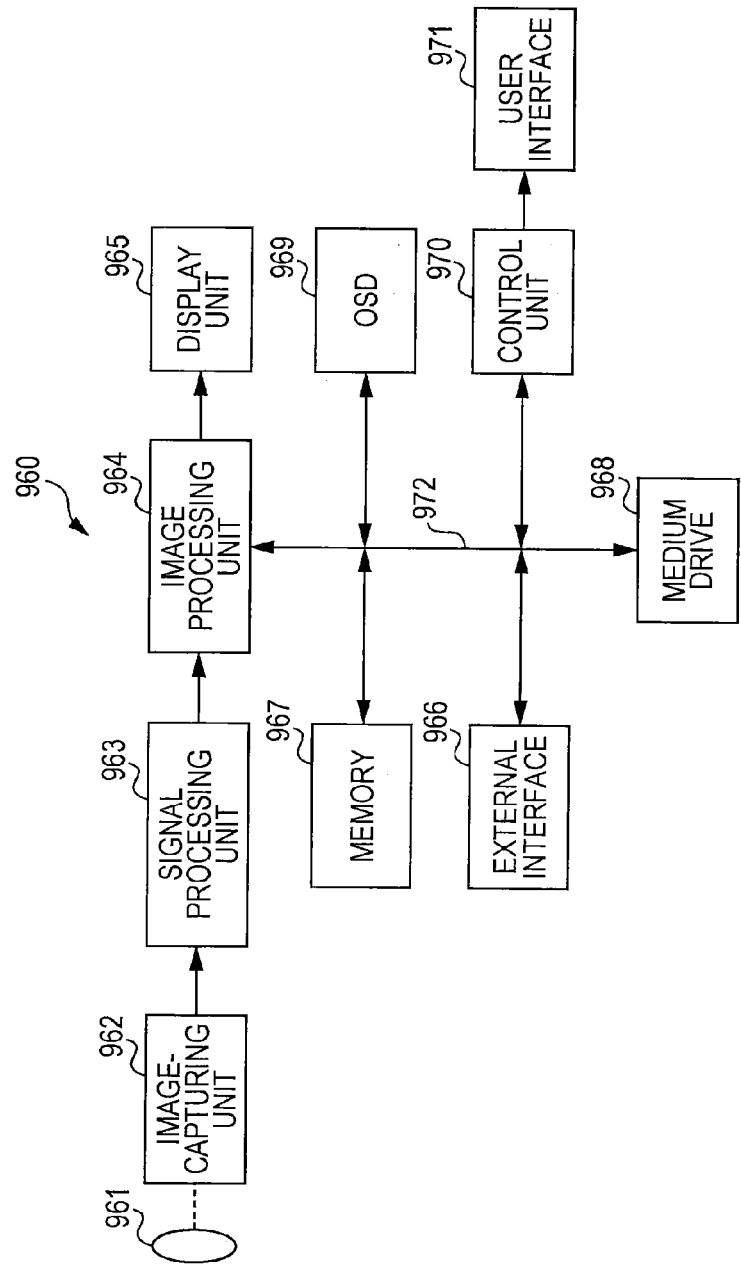
FIG. 38 is a block diagram illustrating an example of schematic configuration of an image-capturing device.

FIG. 38 illustrates an example of schematic configuration illustrating an image-capturing device to which the above embodiments are applied. An image-capturing device 960 captures an image of a subject, generates image data, and records the image data to a recording medium.

The image-capturing device 960 includes an optical block 961, an image-capturing unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected the image-capturing unit 962. The image-capturing unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 with each other.

The optical block 961 includes a focus lens and a diaphragm mechanism. The optical block 961 causes an optical image of a subject to be formed on an image-capturing surface of the image-capturing unit 962. The image-capturing unit 962 includes an image sensor such as a CCD (Charge Coupled Device) or a CMOS (Complementary Metal Oxide Semiconductor), and converts the optical image formed on the image-capturing surface into an image signal which is an electric signal by photoelectric conversion. Then, the image-capturing unit 962 outputs the image signal to the signal processing unit 963.

The signal processing unit 963 performs various kinds of camera signal processing such as knee correction, gamma correction, and color correction on an image signal received from the image-capturing unit 962. The signal processing unit 963 outputs the image data which have been subjected to the camera signal processing to the image processing unit 964.

The image processing unit 964 encodes the image data received from the signal processing unit 963, and generates coded data. Then, the image processing unit 964 outputs the generated coded data to the external interface 966 or the medium drive 968. The image processing unit 964 decodes the coded data received from the external interface 966 or the medium drive 968, and generates image data. Then, the image processing unit 964 outputs the generated image data to the display unit 965. The image processing unit 964 may output the image data received from the signal processing unit 963 to the display unit 965, and may display the image thereon. The image processing unit 964 may also overlay display data obtained from the OSD 969 on the image which is to be output to the display unit 965.

For example, the OSD 969 may generate images of GUI such as menu, buttons, or cursor, and output the generated image to the image processing unit 964.

The external interface 966 is configured as, for example, a USB input/output terminal. The external interface 966 connects the image-capturing device 960 and a printer during printing of an image, for example. The external interface 966 is connected to a drive, as necessary. In the drive, for example, a removable medium such as a magnetic disk or an optical disk may be loaded. A program which is read from the removable medium may be installed to the image-capturing device 960. Further, the external interface 966 may be configured as a network interface connected to a network such as a LAN or the Internet. More specifically, the external interface 966 plays the role of a transmission unit of the image-capturing device 960.

The recording medium loaded to the medium drive 968 may be any given removable medium which can be read and written, such as a magnetic disk, an optical magnetic disk, an optical disk, or a semiconductor memory. The recording medium loaded to the medium drive 968 in a fixed manner, and, for example, a non-removable storage unit such as an internal hard disk drive or SSD (Solid State Drive) may be configured.

The control unit 970 has a processor such as a CPU and the like, and memory such as RAM and ROM. The memory records programs executed by the CPU, program data, and the like. The program stored in the memory may be, for example, read and executed by the CPU when the image-capturing device 960 is activated. The CPU executes the program to control operation of the image-capturing device 960 in accordance with operation signal received from the user interface 971, for example.

The user interface 971 is connected to the control unit 970. The user interface 971 includes, e.g., buttons and switches with which the user operates the image-capturing device 960. The user interface 971 generates an operation signal by detecting user's operation via these constituent elements, and outputs the generated operation signal to the control unit 970.

In the image-capturing device 960 configured as described above, the image processing unit 964 has a function of the image coding device and the image decoding device according to the embodiments explained above. Accordingly, when the image-capturing device 960 encodes and decodes images, the coding efficiency for quantization parameter can be improved.

In the explanation of this specification, various kinds of information such as difference quantization parameters are multiplexed into the bit stream, and transmitted from the coding side to the decoding side, for example. However, the method for transmitting information is not limited to such example. For example, such information may not be multiplexed into the bit stream, and may be transmitted or recorded as separate data associated with the bit stream. In this case, the term "associated" means that the image included in the bit stream (which may be a part of image such as slice or block) and information corresponding to the image is linked during decoding. More specifically, the information may be transmitted through a transmission path which is separate from the image (or bit stream). The information may be recorded to another recording medium which is different from the image (or bit stream) (or another recording area of the same recording medium). Further, the information and the image (or bit stream) may be associated with each other in any given unit such as multiple frames, a frame, or a portion of a frame.

The preferred embodiments of the present disclosure have been hereinabove described in detail with reference to attached drawings, but the present disclosure is not limited to such example. It is evident that a person who has ordinary knowledge in the technical field to which the present disclosure belongs would conceive of various kinds of examples of changes or modifications within the scope of the technical concept described in the claims, and it is to be understood that these are also included in the technical scope of the present disclosure.

It should be noted that this technique can also be configured as follows.

(1) An image processing apparatus includes a predicted quantization parameter setting unit for setting a predicted quantization parameter for a current coding unit by using multiple quantization parameters which are set for multiple surrounding coding units located around the current coding unit which is target of coding processing, a difference quantization parameter setting unit for setting a difference quantization parameter indicating a difference value between the quantization parameter which is set for the current coding unit and the predicted quantization parameter which is set by the predicted quantization parameter setting unit, a coding unit for generating a bit stream by encoding quantization data obtained by quantizing the image data, and a transmission unit for transmitting the bit stream generated by the coding unit and the difference quantization parameter which is set by the difference quantization parameter setting unit.

(2) The image processing apparatus as described in (1), wherein the predicted quantization parameter setting unit sets the predicted quantization parameter by applying prediction calculation to multiple quantization parameters which are set for the multiple surrounding coding units.

(3) The image processing apparatus as described in (2), wherein the predicted quantization parameter setting unit sets the predicted quantization parameter as a median value of multiple quantization parameters which are set for the multiple surrounding coding units, by applying median calculation to the multiple quantization parameters which are set for the multiple surrounding coding units.

(4) The image processing apparatus as described in (3), wherein when all the multiple surrounding coding units are in available state, the predicted quantization parameter setting unit applies the median calculation to the multiple quantization parameters which are set for the multiple surrounding coding units.

(5) The image processing apparatus as described in (2) to (4), wherein the predicted quantization parameter setting unit sets the predicted quantization parameter as an average value of multiple quantization parameters which are set for the multiple surrounding coding units, by applying average calculation to the multiple quantization parameters which are set for the multiple surrounding coding units.

(6) The image processing apparatus as described in (5), wherein when the determination unit determines that one of the surrounding coding units is in available state, the predicted quantization parameter setting unit applies average calculation to the multiple quantization parameters which are set for the multiple surrounding coding units.

(7) The image processing apparatus as described in (5) or (6), wherein the predicted quantization parameter setting unit sets the predicted quantization parameter as weighted average value of multiple quantization parameters which are set for the multiple surrounding coding units, by applying weighted average calculation to multiple quantization parameters which are set for multiple surrounding coding units which are selected by the selection unit.

(8) The image processing apparatus as described in (7), wherein the predicted quantization parameter setting unit sets the weighted average calculation such that a larger weight is given to a surrounding coding unit having the same size as a size of the current coding unit.

(9) The image processing apparatus as described in (7), wherein the predicted quantization parameter setting unit sets the weighted average calculation in such a manner that a larger weight is given to a surrounding coding unit having a larger size.

(10) The image processing apparatus as described in any one of (7) to (9), wherein, with respect to a coding unit that has been coded, the multiple surrounding coding units include a coding unit adjacent to a left side of the current coding unit, a coding unit adjacent to an upper side of the current coding unit, and a coding unit adjacent to an upper left side of the current coding unit.

(11) The image processing apparatus as described in (10), wherein the multiple surrounding coding unit further includes a coding unit adjacent to an upper right side of the current coding unit and a coding unit adjacent to a lower left side of the current coding unit.

(12) The image processing apparatus as described in any one of (2) to (11), further including a determination unit for determining whether the surrounding coding unit is in available state or not, wherein the predicted quantization parameter setting unit changes the method of the prediction calculation in accordance with a number of coding units which are determined to be available by the determination unit.

(13) The image processing apparatus as described in any one of (1) to (12), further including a determination unit for determining whether a surrounding coding unit located within a current maximum coding unit is in available state or not when the predicted quantization parameter is set, wherein the predicted quantization parameter setting unit sets the predicted quantization parameter by using only a quantization parameter of a coding unit that is determined to be in available state by the determination unit.

(14) The image processing apparatus as described in (13), wherein when the current coding unit is located at the front of the current maximum coding unit, the predicted quantization parameter setting unit sets, as the predicted quantization parameter, a quantization parameter of a coding unit located at the last of the maximum coding unit immediately before.

(15) The image processing apparatus as described in any one of (2) to (14), further including a setting unit for setting type data indicating a type of the prediction calculation, wherein the transmission unit transmits the type data which are set by the setting unit.

(16) The image processing apparatus as described in (15), wherein the setting unit sets the type data for each maximum coding unit which is a coding unit in an uppermost layer or slice.

(17) The image processing apparatus as described in (16), wherein the transmission unit transmits type data, which are set by the setting unit, as a parameter set of a bit stream generated by the coding unit.

(18) An image processing method for an image processing apparatus includes causing a predicted quantization parameter setting unit to set a predicted quantization parameter for a current coding unit by using multiple quantization parameters which are set for multiple surrounding coding units located around the current coding unit which is target of coding processing, causing a difference quantization parameter setting unit to set a difference quantization parameter indicating a difference value between the quantization parameter which is set for the current coding unit and the predicted quantization parameter which is set, causing a coding unit to generate a bit stream by encoding quantization data obtained by quantizing the image data, and causing a transmission unit to transmit the generated bit stream and the difference quantization parameter which is set.

(19) An image processing apparatus includes a receiving unit for receiving a difference quantization parameter indicating a difference value between a quantization parameter which is set for a current coding unit which is target of decoding processing and a predicted quantization parameter obtained by predicting from multiple quantization parameters which are set for multiple surrounding coding units located around the current coding unit, and a bit stream obtained by encoding image data, a quantization parameter setting unit for setting the quantization parameter of the current coding unit using the difference quantization parameter received from the receiving unit, and a decoding unit for generating image data by dequantizing a bit stream received from the receiving unit by using the quantization parameter which is set by the quantization parameter setting unit.

(20) An image processing method for an image processing apparatus includes causing a receiving unit to receive a difference quantization parameter indicating a difference value between a quantization parameter which is set for a current coding unit which is target of decoding processing and a predicted quantization parameter obtained by predicting from multiple quantization parameters which are set for multiple surrounding coding units located around the current coding unit, causing a quantization parameter setting unit to set the quantization parameter of the current coding unit using the difference quantization parameter received, and causing a decoding unit to generate image data by dequantizing a bit stream by using the quantization parameter which is set.

(21) An image processing apparatus includes a determination unit for determining whether multiple surrounding coding units located around a current coding unit which is target of coding processing is in available state or not when a predicted quantization parameter is set, a predicted quantization parameter setting unit for setting a predicted quantization parameter for the current coding unit by using only a quantization parameter of a coding unit that is determined to be in available state by the determination unit, a difference quantization parameter setting unit for setting a difference quantization parameter indicating a difference value between the quantization parameter which is set for the current coding unit and the predicted quantization parameter which is set by the predicted quantization parameter setting unit, a coding unit for generating a bit stream by encoding quantization data obtained by quantizing the image data, and a transmission unit for transmitting the bit stream generated by the coding unit and the difference quantization parameter which is set by the difference quantization parameter setting unit.

(22) The image processing apparatus as described in (21), wherein when the current coding unit is located at the front of the current maximum coding unit, the predicted quantization parameter setting unit sets, as the predicted quantization parameter, a quantization parameter of a coding unit located at the last of the maximum coding unit immediately before.

(23) An image processing method for an image processing apparatus includes causing a determination unit to determine whether multiple surrounding coding units located around a current coding unit which is target of coding processing is in available state or not when a predicted quantization parameter is set, causing a predicted quantization parameter setting unit to set a predicted quantization parameter for the current coding unit by using only a quantization parameter of a coding unit that is determined to be in available state, causing a difference quantization parameter setting unit to set a difference quantization parameter indicating a difference value between the quantization parameter which is set for the current coding unit and the predicted quantization parameter which is set, causing a coding unit to generate a bit stream by encoding quantization data obtained by quantizing the image data, and causing a transmission unit to transmit the generated bit stream and the difference quantization parameter which is set.

(24) An image processing apparatus includes a receiving unit for receiving a difference quantization parameter indicating a difference value between a quantization parameter which is set for a current coding unit which is target of decoding processing and a predicted quantization parameter which is a prediction value of the quantization parameter, and a bit stream obtained by encoding image data, a determination unit for determining whether multiple surrounding coding units located around the current coding unit is in available state or not when the predicted quantization parameter is set, a predicted quantization parameter setting unit for setting a predicted quantization parameter for the current coding unit by using only a quantization parameter of a coding unit that is determined to be in available state by the determination unit, a quantization parameter generation unit for generating a quantization parameter of the current coding unit by adding the quantization parameter which is set for the current coding unit and the difference quantization parameter received by the receiving unit, a decoding unit for decoding the bit stream received by the receiving unit, and an inverse-quantization unit for dequantizing a quantization coefficient obtained when the decoding unit decodes the bit stream, by using the quantization parameter generated by the quantization parameter generation unit.

(25) An image processing method for an image processing apparatus includes causing a receiving unit to receive a difference quantization parameter indicating a difference value between a quantization parameter which is set for a current coding unit which is target of decoding processing and a predicted quantization parameter which is a prediction value of the quantization parameter, and a bit stream obtained by encoding image data, causing a determination unit to determine whether multiple surrounding coding units located around the current coding unit is in available state or not when the predicted quantization parameter is set, causing a predicted quantization parameter setting unit to set a predicted quantization parameter for the current coding unit by using only a quantization parameter of a coding unit that is determined to be in available state, causing the quantization parameter generation unit to generate a quantization parameter of the current coding unit by adding the quantization parameter which is set for the current coding unit and the difference quantization parameter received;

causing a decoding unit to decode the bit stream received, and causing an inverse-quantization unit to dequantize a quantization coefficient obtained by decoding the bit stream, by using the quantization parameter generated.

REFERENCE SIGNS LIST 100 image coding device, 105 quantization unit, 108 inverse-quantization unit, 121 quantization parameter coding unit, 122 quantization parameter decoding unit, 131 activity calculation unit, 141 attention area quantization parameter generation unit, 142 quantization processing unit, 143 surrounding area quantization parameter buffer, 144 difference quantization parameter buffer, 151 predicted quantization parameter generation unit, 152 difference quantization parameter generation unit, 200 image decoding device, 203 inverse-quantization unit, 221 quantization parameter decoding unit, 231 difference quantization parameter buffer, 232 quantization orthogonal transformation coefficient buffer, 233 surrounding area quantization parameter buffer, 234 inverse-quantization processing unit, 241 predicted quantization parameter generation unit, 242 attention area quantization parameter restructuring unit, 301 surrounding area usage availability determination unit, 302 calculation control unit, 311 surrounding area usage availability determination unit, 312 calculation control unit, 321 surrounding area size determination unit, 331 surrounding area size determination unit, 351 setting of type of data unit, 361 type data buffer, 362 calculation control unit, 381 type data buffer, 382 calculation control unit

The invention claimed is:

1. An image processing apparatus for encoding image data while a coding unit, which is a unit having a hierarchical structure, is adopted as a processing unit, the image processing apparatus comprising:
a predicted quantization parameter setting unit including circuitry configured to set, in a condition that a current coding unit is located at the front of a current largest coding unit, a quantization parameter of a coding unit located at the last of the largest coding unit immediately before as a predicted quantization parameter for the current coding unit;
a difference quantization parameter setting unit including circuitry configured to set a difference quantization parameter indicating a difference value between the quantization parameter which is set for the current coding unit and the predicted quantization parameter which is set by the predicted quantization parameter setting unit; and
a coding unit including circuitry configured to generate a bit stream by encoding the image data with the coding unit being adopted as the processing unit.

2. The image processing apparatus according to claim 1, wherein the predicted quantization parameter setting unit sets the predicted quantization parameter by applying prediction calculation to multiple quantization parameters which are set for multiple surrounding coding units.

3. The image processing apparatus according to claim 2, wherein the predicted quantization parameter setting unit sets the predicted quantization parameter as an average value of multiple quantization parameters which are set for the multiple surrounding coding units, by applying average calculation to the multiple quantization parameters which are set for the multiple surrounding coding units.

4. The image processing apparatus according to claim 3, wherein when the determination unit determines that one of the surrounding coding units is in an available state, the predicted quantization parameter setting unit applies average calculation to the multiple quantization parameters which are set for the multiple surrounding coding units.

5. The image processing apparatus according to claim 3, wherein the predicted quantization parameter setting unit sets the predicted quantization parameter as weighted average value of multiple quantization parameters which are set for the multiple surrounding coding units, by applying weighted average calculation to multiple quantization parameters which are set for multiple surrounding coding units which are selected by selection unit.

6. The image processing apparatus according to claim 5, wherein the predicted quantization parameter setting unit sets the weighted average calculation such that a larger weight is given to a surrounding coding unit having the same size as a size of the current coding unit.

7. The image processing apparatus according to claim 5, wherein the predicted quantization parameter setting unit sets the weighted average calculation in such a manner that a larger weight is given to a surrounding coding unit having a larger size.

8. The image processing apparatus according to claim 2, wherein, with respect to a coding unit that has been coded, the multiple surrounding coding units include a coding unit adjacent to a left side of the current coding unit, a coding unit adjacent to an upper side of the current coding unit, and a coding unit adjacent to an upper left side of the current coding unit.

9. The image processing apparatus according to claim 2, further comprising a determination unit for determining whether the surrounding coding unit is in an available state or not,
wherein the predicted quantization parameter setting unit changes the method of the prediction calculation in accordance with a number of coding units which are determined to be available by the determination unit.

10. The image processing apparatus according to claim 2, further comprising a setting unit for setting type data indicating a type of the prediction calculation,
wherein the transmission unit transmits the type data which are set by the setting unit.

11. The image processing apparatus according to claim 10, wherein the setting unit sets the type data for each largest coding unit which is a coding unit in an uppermost layer or slice.

12. The image processing apparatus according to claim 11, wherein the transmission unit transmits type data, which are set by the setting unit, as a parameter set of a bit stream generated by the coding unit.

13. The image processing apparatus according to claim 1, further comprising a determination unit for determining whether a surrounding coding unit located within a current largest coding unit is in an available state or not when the predicted quantization parameter is set,
wherein the predicted quantization parameter setting unit sets the predicted quantization parameter by using only a quantization parameter of a coding unit that is determined to be in the available state by the determination unit.

14. An image processing method for an image processing apparatus for encoding image data while a coding unit, which is a unit having a hierarchical structure, is adopted as a processing unit, the image processing method comprising:
causing a predicted quantization parameter setting unit to set, in a condition that a current coding unit is located at the front of a current largest coding unit, a quantization parameter of a coding unit located at the last of the largest coding unit immediately before a predicted quantization parameter for the current coding unit;
causing a difference quantization parameter setting unit to set a difference quantization parameter indicating a difference value between the quantization parameter which is set for the current coding unit and the predicted quantization parameter which is set; and
causing a coding unit to generate a bit stream by encoding quantization data obtained by quantizing the image data.

15. The image processing method according to claim 14, further comprising:
causing a transmission unit to transmit the generated bit stream and the difference quantization parameter which is set.

16. A non-transitory computer readable storage medium which, when executed on a processing unit, performs a method for encoding image data with an image processing apparatus while a coding unit, which is a unit having a hierarchical structure, is adopted as a processing unit, the method comprising:

setting, in a condition that a current coding unit is located at the front of a current largest coding unit, a quantization parameter of a coding unit located at the last of the largest coding unit immediately before as a predicted quantization parameter for the current coding unit;

setting a difference quantization parameter indicating a difference value between the quantization parameter which is set for the current coding unit and the predicted quantization parameter which is set by the predicted quantization parameter setting unit; and generating a bit stream by encoding the image data with the coding unit being adopted as the processing unit.

* * * * *